US012316059B2

(12) United States Patent
Kawanaka et al.

(10) Patent No.: US 12,316,059 B2

(45) Date of Patent: May 27, 2025

(54) TERMINAL-EQUIPPED ELECTRIC WIRE, WIRING HARNESS, TERMINAL, TERMINAL CRIMPER, AND METHOD FOR PRODUCING TERMINAL-EQUIPPED ELECTRIC WIRE

(71) Applicants: FURUKAWA ELECTRIC CO., LTD., Tokyo (JP); FURUKAWA AUTOMOTIVE SYSTEMS INC., Inukami-gun (JP)

(72) Inventors: Hirofumi Kawanaka, Tokyo (JP); Tetsuya Hiraiwa, Inukami-gun (JP); Junya Takeshita, Tokyo (JP); Hirokazu Takahashi, Tokyo (JP); Kengo Mitose, Tokyo (JP); Yoshinari Motoyama, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 263 days.

(21) Appl. No.: 18/054,342

(22) Filed: Nov. 10, 2022

(65) Prior Publication Data

US 2023/0070010 A1 Mar. 9, 2023

Related U.S. Application Data

(63) Continuation of application No. PCT/JP2021/020138, filed on May 27, 2021.

(30) Foreign Application Priority Data

May 27, 2020 (JP) ................................ 2020-092662
May 27, 2020 (JP) ................................ 2020-092664
(Continued)

(51) Int. Cl.
*H01R 4/18* (2006.01)
*H01B 7/18* (2006.01)
(Continued)

(52) U.S. Cl.
CPC .......... *H01R 4/183* (2013.01); *H01B 7/1825* (2013.01); *H01B 7/223* (2013.01); *H01R 4/185* (2013.01);
(Continued)

(58) Field of Classification Search
CPC ... H01R 4/10; H01R 4/16; H01R 4/18; H01R 4/185; H01R 4/188; H01R 4/62;
(Continued)

(56) References Cited

U.S. PATENT DOCUMENTS 5,456,005 A 10/1995 Satoh et al.
9,394,588 B2 * 7/2016 Matsuo ................ H01R 43/048
(Continued)

FOREIGN PATENT DOCUMENTS

DE 10 2018 220 079 A1 5/2019
EP 1503454 A * 6/2004 ............... H01R 4/18
(Continued)

OTHER PUBLICATIONS

Extended European Search Report Issued Aug. 22, 2023 in European Application 21814382.4, 12 pages.
(Continued)

*Primary Examiner* — William H. Mayo, III
(74) *Attorney, Agent, or Firm* — Oblon, McClelland, Maier & Neustadt, L.L.P.

(57) ABSTRACT

A terminal-equipped electric wire includes a terminal and a coated conductive wire, which are electrically connected to each other. A crimp part of the terminal is crimped to the coated conductive wire, and has a conductive wire crimp part, which is crimped to a conductive wire that is exposed
(Continued)

from a coating on the front-end side of the coated conductive wire, and a coating crimp part, which is crimped to the coating of the coated conductive wire. On the front-end side (terminal body side) of the conductive wire crimp part, an electric wire holding part, which applies a relatively strong holding force on the conductive wire, is provided, On the rear-end side (coating crimp part side) of the conductive wire crimp part, a conductive part for achieving conduction with the conductive wire is formed.

23 Claims, 33 Drawing Sheets

(30) Foreign Application Priority Data

May 27, 2020 (JP) ................................ 2020-092667
May 27, 2020 (JP) ................................ 2020-092668
May 27, 2020 (JP) ................................ 2020-092670
Dec. 4, 2020 (JP) ................................ 2020-201852
Dec. 4, 2020 (JP) ................................ 2020-201854
Dec. 4, 2020 (JP) ................................ 2020-201857
Dec. 4, 2020 (JP) ................................ 2020-201867
Dec. 4, 2020 (JP) ................................ 2020-201876

(51) Int. Cl.
*H01B 7/22* (2006.01)
*H01R 43/058* (2006.01)
*H01B 7/00* (2006.01)

(52) U.S. Cl.
CPC ......... *H01R 43/058* (2013.01); *H01B 7/0009* (2013.01)

(58) Field of Classification Search
CPC . H01R 4/70; H01R 4/183; H01R 4/24; H01R 43/048; H01R 43/058; H01B 1/023; H01B 7/1825; H01B 7/223; H01B 7/228; H01B 7/009; H01B 13/02; H01B 13/06; H01B 13/0016; H02G 15/02
USPC ......... 174/74 R, 78, 84 R, 84 C, 88 C, 94 R; 427/117, 558; 439/421, 877, 882, 874
See application file for complete search history.

(56) References Cited

U.S. PATENT DOCUMENTS 9,640,933 B2 * 5/2017 Kawamura .......... H01R 43/048
9,899,119 B2 * 2/2018 Yoshida ................... H01R 4/62
2003/0013353 A1 * 1/2003 Sakaguchi ............. H01R 4/188 439/877
2008/0283268 A1 * 11/2008 Iwasaki ............. H01R 13/5216 427/117
2010/0144189 A1 * 6/2010 Watanabe ................ H01R 4/62 439/421
2013/0130565 A1 5/2013 Onuma et al.
2013/0252488 A1 * 9/2013 Ito ......................... H01R 4/188 439/877
2016/0172769 A1 6/2016 Kamoshida et al.
2016/0172811 A1 6/2016 Tachibana et al.
2017/0317431 A1 * 11/2017 Kamoshida ............ H01R 4/188
2018/0240569 A1 8/2018 Richmond et al.
2019/0027883 A1 * 1/2019 Saito .................... H01R 43/048
2019/0165535 A1 5/2019 Sato et al.
2019/0305441 A1 10/2019 Miled

FOREIGN PATENT DOCUMENTS

EP 3 364 422 A1 8/2018
JP 61-046827 U 3/1986
JP 6-84547 A 3/1994
JP 7-192835 A 7/1995
JP 8-237839 A 9/1996
JP 9-223412 A 8/1997
JP 2005-50736 A 2/2005
JP 2008-235130 A 10/2008
JP 2009-259558 A 11/2009
JP 2012-38454 A 2/2012
JP 2013-49070 A 3/2013
JP 2013-125739 A 6/2013
JP 2014-164839 A 9/2014
JP 2014-164910 A 9/2014
JP 2015-18815 A 1/2015
JP 2015-32543 A 2/2015
JP 2016-192347 A 11/2016
JP 2017-84485 A 5/2017
JP 2017-130330 A 7/2017
JP 2018-181402 A 11/2018
WO WO 2010/024032 A1 3/2010
WO WO 2013/032030 A1 3/2013

OTHER PUBLICATIONS

International Preliminary Report on Patentability and Written Opinion Issued Nov. 17, 2022 in PCT/JP2021/020138, (with English translation), 11 pages.
International Search Report issued Aug. 17, 2021 in PCT/JP2021/020138 filed May 27, 2021, 3 pages.
European Office Action issued May 22, 2024 in European Patent Application No. 21 814 382.4, 6 pages.
Japanese Office Action issued Oct. 3, 2023 in Japanese Application 2021-088914, (with unedited computer-generated English translation), 12 pages.
Japanese Office Action issued Oct. 3, 2023 in Japanese Application 2021-088916, (with unedited computer-generated English translation), 14 pages.
Japanese Office Action issued Oct. 3, 2023 in Japanese Application 2021-088918, (with unedited computer-generated English translation), 12 pages.
Japanese Office Action issued Oct. 10, 2023 in Japanese Application 2021-088919, (with unedited computer-generated English translation), 14 pages.
Japanese Office Action issued Oct. 17, 2023 in Japanese Application 2021-088920, (with unedited computer-generated English translation), 10 pages.
Japanese Office Action issued Jan. 30, 2024 in Japanese Patent Application No. 2021-088914 (with unedited computer-generated English translation), 9 pages.
Japanese Office Action issued Jan. 30, 2024 in Japanese Patent Application No. 2021-088916 (with unedited computer-generated English translation), 10 pages.
Japanese Office Action issued Jan. 30, 2024 in Japanese Patent Application No. 2021-088918 (with unedited computer-generated English translation), 9 pages.
Japanese Office Action issued Jan. 30, 2024 in Japanese Patent Application No. 2021-088920 (with unedited computer-generated English translation), 14 pages.

* cited by examiner

TERMINAL-EQUIPPED ELECTRIC WIRE, WIRING HARNESS, TERMINAL, TERMINAL CRIMPER, AND METHOD FOR PRODUCING TERMINAL-EQUIPPED ELECTRIC WIRE

TECHNICAL FIELD OF THE INVENTION

The present invention relates to a terminal-equipped electric wire and the like that are used in motor vehicles, for example.

BACKGROUND OF THE INVENTION

A wire harness for motor vehicles is a bundle of coated conductive wires in which a conductor is connected with a crimp terminal. The wire harness is often wired as a signal wire inside a vehicle, for example. The common coated conductive wire and the crimp terminal are connected with each other by removing a coating at a tip end of the coated conductive wire, crimping the exposed conductor at a conductive wire crimp part, and crimping a coating at a coating crimp part. The wire harness for motor vehicles satisfies requirements of connection strength between the crimp terminal and the coated conductive wire by adding together connection strength at the conductive wire crimp part and connection strength at the coating crimp part.

However, when the electric wire used becomes thinner, it is difficult to maintain the strength of the electric wire only by the conductor forming the electric wire. Thus, a use of an electric wire including a tension member has been considered. For example, in a case of using an electric wire including a conductor having tensile strength of approximately 30 N, to obtain tensile strength of 80 N or more, which is a requirement for an electric wire for motor vehicles, an electric wire including a tension member in which a conductive wire is spirally wound around an outer periphery of the metal or non-metal tension member has been proposed. Such the electric wire is produced by a method in which a conductor is peeled in stages to expose the tension member and inserted into a sleeve, the tension member is then crimped by a steel-made clamp and further unified as one body by using curable resin such as an adhesive agent, and the conductor part is crimped by an aluminum clamp, for example (Patent Documents 1 and 2).

RELATED ART

Patent Documents

[Patent Document 1] Japanese Unexamined Utility Model Application Publication No. S61-046827 (JP-UM-A-S61-046827)

[Patent Document 2] Japanese Unexamined Patent Application Publication No. H08-237839 (JP-A-H08-237839)

SUMMARY OF THE INVENTION

Problems to be Solved by the Invention

In recent years, especially in the field of motor vehicles, the number of electric wires used has been increasing drastically due to an increase in components used, such as ECUs and sensors, to adapt vehicles to concepts such as C.A.S.E. This raises a problem of an increase in wire diameters of wire harnesses, and thus electric wires for motor vehicles are required to have further smaller diameters. For example, there has been a demand for electric wires having diameters smaller than a conventional common diameter of 0.35 sq (sq: $mm^2$).

Note that, at the conductive wire crimp part, it is necessary to satisfy both a requirement of the connection strength between the electric wire and the terminal and a requirement of an electric resistance of a connection between the conductor and the terminal. To satisfy such requirement specifications of the connection strength with the electric wire and the electric resistance of the connection with the conductor, a compression rate at the conductive wire crimp part is required to be set appropriately. However, if the electric wire diameter becomes smaller with the same compression rate, it is difficult to satisfy both of the specifications.

For example, when a coated conductive wire having a large diameter is used and connected to a crimp terminal by using a conventional technique, crimping at the conductive wire crimp part is possible with a compression rate that can satisfy both the connection strength and the connective resistance. However, if the diameter of the electric wire becomes smaller, a scope of crimping conditions that are appropriate for both the connection strength and the electric resistance becomes smaller. This is because improving the connection strength may cause the conductor to fracture and to have the higher connective resistance, and prioritizing the connective resistance may fail to obtain the connection strength, causing the electric wire to come off. As above, the smaller the electric wire diameter is, the harder it is to satisfy both the connection strength and the electric resistance.

In addition, to connect the conventional electric wire including a tension member, peeling in stages and a crimping step for each of crimping of the tension member and crimping of the conductive wire are necessary. This increases the number of components and operational steps, which raises cost. Especially, the peeling in stages itself becomes harder when the electric wire diameter becomes smaller. As above, there are problems in the conventional methods where manufacturing steps are complex and thus processing cost is high.

The present invention is made in view of the above problems. It is an object of the present invention to provide a terminal-equipped electric wire and the like that can achieve an excellent crimping workability and satisfy both connection strength and connective resistance.

Means for Solving Problems

To achieve the above object, a first aspect of the present invention is a terminal-equipped electric wire in which a coated conductive wire and a terminal are electrically connected with each other. The terminal includes a conductive wire crimp part and a coating crimp part. A conductive wire being exposed from a coating at a tip end of the coated conductive wire is crimped at the conductive wire crimp part, and the coating of the coated conductive wire is crimped at the coating crimp part. The conductive wire crimp part includes an electric wire holding part for holding the conductive wire, and a conductive part for achieving conduction with the conductive wire.

The electric wire holding part is provided on a front-end side of the conductive wire crimp part, and the conductive part is formed on a rear-end side of the conductive wire crimp part. It is preferable that a compression rate at the electric wire holding part is different from a compression rate at the conductive part.

It is preferable that the compression rate at the electric wire holding part is smaller than the compression rate at the conductive part.

It is preferable that tensile strength of the conductive wire at the electric wire holding part is higher than tensile strength of the conductive wire at the conductive part.

The coated conductive wire may include at least the one conductive wire and a tensile member that are coated by the coating.

It is preferable that the electric holding part holds both the conductive wire and the tensile member.

The coated conductive wire may include a plurality of the conductive wires and at least one tension member.

On a cross section taken perpendicularly to a longitudinal direction of the coated conductive wire, the tension member may be positioned at an approximate center of the coated conductive wire, and the conductive wire may be disposed on an outer periphery part of the tension member.

The conductive wire may be twisted in the longitudinal direction of the coated conductive wire.

It is preferable that a cross-sectional area of the conductive wire is 0.35 sq or less, and the terminal can crimp the conductive wire having the cross-sectional area of 0.35 sq or less.

It is preferable that the cross-sectional area of the conductive wire is 0.3 sq or less, and the terminal can crimp the conductive wire having the cross-sectional area of 0.3 sq or less.

The cross-sectional area of the conductive wire may be 0.05 sq or less and, tensile strength of the conductive wire at the electric wire holding part may be 50 N or more.

At least a part of the conductive wire may fracture at the electric wire holding part.

At least a part of the conductive wire crimp part may be in a pipe shape being closed in a circumferential direction.

At least a tip end part of the conductive wires may be compressed from an outer periphery side, or may be plated collectively from the outer periphery of the conductive wires.

The compression rate at the coating crimp part may be smaller than the compression rate at the conductive part.

The coating crimp part may be in an open-barrel shape.

A conductive wire positioning part may be formed at least at a part between the conductive wire crimp part and the coating crimp part. The conductive wire positioning part becomes smaller in size toward the front-end side. A tip end of the coating comes into contact with the conductive wire positioning part so that an insertion margin of the conductive wire into the conductive wire crimp part may be restricted.

The conductive wire crimp part may be an open-barrel type.

According to the first aspect of the present invention, the conductive wire crimp part includes the two functional parts: the electric wire holding part for holding the conductive wire to improve the connection strength; and the conductive part to achieve conduction with the conductive wire to reduce the connective resistance. Thus, the requirements for both of the connection strength and the connective resistance can be satisfied. At this time, the conductive wire crimp part can be crimped by using the same method as the conventional one, and thus the operation is easy.

Also, by having the different compression rates at the electric wire holding part and at the conductive part, the compression rates at the electric wire holding part and the conductive part can be varied. Thus, crimping can be performed with the compression rate that is appropriate for each of the functions. In such the case, by making the compression rate at the electric wire holding part smaller than the compression rate at the conductive part, that is, by strongly compressing the electric wire holding part, the terminal and the coated conductive wire can be connected with the higher connection strength with more certainty.

Also, in such the case, by making the tensile strength of the conductive wire at the electric wire holding part larger than the tensile strength of the conductive wire at the conductive part, the terminal and the coated conductive wire can be connected with the higher connection strength.

Also, the coated conductive wire includes at least one conductive wire and a tension member, and the tensile member enables the conductive wire to have the higher tensile strength. At this time, if the electric wire holding part holds both of the conductive wire and the tensile member, the enhanced connection strength can be obtained. Also, unlike in conventional cases, there is no need to connect the tensile member and the conductive wire with separate cramps, and thus fewer components are used and the connection operation is easy.

Also, if the coated conductive wire includes the plurality of conductive wires and at least one tensile member, the plurality of conductive wires can be arranged around the tensile member, for example. If the conductive wires are disposed on the outer periphery part of the tensile member that is at a center of a cross section taken perpendicularly to the longitudinal direction of the coated conductive wires, the conductive wires can be crimped with more certainty. At this time, the conductive wires may be twisted around the outer periphery part of the tensile member along the longitudinal direction of the conductive wires.

Also, the present invention is especially effective when using the small-diameter coated conductive wire in which the cross-sectional area of the conductive wire is 0.35 sq or less, or as small as 0.3 sq or less. The present invention is furthermore effective in particular when using the small-diameter coated conductive wire in which the cross-sectional area of the conductive wire is 0.05 sq or less and the tensile strength of conductive wire of 50 N or more is to be obtained.

Also, at least a part of the conductive wire may fracture at the electric wire holding part. Even in such the case, a part of the tensile member or the like enters into space between the fractured conductive wires, increasing pulling resistance of the conductive wire and improving the connection strength. Meanwhile, the conductive wire and the crimp terminal can have conduction at the conductive part.

Also, if at least a part of the conductive wire crimp part is in a pipe shape, the conductive wire can be crimped with certainty from the entire circumference. This can eliminate local stress (deformation) applied onto the conductive wire at the time of crimping.

Also, the conductive wires have a processed end part formed by compressing the tip end part of the conductive wires from the outer periphery side or by plating the conductive wires collectively from the outer periphery. This can prevent the conductive wires from separating from one another at the time of inserting the tip end of the conductive wires into the pipe-shaped conductive wire crimp part.

Also, the compression rate at the coating crimp part is smaller than the compression rate at the conductive part, and thus the coating can be held with certainty.

Also, if the coating crimp part is an open-barrel type, positioning of the conductive wire is easy when the conductive wire is inserted into the pipe-shaped conductive wire crimp part. Thus, the conductive wire can be easily inserted into the conductive wire crimp part having small diameter.

Also, the conductive wire positioning part is formed between the conductive wire crimp part and the coating crimp part. The conductive wire positioning part becomes smaller in size toward the front-end side. When the coated conductive wire is disposed in the crimp part, the front end of the coating comes into contact with the conductive wire positioning part so that the insertion margin of the conductive wire into the conductive wire crimp part is restricted. Thus, there is no need to look and check the crimping position. This facilitates positioning of the coated conductive wire onto the terminal in the longitudinal direction, which stabilizes the crimping position throughout production steps and improves productivity.

Also, if the conductive wire crimp part is an open-barrel type, the conductive wire can be easily disposed on the conductive wire crimp part from an upper part of the terminal. Thus, an operation of crimping the terminal and the coated conductive wire is easy.

A second aspect of the present invention is a wire harness in which a plurality of terminal-equipped electric wires, including the terminal-equipped electric wire according to the first aspect of the present invention, are unified together as one body.

According to the second aspect of the present invention, the wire harness, which is a bundle of a plurality of small-diameter electric wires, can be obtained.

A third aspect of the present invention is a terminal that is to be electrically connected with a coated conductive wire. The terminal includes a conductive wire crimp part and a coating crimp part. A conductive wire being exposed from a coating at a tip end of the coated conductive wire is crimped at the conductive wire crimp part, and the coating of the coated conductive wire is crimped at the coating crimp part. An electric wire holding part for holding the conductive wire is provided at a front-end side of the conductive wire crimp part, and a conductive part for achieving conduction with the conductive wire is provided at a rear-end side of the conductive wire crimp part. The electric wire holding part and the conductive part are separated from each other.

At least a part of the conductive wire crimp part may be in a pipe shape being closed in a circumferential direction.

A conductive wire positioning part may be formed at least at a part between the conductive wire crimp part and the coating crimp part. The conductive wire positioning part becomes smaller in size toward the front-end side.

The conductive wire crimp part may be in an open-barrel shape.

According to the third aspect of the present invention, the terminal-equipped electric wire according to the first aspect of the present invention can be easily obtained.

Also, if at least a part of the conductive wire crimp part is in a pipe shape, the conductive wire can be crimped with certainty from the entire circumference. This can eliminate local stress (deformation) applied onto the conductive wire at the time of crimping.

Also, the conductive wire positioning part is formed between the conductive wire crimp part and the coating crimp part. The conductive wire positioning part becomes smaller in size toward the front-end side. This restricts the insertion margin of the conductive wire into the conductive wire crimp part, and thus there is no need to look and check the crimping position. This facilitates positioning of the coated conductive wire on to the terminal in the longitudinal direction.

Also, if the conductive wire crimp part is an open-barrel type, the conductive wire can be easily disposed on the conductive wire crimp part from an upper part of the terminal. Thus, an operation of crimping the terminal and the coated conductive wire is easy.

A fourth aspect of the present invention is a terminal crimper for producing the terminal-equipped electric wire according to the first aspect of the present invention. The terminal crimper includes an upper edge and a lower edge, and a distance between the upper edge and the lower edge at a part corresponding to the electric wire holding part is smaller than a distance between the upper edge and the lower edge at a part corresponding to the conductive part.

According to the fourth aspect of the present invention, the coated conductive wire and the terminal can be easily crimped together with steps similar to those for the conventional terminal-equipped electric wires.

A fifth aspect of the present invention is a method for producing the terminal-equipped electric wire according to the first aspect of the present invention, wherein a cross-sectional area of an inner part of the coating is 40% or more of a cross-sectional area of an insertion part of the conductive wire crimp part before crimping.

The conductive wire may be inserted into the conductive wire crimp part with a part of the coating being left at the tip end when removing the coating at a tip end part of the coated conductive wire, and the coating may be removed from the conductive wire before crimping.

According to the fifth aspect of the present invention, the terminal-equipped electric wire according to the first aspect of the present invention can be easily obtained.

At this time, the conductive wires are inserted into the conductive wire crimp part with a part of the coating being left at the tip end. This can prevent the conductive wires from separating from one another and facilitates insertion of the conductive wires into the conductive wire crimp part.

A sixth aspect of the present invention is a method for producing the terminal-equipped electric wire according to the first aspect of the present invention, wherein the conductive wire positioning part is larger in size than an inner diameter of the coating and smaller than an outer diameter of the coating before crimping. The tip end of the coated conductive wire is inserted into the conductive wire crimp part until the tip end of the coating comes into contact with the conductive wire positioning part before the conductive wire crimp part is crimped.

According to the sixth aspect of the present invention, the conductive wires can be crimped at the conductive wire crimp part with certainty, and the terminal-equipped electric wire can be obtained.

Effects of the Invention

The present invention can provide a terminal-equipped electric wire and the like that can achieve an excellent crimping workability and satisfy both connection strength and connective resistance.

DESCRIPTION OF SOME EMBODIMENTS

First Embodiment

Figure 1:
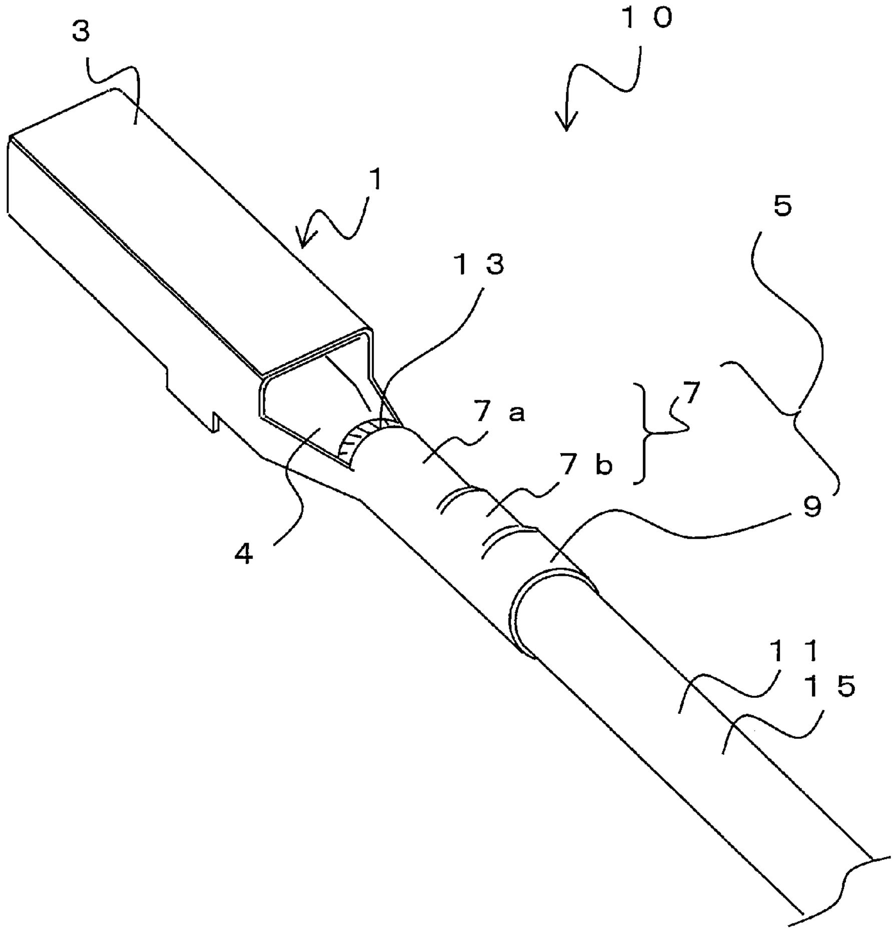
FIG. 1 is a perspective view showing a terminal-equipped electric wire 10.
Figure 2:
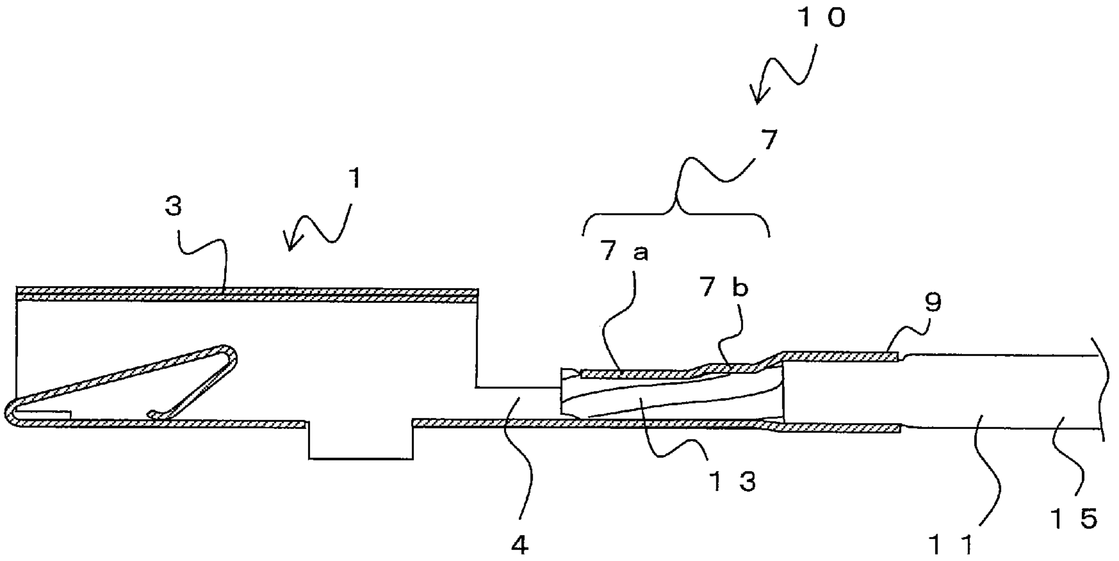
FIG. 2 is a cross-sectional view showing the terminal-equipped electric wire 10.

Hereinafter, an embodiment of the present invention will be described with reference to the accompanying drawings. FIG. 1 is a perspective view showing a terminal-equipped electric wire 10, and FIG. 2 is a cross-sectional view of the terminal-equipped electric wire 10. The terminal-equipped electric wire 10 includes a terminal 1 and a coated conductive wire 11 that are electrically connected to each other.

The coated conductive wire 11 is formed of a conductive wire 13, which is made of copper, copper alloy metal, aluminum, or aluminum alloy metal, for example, and a coating 15, which coats the conductive wire 13. That is, the coated conductive wire 11 includes the coating 15 and the conductive wire 13 being exposed from a tip end of the coating 15.

The terminal 1 is made of copper, copper alloy metal, aluminum, or aluminum alloy metal, for example. The coated conductive wire 11 is connected to the terminal 1. The terminal 1 is formed of a terminal body 3 and a crimp part 5 that are joined together via a transition part 4.

The terminal body 3 is made by forming a predetermined shaped plate-like material into a tubular body having a rectangular cross section. The terminal body 3 includes an elastic contacting piece that is formed by folding the plate-like material into the rectangular tubular body. A male terminal or the like is inserted from a front-end part of the terminal body 3 to be connected. In the descriptions hereinafter, examples in which the terminal body 3 is a female-type terminal allowing an insertion tab of a male-type terminal etc., of which illustrations are omitted, to be inserted. However, detail shapes of the terminal body 3 in the present invention are not particularly limited. For examples, instead of the female-type terminal body 3, an insertion tab of a male-type terminal may be provided, or, alternatively, a bolt fastening part such as a ring terminal may be provided.

The crimp part 5 of the terminal 1 is a part to which the coated conductive wire 11 is crimped. The crimp part 5 includes a conductive wire crimp part 7 that crimps the conductive wire 13 exposing from the coating 15 at a front-end side of the coated conductive wire 11, and a coating crimp part 9 that crimps the coating 15 of the coated conductive wire 11. That is, the conductive wire 13 being exposed by peeling the coating 15 is crimped by the conductive wire crimp part 7, thereby electrically connecting the conductive wire 13 and the terminal 1 with each other. Also, the coating 15 of the coated conductive wire 11 is crimped by the coating crimp part 9 of the terminal 1. In the present embodiment, the conductive wire crimp part 7 and the coating crimp part 9 are formed as one body in a pipe shape being closed in a circumferential direction (in a substantially cylindrical shape).

Although illustrations are omitted, serrations may be provided in a width direction (a direction perpendicular to a longitudinal direction) at a part of an inner surface of the conductive wire crimp part 7. The serrations formed in this way can easily break an oxide film on a surface of the conductive wire 13, and also can increase a contacting area with the conductive wire 11 at the time of crimping the conductive wire 13.

On the front-end side of the conductive wire crimp part 7 (on a side of the terminal body 3), an electric wire holding part 7*a* that holds the conductive wire 13 with a relatively strong force is provided. Also, on a rear-end side of the conductive wire crimp part 7 (on a side of the coating crimp part 9), a conductive part 7*b* for achieving conduction with the conductive wire 13 is formed. That is, the conduction crimp part 7 includes the electric wire holding part 7*a* and the conductive part 7*b*.

Tensile strength (connection strength) of the conductive wire 13 at the electric wire holding part 7*a* is greater than the tensile strength (connection strength) of the conductive wire 13 at the conductive part 7*b*. For example, a compression rate (a cross-sectional area of the conductive wire 13 after crimping/the cross-sectional area of the conductive wire 13 before crimping) at the electric wire holding part 7*a* is smaller than the compression rate at the conductive part 7*b*. That is, an amount of compression at the electric wire holding part 7*a* is larger than the amount of compression at the conductive part 7*b*, and thus the electric wire holding part 7*a* is crimped strongly.

Since the electric wire holding part 7*a* is crimped strongly as above, at least a part of the conductive wire 13 may fracture. Fracturing partly the conductive wire 13 increases electric resistance. However, some part of a tension member, such as fibers, which will be described below, enter into gaps of the fractured conductive wire 13, and this increases pulling resistance of the conductive wire 13 so that the connection strength can be obtained. On the other hand, the conductive wire 13 are not fractured at the conductive part 7*b* to keep the electric resistance low.

A compression rate at the coating crimp part 9 (a cross-sectional area of the coating 15 after crimping/the cross-sectional area of the coating 15 before crimping) may be smaller than the compression rate at the conductive part 7*b*. That is, an amount of compression at the coating crimp part 9 may be larger than the amount of compression at the conductive part 7*b*. Also in such the case, an outer diameter of the coating crimp part 9 is larger than an outer diameter of the conductive part 7*b* due to a thickness of the coating 15.

Figure 3A:
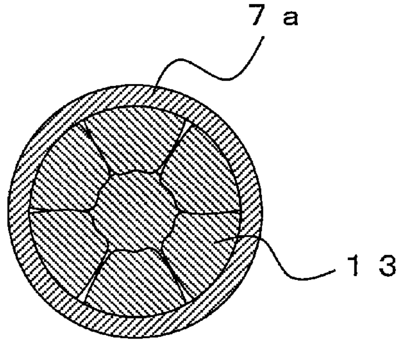
FIG. 3A is a cross-sectional view at an electric wire holding part 7*a*.

FIG. 3A is a view showing a cross section at the electric wire holding part 7*a*. In the example shown in FIG. 3A, the conductive wire 13 is formed of seven bare wires. The conductive wire 13 is compressed into a substantially circular shape and crimped at the electric wire holding part 7*a*. The shape of the electric wire holding part 7*a* after crimping is not necessarily in the substantial circular shape. However, it is preferable that the shape of the conductive part 7*b* after crimping is in the substantial circular shape.

Figure 3B:
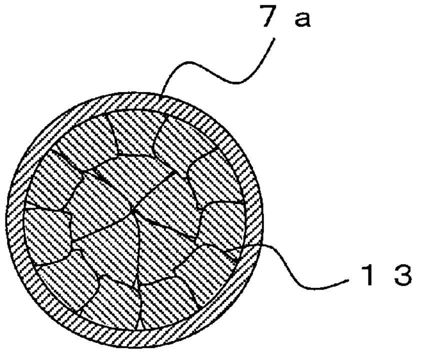
FIG. 3B is a cross-sectional view at the electric wire holding part 7*a*.

The number of the bare wires in the conductive wire 13 is not particularly limited. For example, the conductive wire 13 may include sixteen bare wires as shown in FIG. 3B. The bare wires are preferably twisted together.

Figure 3C:
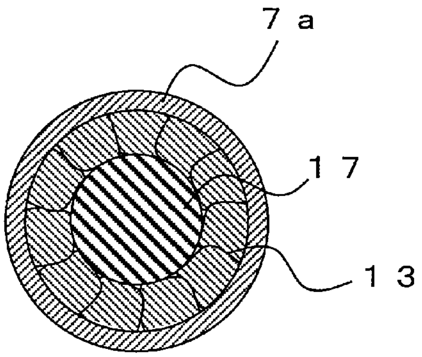
FIG. 3C is a cross-sectional view at the electric wire holding part 7*a*.

Also, the coated conductive wire 11 may include at least the one conductive wire 13 and a tension member that are coated by the coating 15. The tension member is a member that receives tensile force when a tensile load is applied. For example, as shown in FIG. 3C, on a cross section taken perpendicularly to a longitudinal direction of the coated conductive wire 11, at least one tension member 17 may be positioned at an approximate center of the coated conductive wire 11, and the plurality of conductive wires 13 may be disposed on an outer periphery part of the tension member 17. At this time, each of the conductive wires 13 (the bare wire) disposed on the outer periphery of the tension member 17 may have the same cross-sectional area and the same shape. Furthermore, the conductive wires 13 may be spirally twisted together around the outer periphery of the tension member 17 along the longitudinal direction of the coated conductive wire 11. In such the case, both of the conductive wires 13 and the tension member 17 are crimped and held at the electric wire holding part 7*a* and the conductive part 7*b*.

Figure 4A:
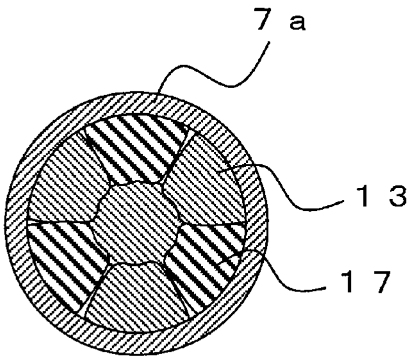
FIG. 4A is a cross-sectional view at the electric wire holding part 7*a*.
Figure 4B:
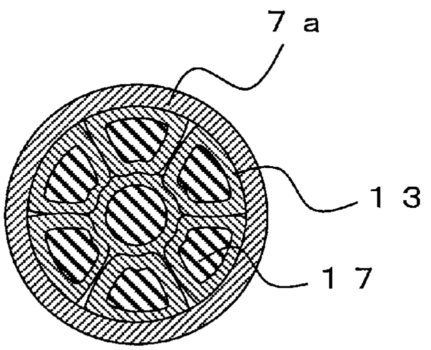
FIG. 4B is a cross-sectional view at the electric wire holding part 7*a*.
Figure 4C:
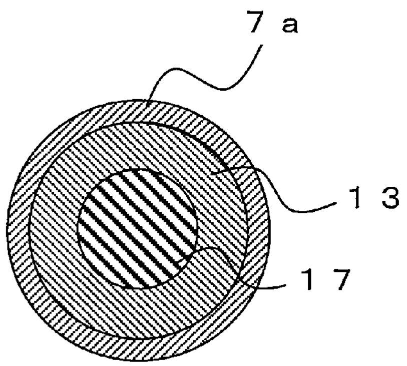
FIG. 4C is a cross-sectional view at the electric wire holding part 7*a*.

The arrangement of the tension member 17 is not limited to the example shown in FIG. 3C. For example, as shown in FIG. 4A, the conductive wires 13 and the tension member 17 may be arranged being twisted together. Alternatively, as shown in FIG. 4B, the plurality of conductive wires 13 in which the tension member 17 is coated with a conductor may be twisted together. Also, as shown in FIG. 4C, the conductor may be arranged so as to coat the outer periphery of the tension member 17 at the center. That is, the cross-sectional form of the coated conductive wire 11 including the tension member is not particularly limited if the coated conductive wire 11 includes at least one conductive wire and a tension member. The tension member 17 may be formed of one (or one body) tension wire or a plurality of bare wires. For example, each of the divided and arranged tension members 17 in FIG. 4A and FIG. 4B may be formed of the plurality of bare wires.

Here, a cross-sectional area of the conductive wire 13 (a total of cross-sectional areas of the bare wires) is preferably 0.35 sq or less, and, in such the case, it is preferable that the terminal 1 can crimp the conductive wire 13 having the cross-sectional area of 0.35 sq or less. Furthermore, the cross-sectional area of the conductive wire 13 (the total of cross-sectional areas of the bare wires) is preferably 0.3 sq or less, and, in such the case, it is preferable that the terminal 1 can crimp the conductive wire 13 having the cross-sectional area of 0.3 sq or less. Also, if the conductive wire 13 is used together with the tension member 17, for example, the cross-sectional area of the conductive wire 13 may be 0.05 sq or less. Smaller the cross-sectional area of the conductive wire 13 is, the larger the effects of the present embodiment.

The tension member 17 may be formed of any type of metal wire, such as a steel wire, or may be formed of resin or fiber-reinforced resin. Also, as mentioned above, the tension member 17 may be a single wire or may be a bundle of a plurality of fibers, such as aramid fibers. With such the tension member 17 being used, the tensile strength of the conductive wire at the electric wire holding part 7a as large as 50 N or more can be obtained with the cross-sectional area of the conductive wire 13 as small as 0.05 sq or less, for example.

Figure 5:
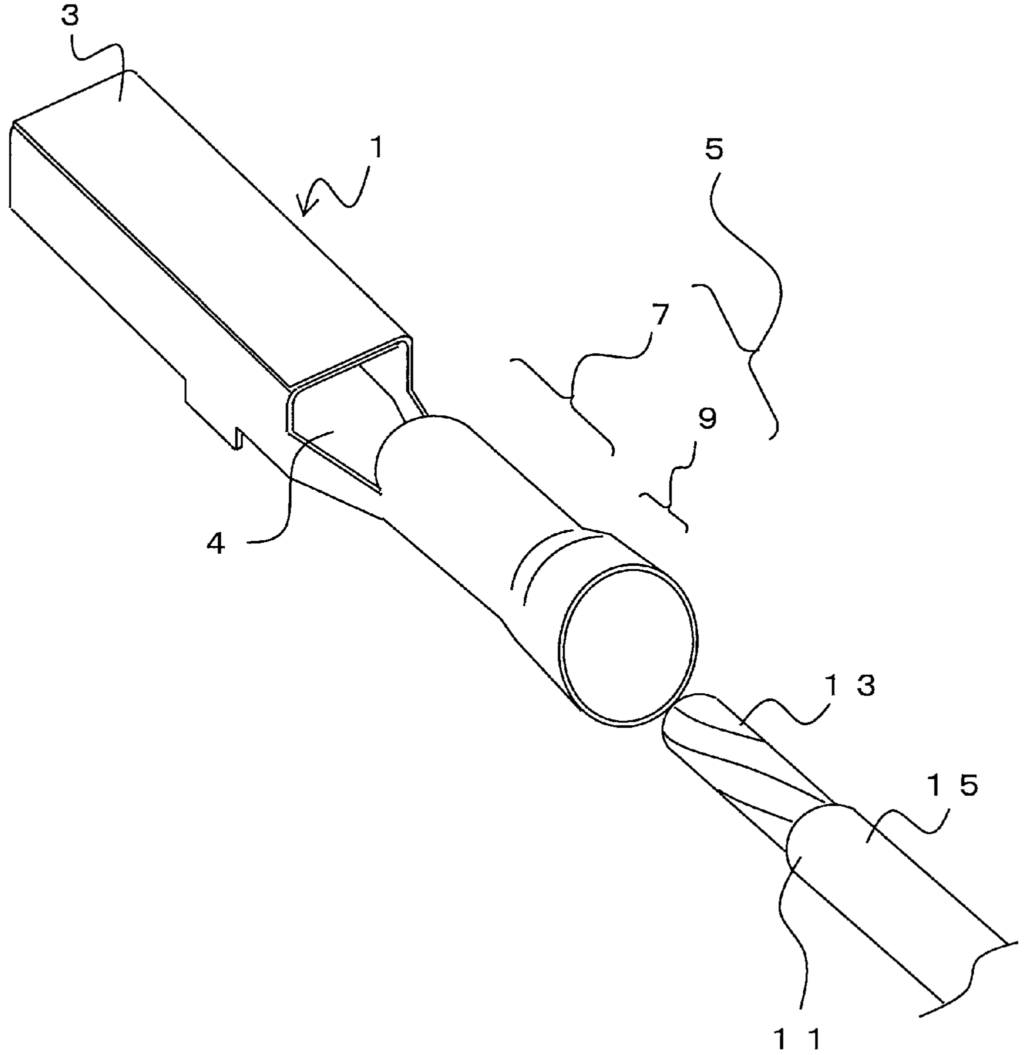
FIG. 5 is a view showing a terminal 1 and a coated conductive wire 11 before crimping.

Next, a method for producing the terminal-equipped electric wire 10 will be described. FIG. 5 is a perspective view showing the terminal 1 and the coated conductive wire 11 before crimping. As mentioned above, the terminal 1 includes the terminal body 3 and the crimp part 5. The crimp part 5 includes the conductive wire crimp part 7 and the coating crimp part 9 that are formed as one body in a substantially cylindrical shape. The crimp part 5 may be formed by rolling a plate member, butting end parts thereof to each other, and joining the end parts by welding or brazing in the longitudinal direction, and the terminal 1 may be formed by developing a tube-shaped member. Although the conductive wire crimp part 7 and the coating crimp part 9 may have the same diameter, an inner diameter of the conductive wire crimp part 7 may be substantially uniform and an inner diameter of the coating crimp part 9 may be larger than the inner diameter of the conductive wire crimp part 7 as shown in the drawing.

Figure 6A:
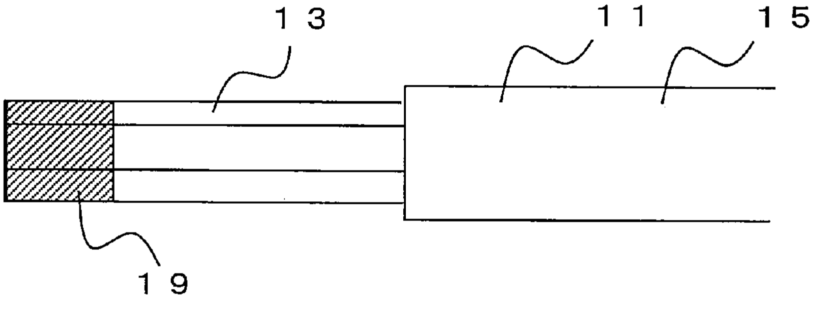
FIG. 6A is a view showing a tip end part of a conductive wire 13.

First, as mentioned above, the coating 15 at the tip end part of the coated conductive wire 11 is peeled off to expose the conductive wire 13 at the tip end part. Next, as shown in FIG. 6A, a processed end part 19 may be formed at the tip end part of the conductive wire 13 before being inserted into the crimp part 5 of the terminal 1. The processed end part 19 is a processed part in which the bare wires of the conductive wire 13 are unified so as not to be separated from one another.

Figure 6B:
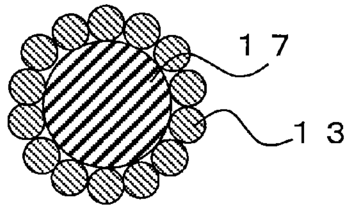
FIG. 6B is a view showing the tip end part of the conductive wire 13 before end processing.

FIG. 6B is a view showing a form of the tip end part of the conductive wire 13 before end processing. In the present embodiment, when viewed from the tip end of the coated conductive wire 11, the tension member 17 is disposed at the substantially center and the conductive wire 13 is disposed on the outer periphery of the tension member 17. The conductive wire 13 is formed of the plurality of bare wires. Although the coated conductive wire having the tension member 17 in the middle is described in the present embodiment, same descriptions apply to other types of coated conductive wires.

Figure 6C:
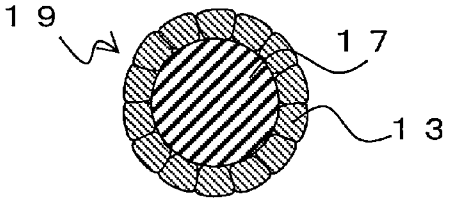
FIG. 6C is a view showing a form of a processed end part 19.

In such the case, as shown in FIG. 6C, the processed end part 19 can be formed by compressing at least the tip end part of the conductive wire 13 from the outer periphery side. Compressing the tip end part of the conductive wire 13 from the outer periphery side in this way can prevent the bare wires from separating from one another and facilitate the insertion into the pipe-shaped crimp part 5.

Figure 6D:
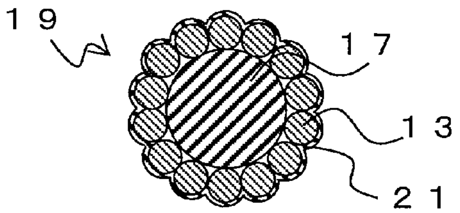
FIG. 6D is a view showing a form of the processed end part 19.

Also, as shown in FIG. 6D, the processed end part 19 may be formed by collectively plating at least the tip end part of the conductive wire 13, forming a plating layer 21. Plating collectively the tip end part of the conductive wire 13 from the outer periphery in this way can prevent the bare wires from separating from one another and facilitate the insertion into the pipe-shaped crimp part 5.

Note that, when plating collectively the tip end part of the conductive wire 13 from the outer periphery, some of the plating methods may cause a temperature rise. If the collective plating is performed on the twisted conductive wire 13 using such the plating method, the heat may deteriorate the tension member 17, which may lower the tensile strength.

Figure 7A:
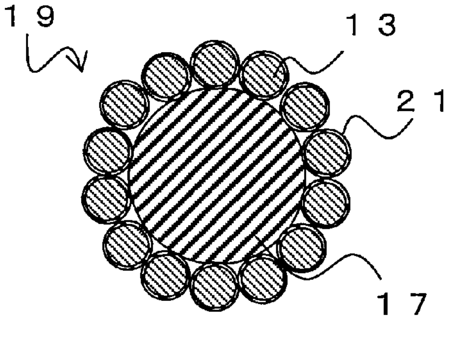
FIG. 7A is a view showing another form of the processed end part 19.
Figure 7B:
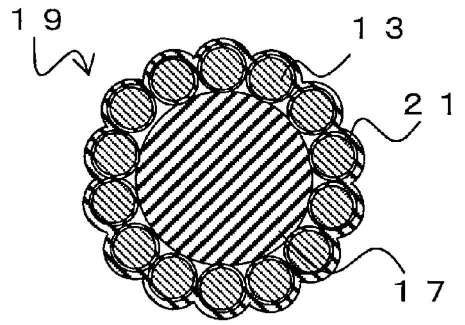
FIG. 7B is a view showing another form of the processed end part 19.

In such the case, as shown in FIG. 7A, the plating layer 21 may be formed for each of the conductors, which are then twisted together on the outer periphery of the tension member 17. Alternatively, as shown in FIG. 7B, the plating layer 21 may be formed for each of the conductors, and then the collective plating process may be further performed on the tip ends of the plurality of conductors from the outer periphery. In such the case, types of plating for the individual conductors and the collective plating may be different. The collective plating enables to prevent separation of the conductors. However, when the bundled conductors are plated collectively, there may be partial variations of thickness of the plating occurring due to influence of shapes or the like of the conductors. The advance preparatory plating for the individual conductor, on the other hand, can reduce such the influence, allowing the collective plating to be substantially uniform.

The method for end processing the processed end part 19 is not limited to compression or plating. For example, soldering or welding the tip end of the conductive wire 13 may be used to prevent separation of the bare wires. Also, a plurality of end processing methods may be used at the same time, e.g., both compression from the outer periphery and the collective plating.

Next, the coated conductive wire 11 with the tip end part being processed as above is inserted into the pipe-shaped crimp part 5 of the terminal 1 from the rear-end side thereof. When the tip end part of the coated conductive wire 11 is inserted into the crimp part 5, the exposed part of the conductive wire 13 is positioned inside the conductive wire crimp part 7, and the coating 15 is positioned inside the coating crimp part 9. At this time, the tip end of the conductive wire 13 may come out of a front end of the conductive wire crimp part 7.

Figure 8A:
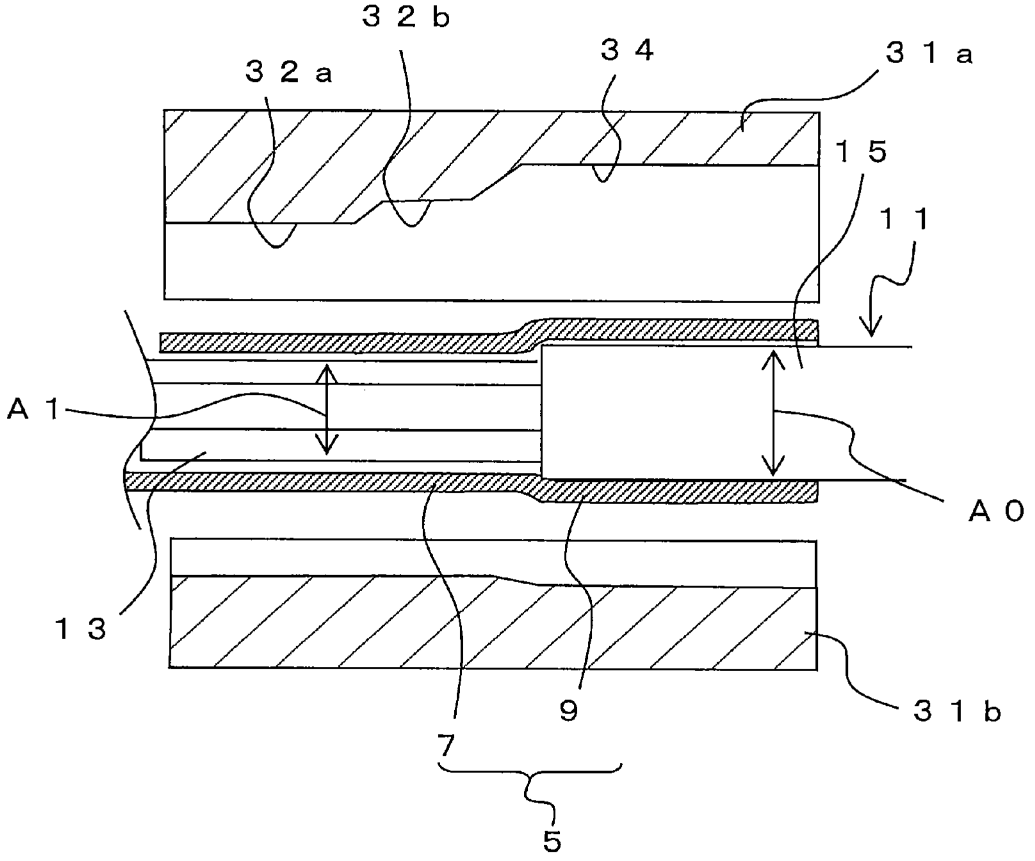
FIG. 8A is a view showing a crimping process at a crimp part 5.
Figure 8B:
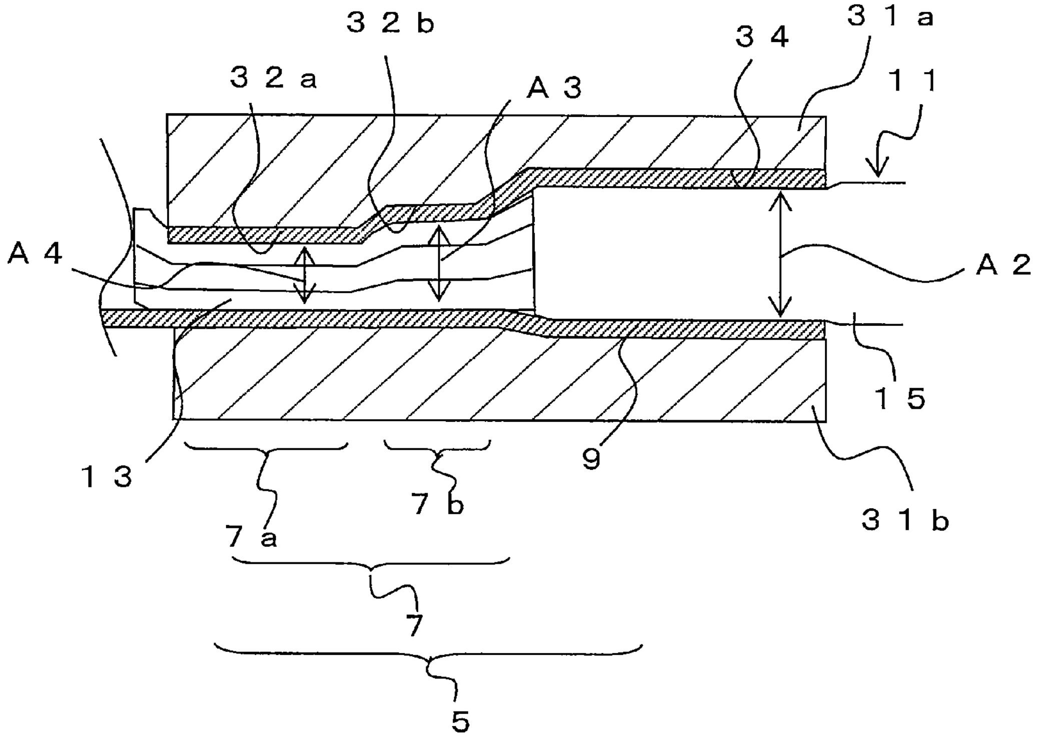
FIG. 8B is a view showing a crimping process at the crimp part 5.

FIG. 8A is a cross-sectional view showing an upper edge 31a, a lower edge 31b, and so on of a terminal crimper for producing the terminal equipped electric wire 10 before crimping, and FIG. 8B is a cross-sectional view showing the crimp part 5 during crimping. The upper edge 31a and the lower edge 31b each has a substantially semicircular column shaped cavity extending in a longitudinal direction. Also, the upper edge 31a includes a coating crimping edge 34 and conductive wire crimping edges 32a and 32b. The coating crimping edge 34 corresponds to the coating crimp part 9 and has a diameter that is slightly smaller than a radius of the coating crimp part 9. The conductive wire crimping edges 32a and 32b correspond to the conductive wire crimp part 7 and each has a smaller diameter than the coating crimping edge 34. That is, the upper edge 31a and the lower edge 31b are formed such that either parts corresponding to the conductive wire crimp part 7 and the coating crimp part 9 have substantially circular cross sections when the terminal 1 is crimped.

The conductive wire crimping edge 32a is an edge that corresponds to the electric wire holding part 7a, and the conductive wire crimping edge 32b is an edge that corresponds to the conductive part 7b. That is, the diameter of the conductive wire crimping edge 32a is smaller than the diameter of the conductive wire crimping edge 32b, and a distance between the upper edge 31a and the lower edge 31b corresponding to the electric wire holding part 7a is smaller than a distance between the upper edge 31a and the lower edge 31b corresponding to the conductive part 7b.

The conductive part 7b may be relatively larger in length compared to the electric wire holding part 7a to achieve conductivity between the coated conductive wire 11 and the terminal 1. The electric wire holding part 7a, on the other hand, may be relatively smaller in length compared to the conductive part 7b because strength between the conductive wire 13 or the tension member 17 and the terminal 1 would be sufficiently large if both are closely in contact with each other with appropriate pressure being applied with certainty.

As shown in FIG. 8B, the upper edge 31*a* and the lower edge 31*b* are engaged together to compress the crimp part 5 so that the conductive wire crimp part 7 is crimped to the conductive wire 13 and the coating crimp part 9 is crimped to the coating 15. At this time, the electric holding part 7*a* has the smallest diameter, the conductive part 7*b* has the second-smallest diameter, and the coating crimp part 9 has the largest diameter. In this way, the terminal-equipped electric wire 10 can be obtained. Furthermore, a wire harness, which is a unified body of a plurality of terminal-equipped electric wires including the obtained terminal-equipped electric wire 10, can be obtained.

As mentioned above, the compression rate at the electric wire holding part 7*a* is smaller than the compression rate at the conductive part 7*b*, and the compression rate at the coating crimp part 9 is smaller than the compression rate at the conductive part 7*b*. Here, the compression rate at the coating crimp part 9 is A2/A0(%), wherein A0 refers to an area of a cross section of the coating 15 (a total cross-sectional area within the outer periphery surface of the coating crimp part 9) before crimping process and A2 refers to an area of a cross section inside the coating crimp part 9 after being compressed by the upper edge 31*a* and the lower edge 31*b*.

Similarly, the compression rate at the electric wire holding part 7*a* is A4/A1 (%) and the compression rate at the conductive part 7*b* is A3/A1 (%), wherein A1 refers to an area of a cross section of the conductive wire 13 (a total cross-sectional area of the conductive wire 13 including the tension member if the conductive wire 13 includes the tension member) before crimping process, and A3 and A4 refer to areas of cross sections inside the conductive part 7*b* and the electric wire holding part 7*a* (the total cross-sectional area of the conductive wire 13 including the tension member if the conductive wire 13 includes the tension member), respectively, after being compressed by the upper edge 31*a* and the lower edge 31*b*. In a case in which the entire conductive wire crimp part 7 is to be compressed under a uniform condition, either one of the conductive wire crimping edges 32*a* and 32*b* is necessary.

The tension member 17 has a relatively higher strength compared to the conductive wire 13 and is hard to deform. Thus, at the time of compression, the cross-sectional area of the tension member 17 does not decrease largely and deformation of the conductive wire 13 (decrease in the cross-sectional area) progresses mainly.

Here, if the tension member 17 is formed of the plurality of bare wires, each bare wire is thin compared to the conductors forming the conductive wire 13, and it is difficult to clearly distinguish the tension member bare wires from spaces between the tension member bare wires. For this reason, an area of a region of the tension member surrounded by the conductive wire 13 is taken as the cross-sectional area of the tension member 17 before crimping. In such the case, deformation of the conductive wire 13 progresses as the tension member deforms by reducing the spaces between the tension member bare wires in early stages of the compression, and then, in later stages of the compression, reduction in the cross section of the conductive wire 13 mainly progresses with very little reduction in the cross-sectional area of the tension member. Thus, the compression rate of the conductive wire 13 after crimping is no more than the apparent compression rate of the region where the tension member 17 is disposed. An area ratio of the conductive wire 13 and the tension member 17 after compression varies depending on the compression rate of the entire electric wire.

Also, the tension member bare wires move at the time of compression. This makes an outer shape of the tension member 17 uneven, thereby increasing contacting areas between the conductive wire 13 and the tension member 17, which increases frictional force. For this reason, when being pulled, force can be easily transmitted from the conductive wire 13 to the tension member 17 and thus the strength when a pulling force is applied to the conductive wire 13 is expected to increase.

Since an amount of deformation of the tension member 17 is small compared to that of the conductive wire 13, fracture of the tension member 17 due to the reduction in the cross-sectional area is unlikely to occur. In particular, the tension member 17 does not suffer damages since the conductive wire crimp part 7 is in a pipe shape and the conductive wire 13 is compressed from the entire periphery, and the conductive member 13 is disposed between the tension member 17 and the conductive wire crimp part 7 and the tension member 17 and the conductive wire crimp part 7 are not in contact with each other.

At the time of compression, there are some cases in which a part of the bare wires forming the tension member 17 enters into the conductive wire 13 and a part of the tension member 17 comes into contact with the conductive wire crimp part 7. As mentioned above, although it is preferable that the tension member 17 and the conductive wire crimp part 7 are not in contact with each other, the part of the tension member 17 may slightly be in contact with the conductive wire crimp part 7. For example, damage prevention effects for the tension member 17 can be obtained if, on any cross sections, a circumferential length of the tension member 17 that is in contact with the conductive wire crimp part 7 is 30% or less of the entire outer circumferential length of the tension member 17.

As described above, according to the present embodiment, since the conductive wire crimp part 7 includes the electric wire holding part 7*a* and the conductive part 7*b*, the electric wire holding part 7*a* can be crimped with the compression rate that is appropriate to achieve the connection strength, and the conductive part 7*b* can be crimped with the compression rate that is appropriate to achieve the conduction. That is, it is possible to make the compression rates (amounts of compression) at the electric wire holding part 7*a* and the conductive part 7*b* different from each other, and each part can be crimped with the compression rate that is appropriate for its purpose.

In more detail, having the front-end side (on the side of the terminal body 3) of the conductive wire crimp part 7 as the electric wire holding part 7*a* enables further stronger crimping, thereby enhancing the connection strength. At this time, a part of the conductive wire 13 may fracture. The conductive part 7*b*, on the other hand, is disposed on the rear-end side of the conductive wire crimp part 7 (on the side of the coating 15), and thus conduction between the coated conductive wire 11 and the terminal 1 can be achieved even with a part of the conductive wire 13 being fractured at the electric wire holding part 7*a*.

Also, the crimping operation can be performed similarly as the operation for crimping a conventional terminal-equipped electric wire, and thus the operation is easy. In particular, the method can be applied to the coated conductive wire 11 including the tension member 17. In such the case, the coated conductive wire 11 having a thin diameter can have the high connection strength. For example, with the cross-sectional area of the conductive wire 13 as small as 0.05 sq or less, the tensile strength of the conductive wire 13 at the electric wire holding part 7*a* of 50 N or more can be achieved.

At this time, since both the tension member 17 and the conductive wire 13 are collectively crimped at the electric wire holding part 7*a*, there is no need to crimp the tension member 17 and the conductive wire 13 separately and thus the crimping operation is easy. For the case of the coated conductive wire 11 including the tension member 17, the tension member is disposed at the substantial center of the cross section and the conductive wire 13 is disposed on the outer periphery of the tension member 17. This enables to crimp together the terminal 1 and the conductive wire 13 with certainty when crimped and to make the terminal 1 and the conductive wire 13 in contact with each other.

Also, since the conductive wire crimp part 7 is in a substantially cylindrical shape, the conductive wire 13 can be crimped from the entire 360° circumference with certainty. This can eliminate local stress (deformation) applied onto the conductive wire 13 at the time of crimping.

Here, when the coated conductive wire 11 having the conductive wire 13 arranged around the tension member 17 is crimped at the conductive wire crimp part 7, compression stress is applied in the diameter direction on the inner part of the conductive wire crimp part 7. If the compression stress is small, friction force at the contacting surface between the conductive wire 13 and the tension member 17 is smaller than friction force at the contacting surface between the terminal 1 and the conductive wire 13. For this reason, if a tensile load is applied to the terminal-equipped electric wire 10, the load concentrates on the conductive wire 13 and the conductive wire 13 is likely to fracture.

On the other hand, there may be slippage at the contacting surface between the conductive wire 13 and the tension member 17 without the compression stress being applied to the tension member 17. Thus, there may be a phenomenon in which the tension member 17 comes out without being cut, where the tensile strength by the tension member 17 is not fully exploited. To prevent the above phenomenon and to achieve sufficient compression stress by crimping, the friction force between the conductive wire 13 and the tension member 17 may be increased. For example, providing an uneven inner surface for the conductive wire crimp part 7 can improve the compression stress partly onto the tension member 17, thereby preventing the coming-out of the tension member 17.

Furthermore, in a case, like the present embodiment, in which the conductive wire crimp part 7 is in a tubular shape having the joint part being brazed, the compression stress onto the conductive wire 13 is small at the brazed part where hardness is low and thus the tension member 17 is likely to be pulled out. Thus, it is preferable to eliminate the brazed part, or, alternatively, the joint part formed on the conductive wire crimp part 7 preferably has no brazed part and has the same hardness as the material used for the conductive wire crimp part 7.

Second Embodiment

Figure 9:
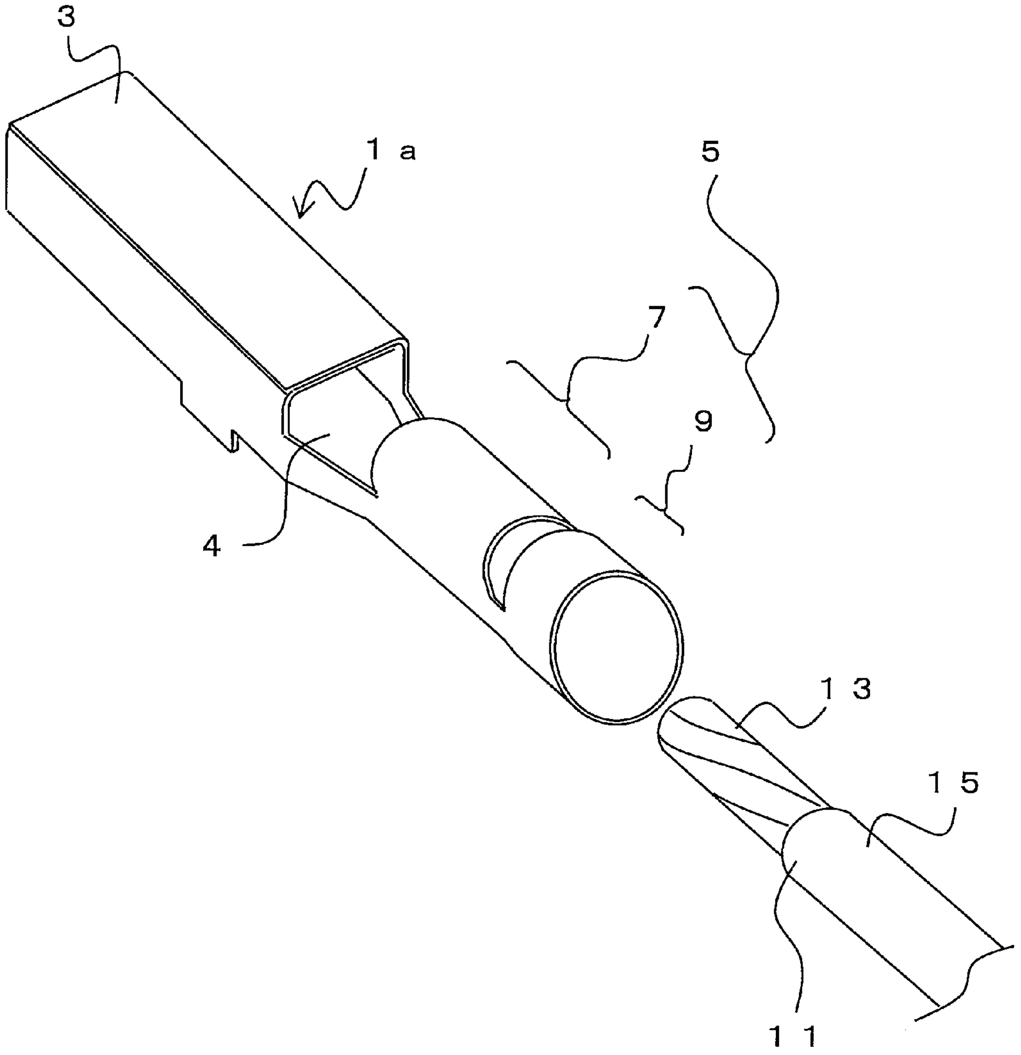
FIG. 9 is a view showing a terminal 1*a* and the coated conductive wire 11 before crimping.

Next, a second embodiment will be described. FIG. 9 is a perspective view of a terminal 1*a* according to the second embodiment before crimping. In the descriptions below, the same notations used in FIG. 1 to FIG. 8B will be used for the structures having the same functions as in the first embodiment, and redundant descriptions will be omitted.

The terminal 1*a* has approximately the same configuration as the terminal 1 except that the crimp part 5 has a different shape. There is a slit formed between the conductive wire crimp part 7 and the coating crimp part 9 of the terminal 1*a*. That is, the conductive wire crimp part 7 and the coating crimp part 9 are formed being separated from each other.

The terminal 1*a* can be crimped similarly as the terminal 1. In such the case, the terminal 1*a* is crimped with the end part of the coating 15 being positioned at the slit part between the conductive wire crimp part 7 and the coating crimp part 9. In this way, the same effects as in the first embodiment can be obtained by crimping the conductive wire crimp part 7 with the electric wire holding part 7*a* and the conductive part 7*b* being formed.

Third Embodiment

Figure 10:
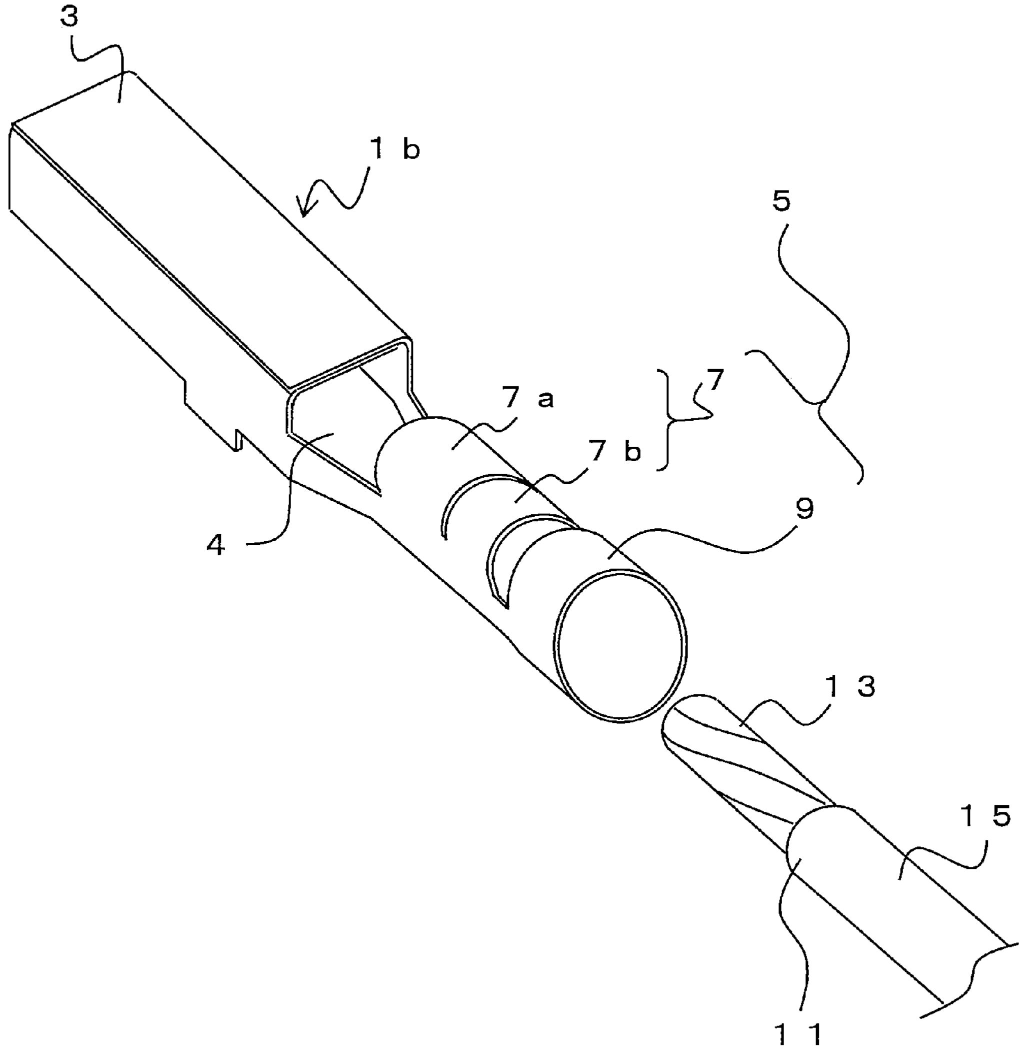
FIG. 10 is a view showing a terminal 1*b* and the coated conductive wire 11 before crimping.

Next, a third embodiment will be described. FIG. 10 is a perspective view of a terminal 1*b* according to the third embodiment before crimping. The terminal 1*b* has approximately the same configuration as the terminal 1*a* except that the crimp part 5 has a different shape. Before crimping, the terminal 1*b* has the electric wire holding part 7*a* provided on the front-end side of the conductive wire crimp part 7, and the conductive part 7*b* formed on the rear-end side of the conductive wire crimp part 7 to achieve conduction with the conductive wire, and the electric wire holding part 7*a* and the conductive part 7*b* are divided by a slit. In such the case, the electric wire holding part 7*a* and the conductive part 7*b* may have the different diameters.

The terminal 1*b* can be crimped similarly as the terminal 1 and so on. In this way, the same effects as in the first embodiment can be obtained by crimping the conductive wire crimp part 7 with the electric wire holding part 7*a* and the conductive part 7*b* being formed.

Fourth Embodiment

Figure 11:
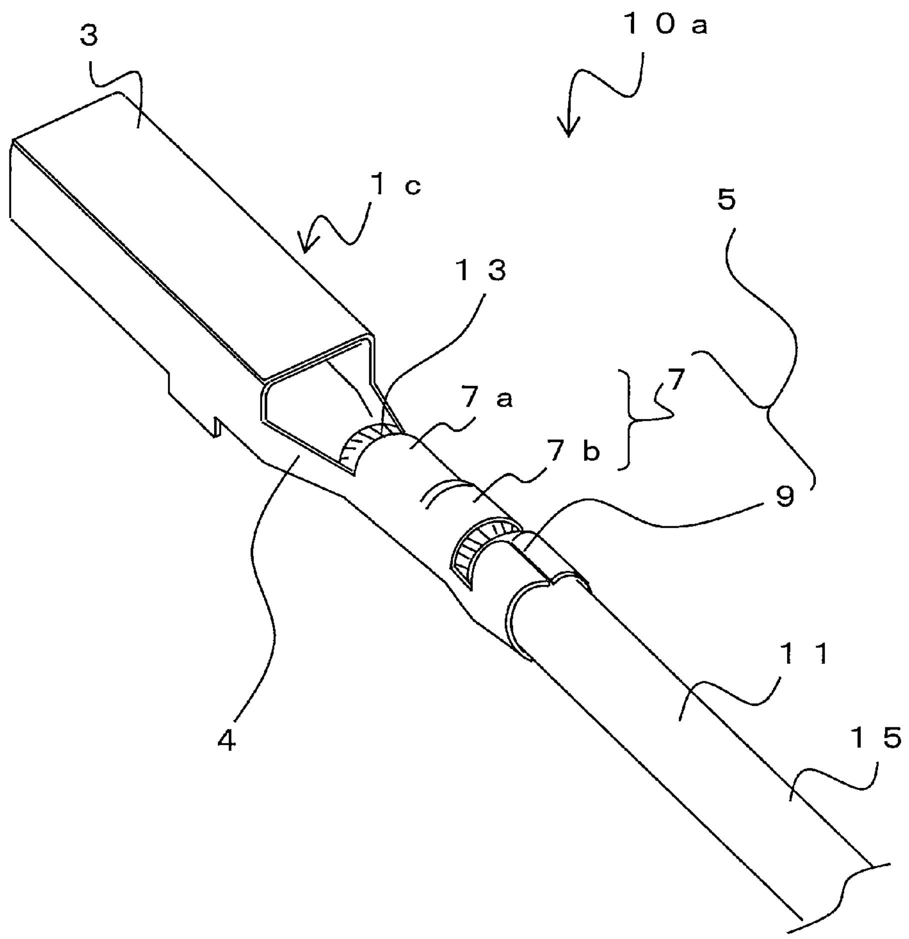
FIG. 11 is a perspective view showing a terminal-equipped electric wire 10*a*.

Next, a fourth embodiment will be described. FIG. 11 is a perspective view showing a terminal-equipped electric wire 10*a*. The conductive wire crimp part 7 of a terminal 1*c* in the present embodiment is in a pipe shape being closed in a circumference direction (substantially a cylindrical shape), and the coating crimp part 9 is in an open barrel shape.

Also in such the case, the electric wire holding part 7*a* having a relatively strong holding force for the conductive wire 13 is provided on the front-end side of the conductive wire crimp part 7 (on the terminal body 3 side). Also, the conductive part 7*b* is formed on the rear-end side of the conductive wire crimp part 7 (on the side of the coating crimp part 9) to achieve conduction with the conductive wire 13. That is, the conductive wire crimp part 7 includes the electric wire holding part 7*a* and the conductive part 7*b*.

Also in such the case, as mentioned above, the compression rate at the coating crimp part 9 (the cross-sectional area of the coating 15 after crimping/the cross-sectional area of the coating 15 before crimping) may be smaller than the compression rate at the conductive part 7*b*. That is, the amount of compression at the coating crimp part 9 may be larger than the amount of compression at the conductive part 7*b*. Also, the outer diameter of the coating crimp part 9 is larger than the outer diameter of the conductive part 7*b* due to the thickness of the coating 15. The conductive wire crimp part 7 may not be separated into the electric wire holding part 7*a* and the conductive part 7*b*, and may be crimped by the uniform compression rate.

Figure 12:
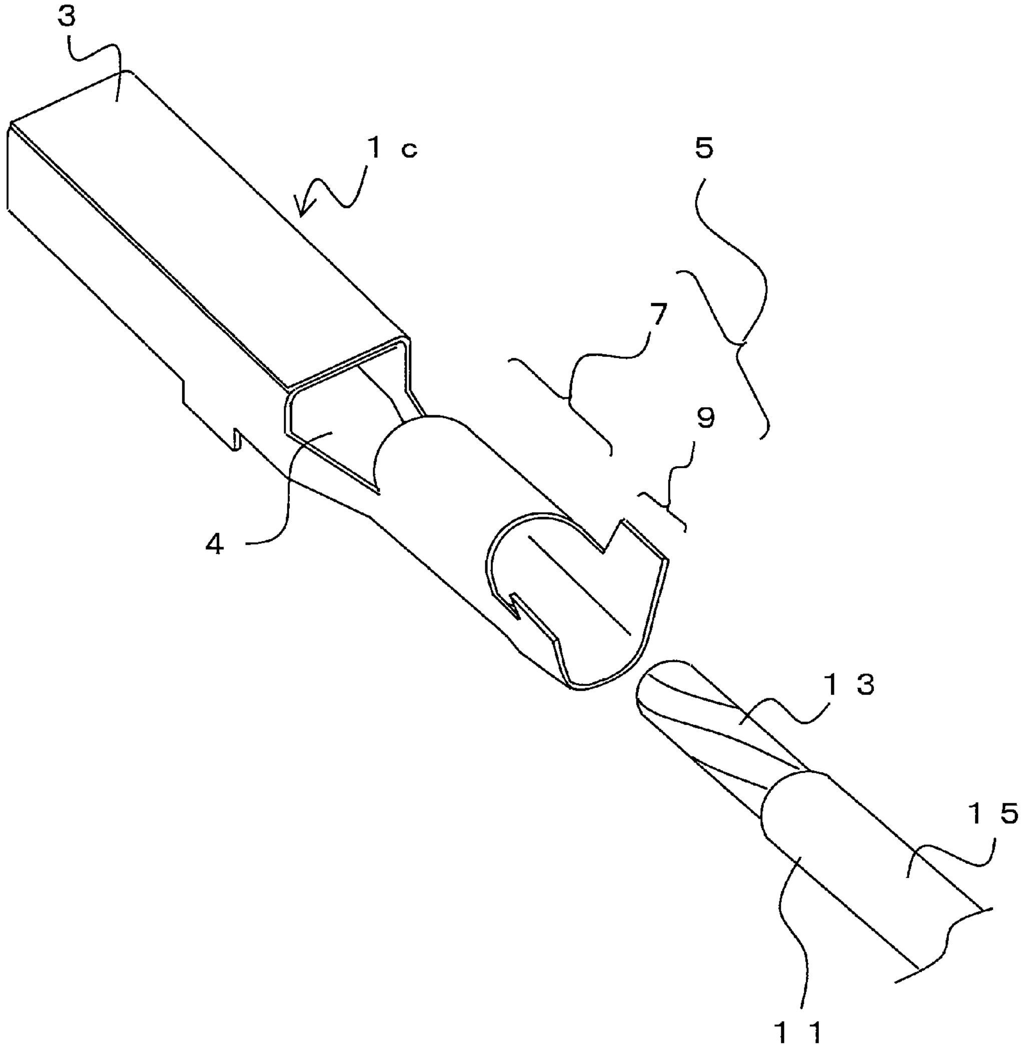
FIG. 12 is a view showing a terminal 1*c* and the coated conductive wire 11 before crimping.

Next, a method for producing the terminal-equipped electric wire 10*a* will be described. FIG. 12 is a perspective view showing the terminal 1*c* and the coated conductive wire 11 before crimping. As mentioned above, the terminal 1*c* includes the terminal body 3 and the crimp part 5. The conductive wire crimp part 7 is in a pipe shape being closed in a circumference direction, and the coating crimp part 9 is in an open barrel shape opening upward.

First, as mentioned above, the coating 15 at the tip end part of the coated conductive wire 11 is peeled off to expose the conductive wire 13 at the tip end part. At this time, any of the various types of the above-mentioned processed end part 19 may be formed at the tip end part of the conductive wire 13 before being inserted into the crimp part 5 of the terminal 1*c*.

Figure 13A:
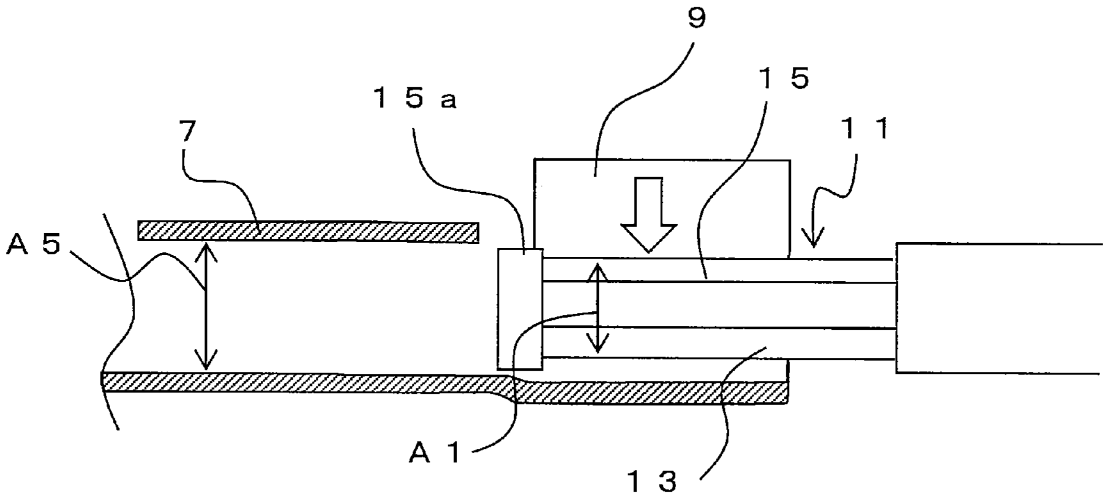
FIG. 13A is a view showing a process of inserting the conductive wire 13 into a conductive wire crimp part 7.

Also, when removing the coating 15 at the tip end of the coated conductive wire 11, a part of the coating 15 may be left without being removed completely. FIG. 13A is a view showing a state in which a coating 15*a*, which is a part of the coating 15, is left at the tip end of the conductive wire 13. The conductive wire 11 with the coating 15*a* remaining at the tip end part or with the processed end part 19 formed at the tip end part as above is disposed onto the crimp part 5. At this time, since the coating crimp part 9 is an open-barrel type, the conductive wire 13 of the coated conductive wire 11 can be disposed from the upper part of the coating crimp part 9. Disposing the conductive wire 13 onto the coating crimp part 9 enables positioning of the conductive wire 13 (positioning of the coated conductive wire 11 in regard to a width direction of the terminal 1).

Figure 13B:
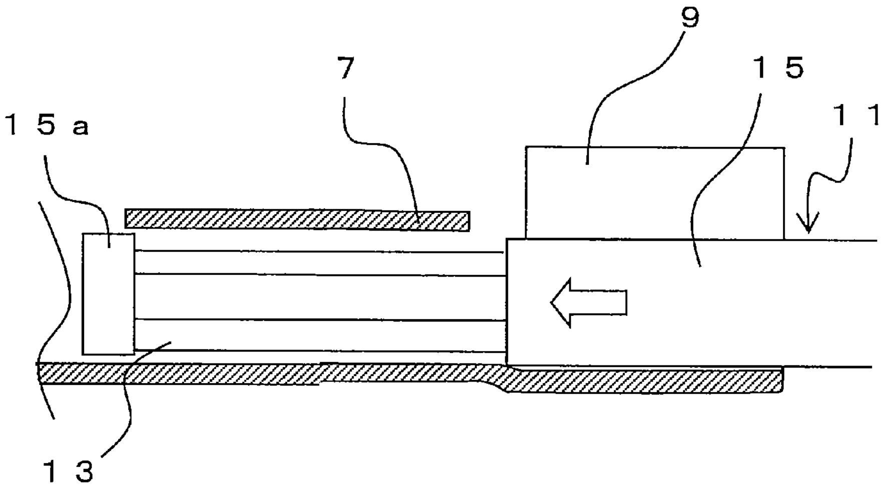
FIG. 13B is a view showing a process of inserting the conductive wire 13 into the conductive wire crimp part 7.

From the above state, as shown in FIG. 13B, the conductive wire 11 then slides toward a side of the conductive wire crimp part 7 of the terminal 1*c* so that the conductive wire 13 can be easily inserted into the pipe-shaped conductive wire crimp part 7. As above, the positioning of the conductive wire 13 to the conductive wire crimp part 7 is possible, and thus the conductive wire 13 can be easily inserted into the conductive wire crimp part if an inner diameter of the conductive wire crimp part 7 before crimping is as small as an outer diameter of the conductive wire 13. For example, the conductive wire 13 can be easily inserted into the conductive wire crimp part 7 in a case in which the cross-sectional area inside the coating 15 (A1 in FIG. 13A) is 40% or more of the cross-sectional area of an insertion part of the conductive wire crimp part 7 before crimping (A5 in FIG. 13A). Also, by forming the processed end part 19 or leaving the coating 15*a* as mentioned above, the conductive wire 13 can be easily inserted into the conductive wire crimp part 7 in a case in which the cross-sectional area inside the coating 15 (A1 in FIG. 13A) is 70% or more of the cross-sectional area of the insertion part of the conductive wire crimp part 7 before crimping (A5 in FIG. 13A). This enables to downsize the terminal 1*c*.

Figure 13C:
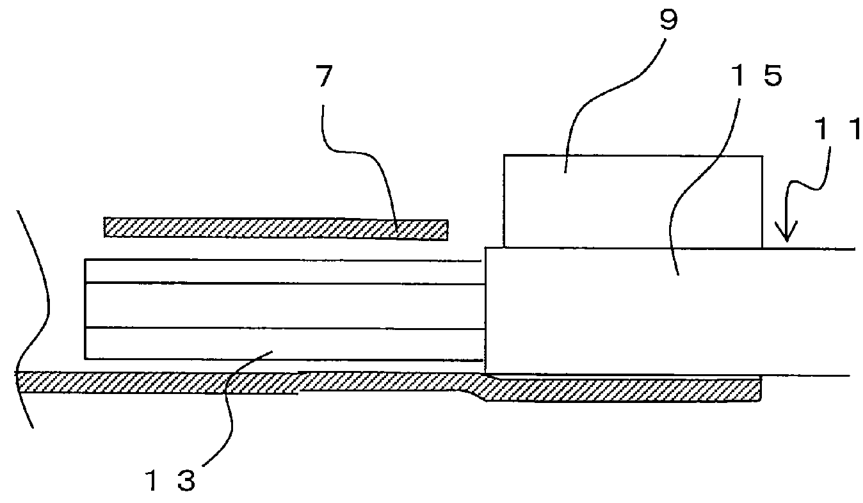
FIG. 13C is a view showing a process of inserting the conductive wire 13 into the conductive wire crimp part 7.

If the conductive wire 13 is inserted into the conductive wire crimp part 7 with a part of the coating 15 (the coating 15*a*) being left at the tip end, the coating 15*a* at the tip end of the conductive wire 13 is removed before crimping as shown in FIG. 13C. As above, the coated conductive wire 11 can be disposed at an appropriate position on the crimp part 5. When the tip end part of the coated conductive wire 11 is inserted into the crimp part 5, the exposed part of the conductive wire 13 is positioned inside the conductive wire crimp part 7, and the coating 15 is positioned inside the coating crimp part 9. At this time, the tip end of the conductive wire 13 may come out of the front end of the conductive wire crimp part 7.

Figure 14A:
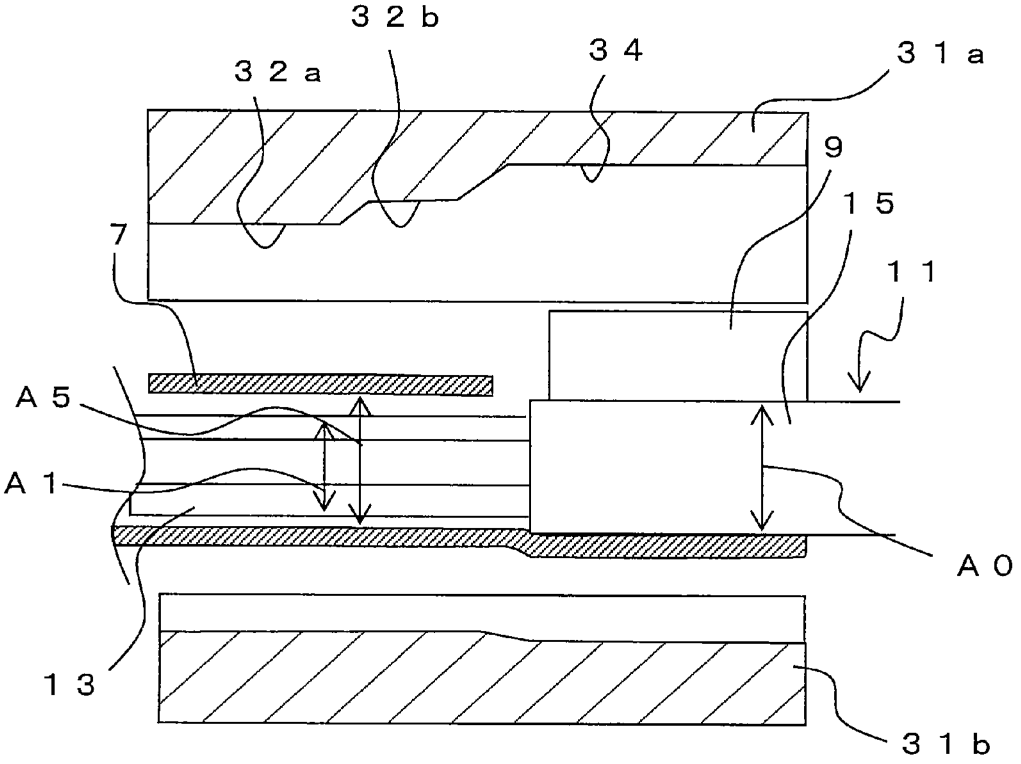
FIG. 14A is a view showing a crimping process at the crimp part 5.
Figure 14B:
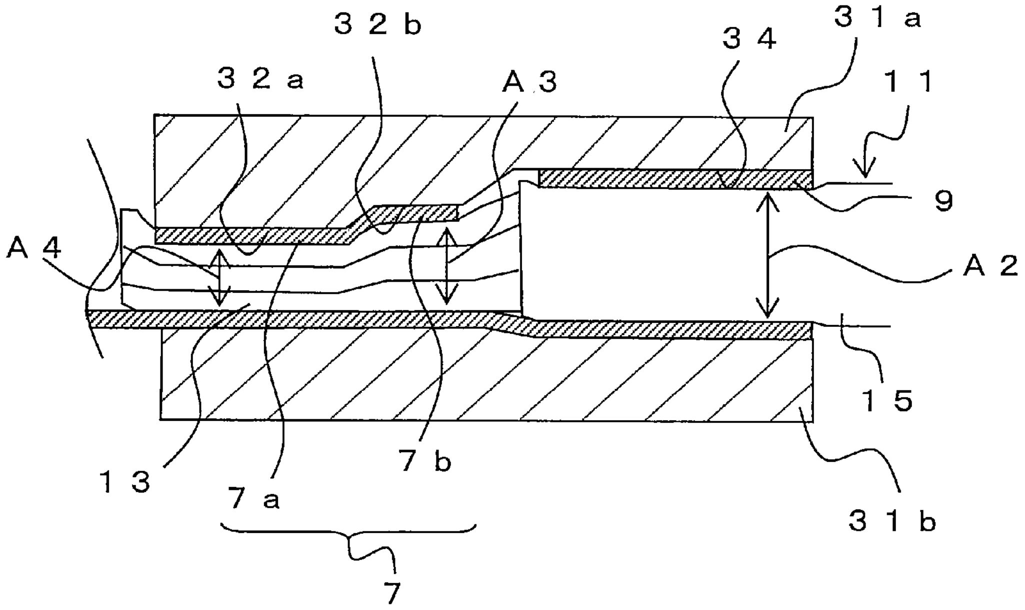
FIG. 14B is a view showing a crimping process at the crimp part 5.

Next, the terminal 1*c* in which the coated conductive wire 11 is disposed on the crimp part 5 is set between the edges of a crimper. FIG. 14A is a cross-sectional view of the upper edge 31*a*, the lower edge 31*b*, and so on of a terminal crimper for producing the terminal equipped electric wire 10*a* before crimping, and FIG. 14B is a cross-sectional view showing the crimp part 5 during crimping. In the present embodiment, the upper edge 31*a* and the lower edge 31*b* each has a substantially semicircular-column shaped cavity extending in a longitudinal direction. Also, the upper edge 31*a* includes the coating crimping edge 34 and the conductive wire crimping edges 32*a* and 32*b*. The coating crimping edge 34 corresponds to the coating crimp part 9 and has a shape that corresponds to the open-barrel shape of the coating crimp part 9. The conductive wire crimping edges 32*a* and 32*b* correspond to the conductive wire crimp part 7. The upper edge 31*a* and the lower edge 31*b* are formed such that the part corresponding to the coating crimp part 9 is formed in a shape that corresponds to the crimped open-barrel shape, and the part corresponding to the conductive wire crimp part 7 is formed to have a substantially circular cross section after crimping.

Also in the present embodiment, the conductive wire crimping edge 32*a* is an edge that corresponds to the electric wire holding part 7*a*, and the conductive wire crimping edge 32*b* is an edge that corresponds to the conductive part 7*b*. That is, the diameter of the conductive wire crimping edge 32*a* is smaller than the diameter of the conductive wire crimping edge 32*b*, and the distance between the upper edge 31*a* and the lower edge 31*b* corresponding to the electric wire holding part 7*a* is smaller than the distance between the upper edge 31*a* and the lower edge 31*b* corresponding to the conductive part 7*b*.

As shown in FIG. 14B, the upper edge 31*a* and the lower edge 31*b* are engaged together to compress the crimp part 5 so that the conductive wire crimp part 7 is crimped to the conductive wire 13 and the coating crimp part 9 is crimped to the coating 15. At the pipe-shaped conductive wire crimp part 7, the conductive wire 13 is crimped into a substantially circular shape; and at the open-barrel type coating crimp part 9, at an upper part of the coating crimp part 9, a pair of facing barrel pieces are butted to each other at a substantial center of the width direction and are folded toward the inner side of the coating crimp part 9, crimping the coating 15. At this time, the electric holding part 7*a* has the smallest diameter, the conductive part 7*b* has the second-smallest diameter, and the coating crimp part 9 has the largest diameter. In this way, the terminal-equipped electric wire 10*a* can be obtained. Furthermore, a wire harness, which is a unified body of a plurality of terminal-equipped electric wires including the obtained terminal-equipped electric wire 10*a*, can be obtained.

According to the fourth embodiment, the same effects as in the first embodiment can be obtained by crimping the conductive wire crimp part 7 with the electric wire holding part 7*a* and the conductive part 7*b* being formed. Also, in the terminal 1*c*, the conductive wire crimp part 7 and the coating crimp part 9 are in different shapes: the conductive wire crimp part 7 is in a pipe shape and the coating crimp part 9 is an open-barrel type. As above, the coating crimp part 9 may be an open-barrel type instead of in a pipe shape. The terminal 1*c* can be crimped similarly as the terminal 1 and so on.

Also, since the coating crimp part 9 is an open-barrel type, it is easy to dispose the coated conductive wire 11 onto the crimp part 5. Also, since positioning of the coated conductive wire 11 in the coating crimp part 9 in regard to the conductive wire crimp part 7 is easy, the conductive wire 13 can be easily inserted into the pipe-shaped conductive wire crimp part 7. Also, since the conductive wire crimp part 7 is in a pipe shape, the conductive wire 13 can be crimped from the entire 360° circumference with certainty. Also, the conductive wire 13 can be inserted into the small-diameter conductive wire crimp part 7, and this can downsize the terminal after crimping. This, as a result, facilitates insertion of the terminal into a connector.

Also, forming the processed end part 19 or leaving the coating 15*a* can prevent the conductive wire 13 from loosening when the conductive wire 13 is inserted into the conductive wire crimp part 7.

Fifth Embodiment

Figure 15:
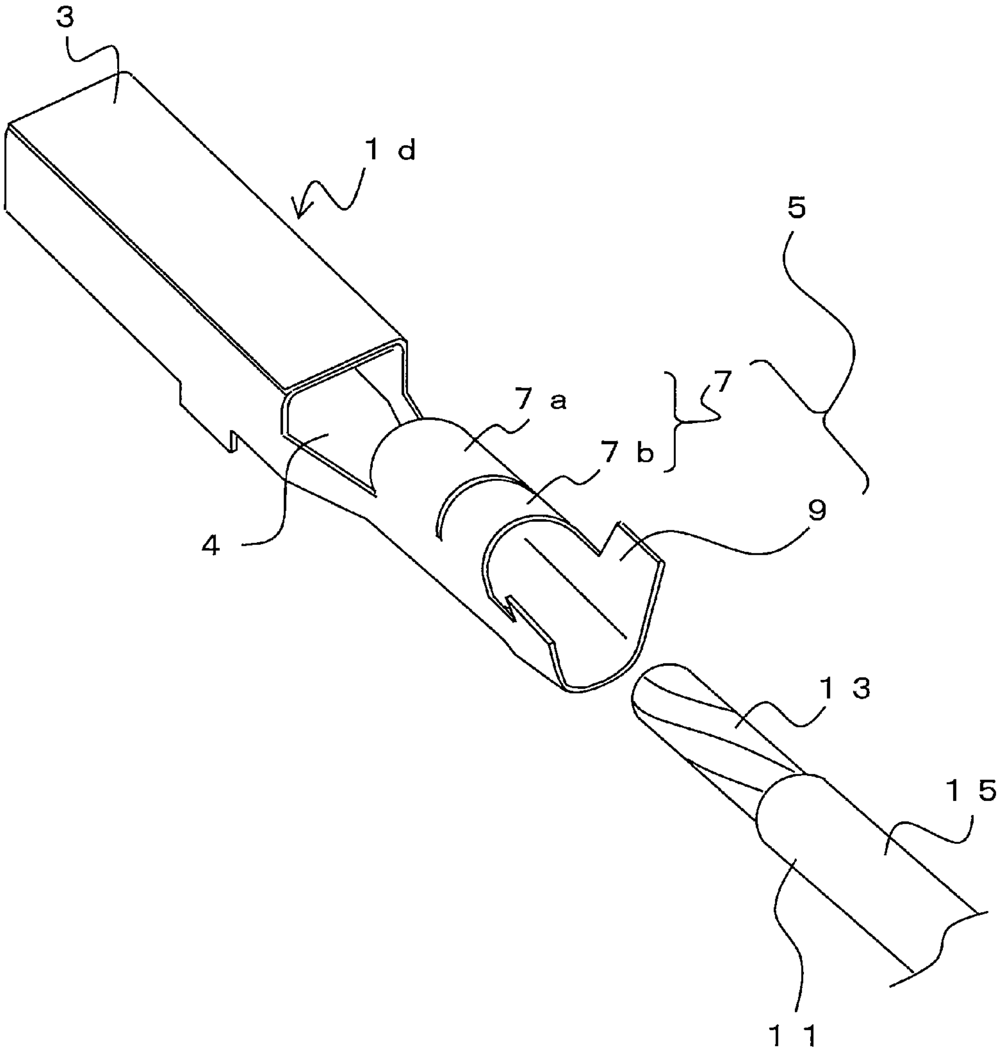
FIG. 15 is a view showing a terminal 1*d* and the coated conductive wire 11 before crimping.

Next, a fifth embodiment of the present invention will be described. FIG. 15 is a perspective view of a terminal 1*d* according to the fifth embodiment before crimping. The terminal 1*d* has approximately the same configuration as the terminal 1*c* except that the crimp part 5 has a different shape. The terminal 1*d* has a slit formed in the pipe-shaped conductive wire crimp part 7 between the electric wire holding part 7*a* and the conductive part 7*b*. That is, before crimping, the electric wire holding part 7*a* and the conductive part 7*b* are formed being separated from each other. In such the case, the electric wire holding part 7*a* and the conductive part 7*b* may have the different diameters.

The terminal 1*d* can be crimped similarly as the terminal 1 and so on. In this way, the same effects as in the first embodiment can be obtained by crimping the conductive wire crimp part 7 with the electric wire holding part 7*a* and the conductive part 7*b* being formed.

If the conductive wire crimp part 7 is divided into the electric wire holding part 7*a* and the conductive part 7*b*, the conductive part 7*b* may also be in an open-barrel type and only the electric wire holding part 7*a* may be in a pipe shape. As above, if at least a part of the conductive wire crimp part 7 is in a pipe shape being closed in the circumferential direction, the remaining parts may be the open-barrel type.

Sixth Embodiment

Figure 16:
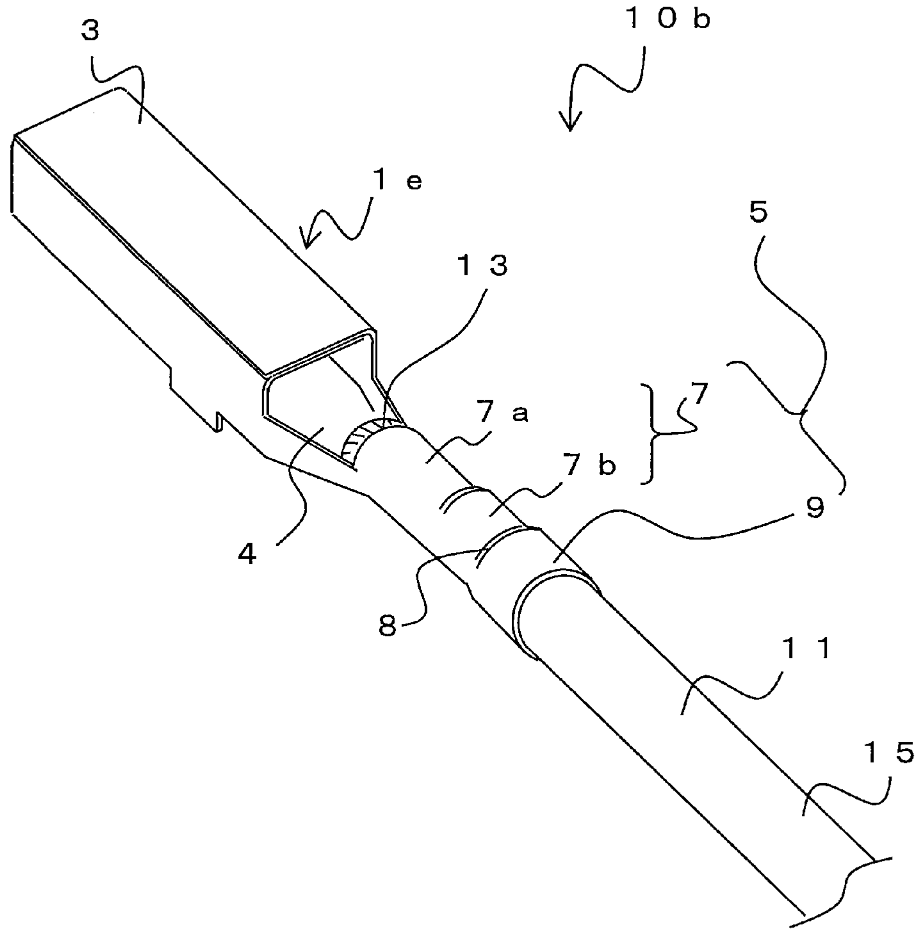
FIG. 16 is a perspective view showing a terminal-equipped electric wire 10*b*.

Next, a sixth embodiment will be described. FIG. 16 is a perspective view showing a terminal-equipped electric wire 10*b* according to the sixth embodiment. In the present embodiment, the conductive wire crimp part 7 and the coating crimp part 9 are pipe-shaped and closed in the circumference direction (substantially a cylindrical shape).

The conductive wire positioning part 8 is formed at least at a part between the coating crimp part 9 and the conductive wire crimp part 7. The conductive wire positioning part 8 becomes smaller in size (the height) toward the front-end side (the side of the conductive wire crimp part 7). The tip end of the coating 15 comes into contact with an inner surface of the conductive wire positioning part 8 so that an insertion margin of the conductive wire 13 into the conductive wire crimp part 7 is restricted. The insertion process of the conductive wire 13 will be described in detail below.

Also in the present embodiment, the electric wire holding part 7*a* having a relatively strong holding force for the conductive wire 13 is provided on the front-end side of the conductive wire crimp part 7 (on the terminal body 3 side). Also, the conductive part 7*b* is formed on the rear-end side of the conductive wire crimp part 7 (on the side of the coating crimp part 9) to achieve conduction with the conductive wire 13. That is, the conductive wire crimp part 7 includes the electric wire holding part 7*a* and the conductive part 7*b*. The electric wire holding part 7*a* and the conductive part 7*b* may be separated by a slit or the like. Also, the conductive wire crimp part 7 may not be separated into the electric wire holding part 7*a* and the conductive part 7*b*, and may be crimped by the uniform compression rate.

Figure 17:
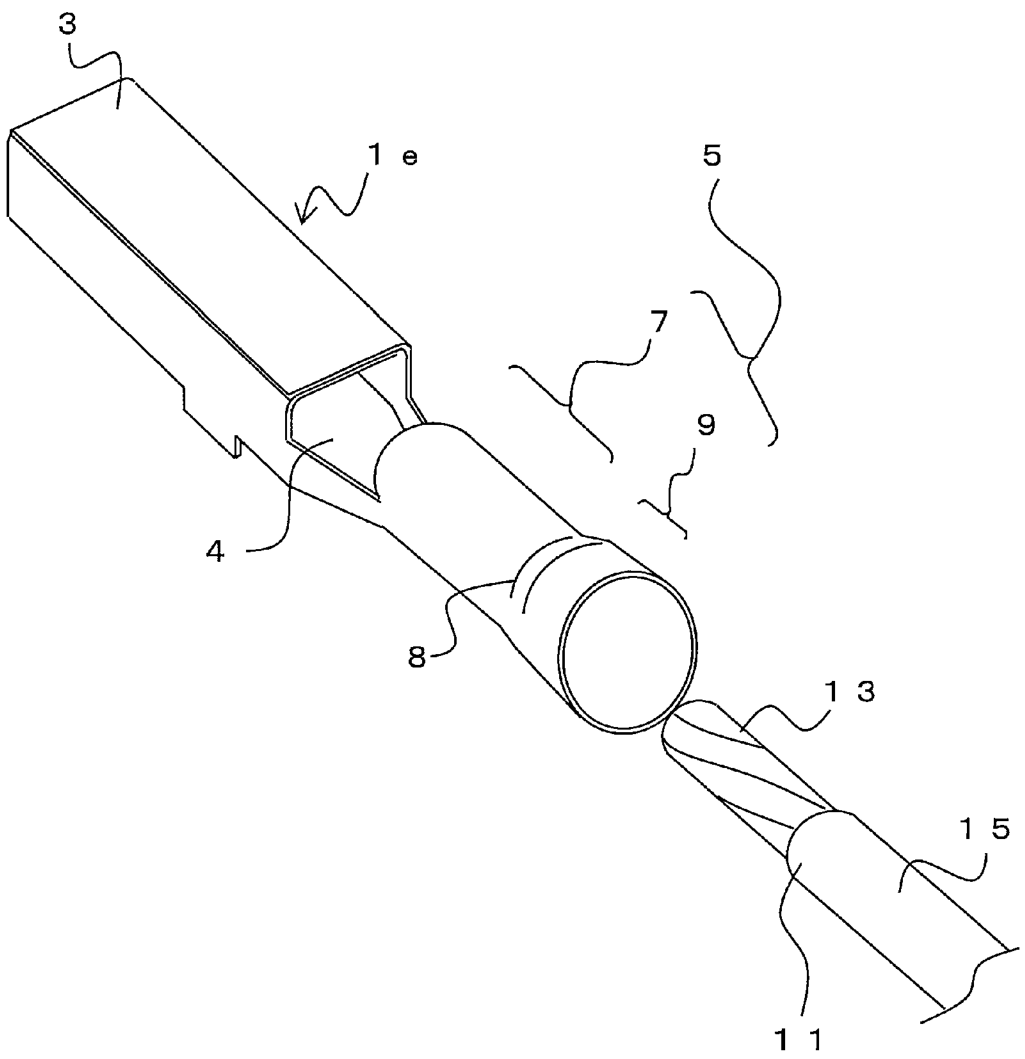
FIG. 17 is a view showing a terminal 1*e* and the coated conductive wire 11 before crimping.

Next, a method for producing the terminal-equipped electric wire 10*b* will be described. FIG. 17 is a perspective view showing a terminal 1*e* and the coated conductive wire 11 before crimping. As mentioned above, the terminal 1*e* includes the terminal body 3 and the crimp part 5.

First, as mentioned above, the coating 15 at the tip end part of the coated conductive wire 11 is peeled off to expose the conductive wire 13 at the tip end part. The processed end part 19 may be formed at the tip end part of the conductive wire 13 before being inserted into the crimp part 5 of the terminal 1*e*.

Figure 18A:
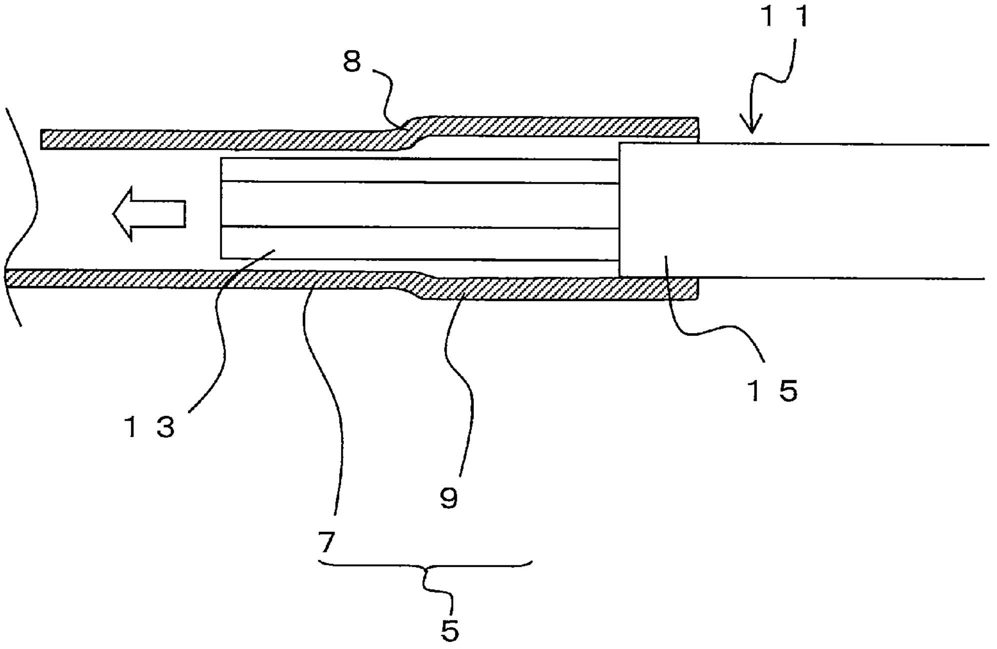
FIG. 18A is a view showing a process of inserting the conductive wire 13 into the conductive wire crimp part 7.

FIG. 18A is a vertical cross-sectional view showing a process of inserting the coated conductive wire 11 from the rear end of the crimp part 5. The inner diameter of the coating crimp part 9 is larger than the outer diameter of the coating 15. Also, a height of the coating crimp part 9 is greater than that of the conductive wire crimp part 7. That is, the conductive wire positioning part 8 of which the height decreases toward the conductive wire crimp part 7 is formed between the coating crimp part 9 and the conductive wire crimp part 7. The conductive wire positioning part 8 may be formed in the width direction instead of in the height direction, or may be formed in both directions. That is, the conductive wire positioning part 8 is formed such that the size thereof decreases from the coating crimp part 9 toward the front-end side.

Figure 18B:
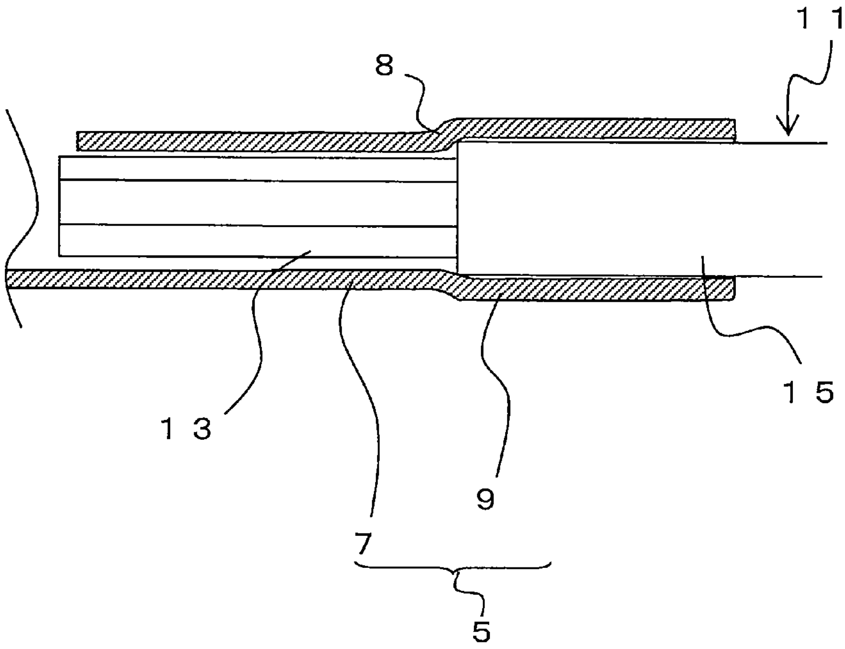
FIG. 18B is a view showing a process of inserting the conductive wire 13 into the conductive wire crimp part 7.

When the coated conductive wire 11 is further inserted into the crimp part 5 from such the state as shown in FIG. 18B, the tip end of the coating 15 comes into contact with the conductive wire positioning part 8. Here, the inner diameter of the conductive wire crimp part 7 before crimping is larger than the outer diameter of the conductive wire 13 and is smaller than the outer diameter of the coating 15. That is, before crimping, the size of the conductive wire positioning part 8 is larger than the inner diameter of the coating 15 (the outer diameter of the conductive wire 13) and is smaller than the outer diameter of the coating 15. Thus, the tip end of the coating 15 comes into contact with the inner surface of the conductive wire positioning part 8.

When the tip end of the coated conductive wire 11 is inserted into the crimp part 5 in this way until the tip end of the coating 15 comes into contact with the conductive wire positioning part 8, the exposed part of the conductive wire 13 is positioned inside the conductive wire crimp part 7, and the coating 15 is positioned inside the coating crimp part 9. At this time, the tip end of the conductive wire 13 may come out of the front end of the conductive wire crimp part 7. In this way, it is possible to restrict the insertion margin of the conductive wire 13 inside the conductive wire crimp part 7 so that the conductive wire 13 can be always disposed at a predetermined position of the conductive wire crimp part 7 with certainty.

Next, the terminal 1*e* with the coated conductive wire 11 being disposed on the crimp part 5 is set between the edges of the crimper, and the edges are engaged similarly as in FIGS. 8A and 8B to compress the crimp part 5. Then the conductive wire crimp part 7 is crimped to the conductive wire 13, and the coating crimp part 9 is crimped to the coating 15. As above, the terminal-equipped electric wire 10*b* can be obtained. Furthermore, a wire harness, which is a unified body of a plurality of terminal-equipped electric wires including the obtained terminal-equipped electric wire 10*b*, can be obtained.

According to the sixth embodiment, the terminal 1*e* is provided with the conductive wire positioning part 8. Thus, when the coated conductive wire 11 is inserted into the crimp part 5, the tip end of the coating 15 collides with the conductive wire positioning part 8 and this allows the conductive wire 13 to be disposed automatically at a position appropriate for crimping. This eliminates the need for checking the arrangement of the conductive wire 13 or the crimping position by looking, and allows the conductive wire 13 to be disposed always at the predetermined position of the conductive wire crimp part 7 with certainty. Also, since the conductive wire crimp part 7 is in a pipe shape, the conductive wire 13 can be crimped from the entire 360° circumference with certainty.

Seventh Embodiment

Figure 19:
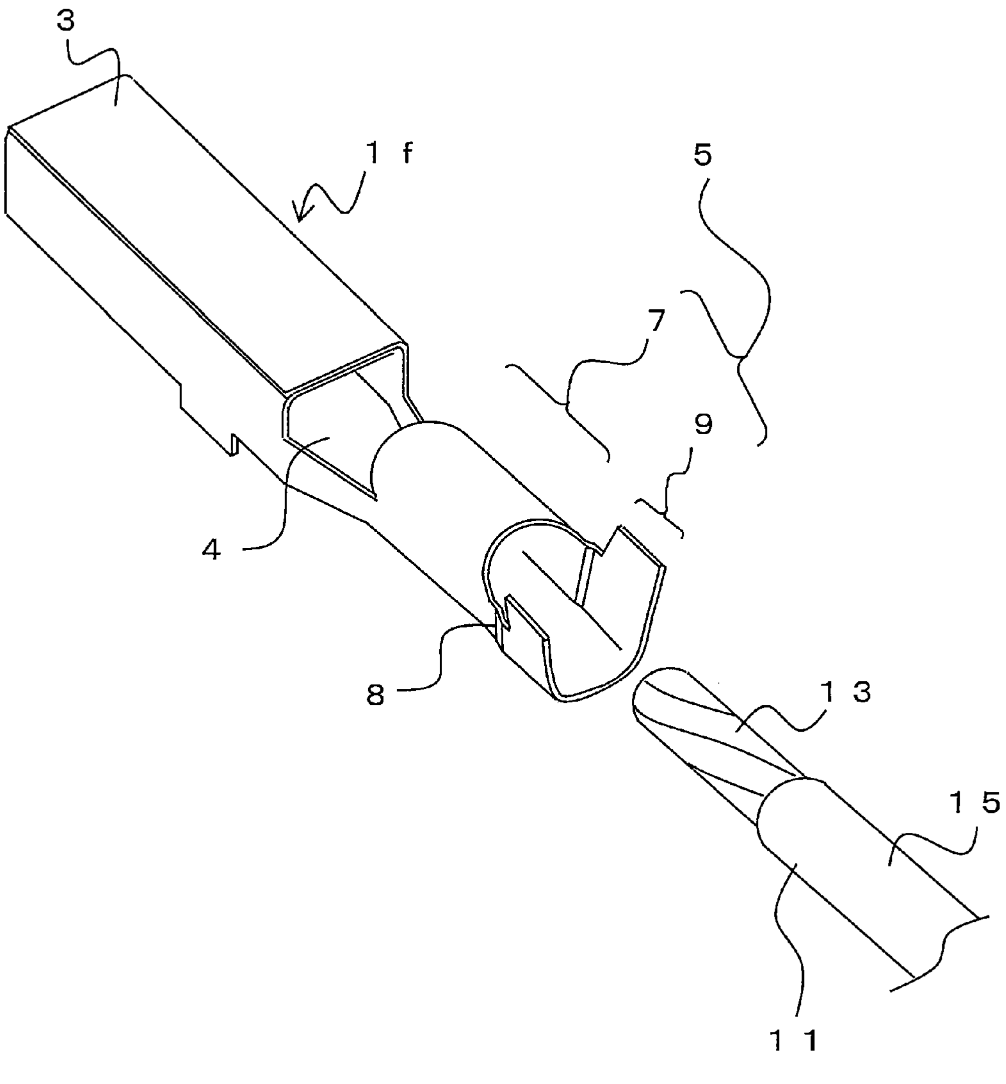
FIG. 19 is a view showing a terminal 1*f* and the coated conductive wire 11 before crimping.

Next, a seventh embodiment of the present invention will be described. FIG. 19 is a perspective view of a terminal if according to the seventh embodiment before crimping the coated conductive wire 11. The terminal 1*f* has approximately the same configuration as the terminal 1*e* except that the crimp part 5 has a different shape, wherein the conductive wire crimp part 7 is in a pipe shape, and the coating crimp part 9 is an open-barrel type. The coating crimp part 9 may be an open-barrel type instead of in a pipe shape in this way.

Figure 20A:
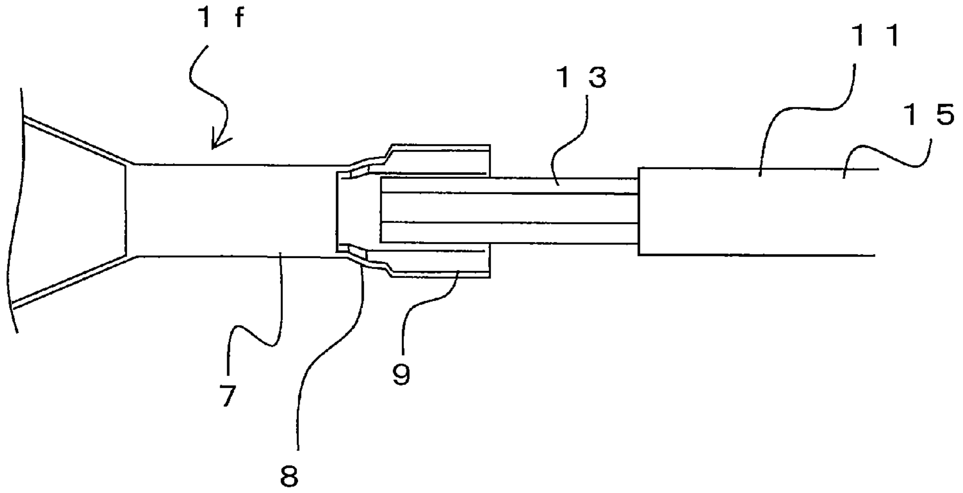
FIG. 20A is a view showing a process of inserting the conductive wire 13 into the conductive wire crimp part 7.

In the terminal 1*f*, the conductive wire positioning part 8 is formed between the coating crimp part 9 and the conductive wire crimp part 7 such that a width thereof gradually decreases toward the conductive wire crimp part 7. FIG. 20A is a plan view showing a state in which the conductive wire 13 is disposed on the coating crimp part 9. At this time, since the coating crimp part 9 is an open-barrel type, the conductive wire 13 of the coated conductive wire 11 can be disposed onto the coating crimp part 9 from above. Disposing the conductive wire 13 onto the coating crimp part 9 enables to position the conductive wire 13 (positioning in the width direction of the terminal 1*f*).

Figure 20B:
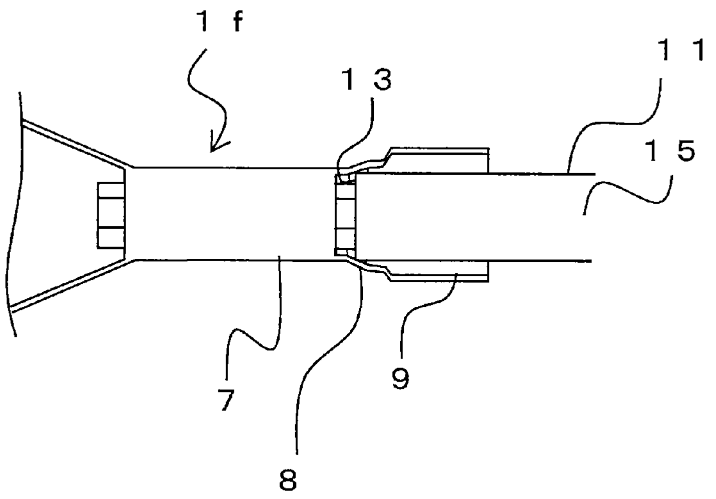
FIG. 20B is a view showing a process of inserting the conductive wire 13 into the conductive wire crimp part 7.

From the above state, as shown in FIG. 20B, the conductive wire 11 then slides toward the side of the conductive wire crimp part 7 of the terminal 1*f*, and thus the conductive wire 13 can be easily inserted into the pipe-shaped conductive wire crimp part 7. As above, the positioning of the conductive wire 13 to the conductive wire crimp part 7 is possible, and thus the conductive wire 13 can be easily inserted into the conductive wire crimp part if the inner diameter of the conductive wire crimp part 7 before crimping is as small as the outer diameter of the conductive wire 13. This enables to downsize the terminal 1*f*.

Also, the width of the coating 15 is larger than the conductive wire positioning part 8, and thus the tip end of the coating 15 collides with the conductive wire positioning part 8 when the conductive wire 13 is slid and inserted into the conductive wire crimp part 7. Thus, the positioning of the conductive wire 13 in the longitudinal direction is also easy. A terminal-equipped electric wire can be obtained by crimping in such the state.

According to the seventh embodiment, the same effects as in the sixth embodiment can be obtained. Also, since the coating crimp part 9 is an open-barrel type, it is easy to dispose the coated conductive wire 11 onto the crimp part 5. Also, since positioning of the coated conductive wire 11 at the coating crimp part 9 in regard to the conductive wire crimp part 7 is easy, the conductive wire 13 can be inserted easily into the pipe-shaped conductive wire crimp part 7.

Eighth Embodiment

Figure 21:
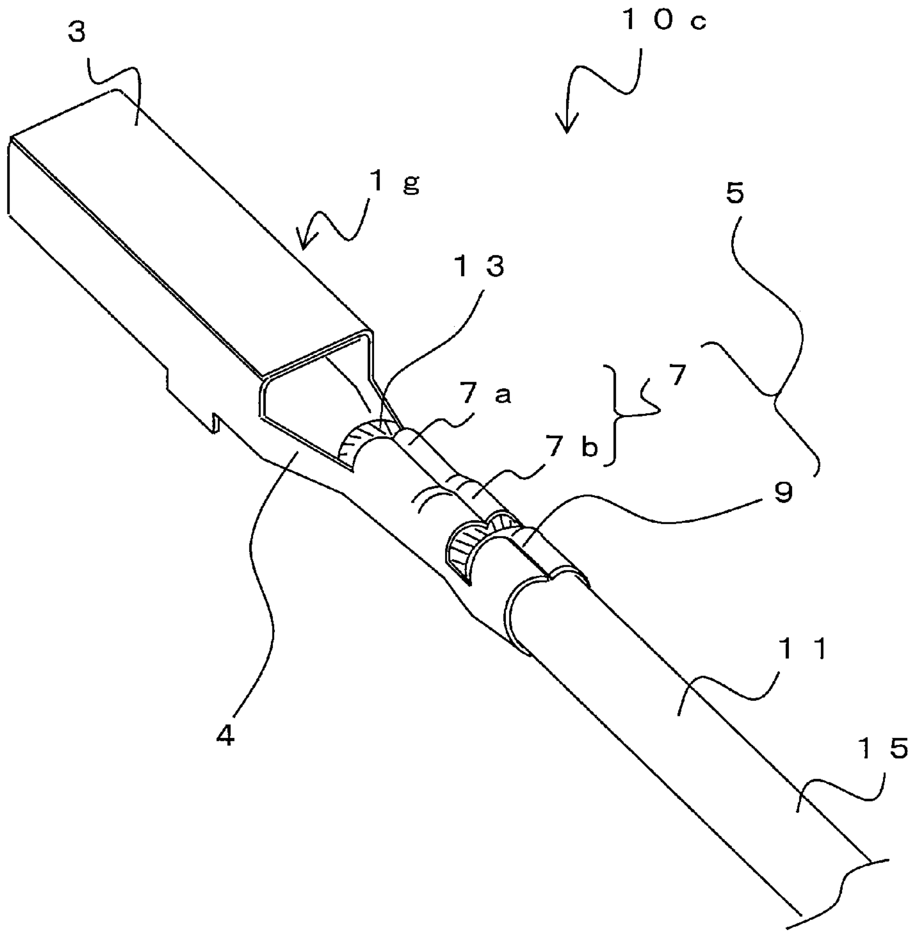
FIG. 21 is a perspective view showing a terminal-equipped electric wire 10*c*.
Figure 22:
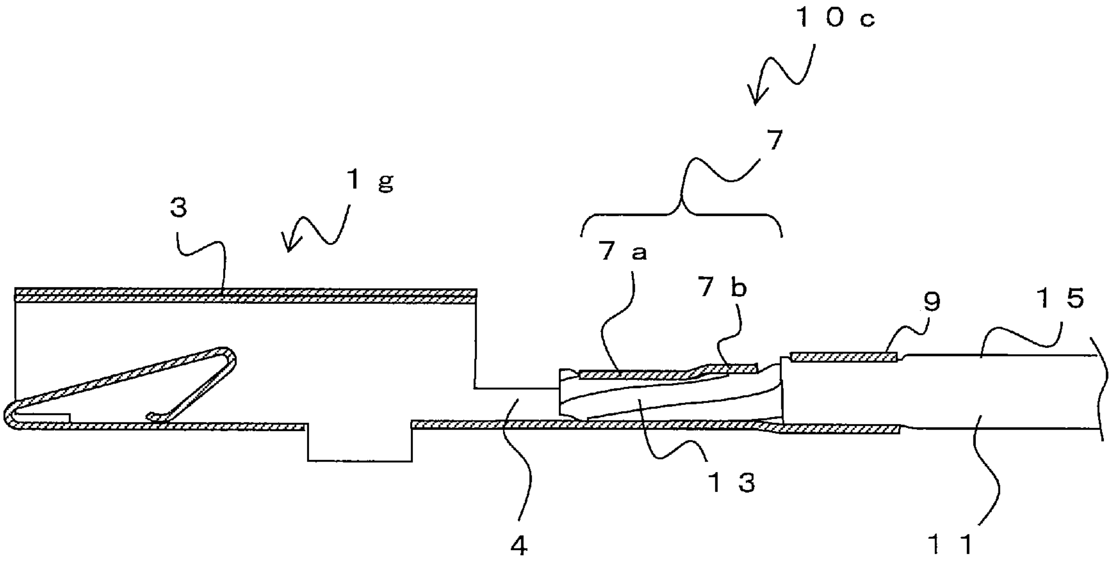
FIG. 22 is a cross-sectional view showing the terminal-equipped electric wire 10*c*.

Next, an eighth embodiment of the present invention will be described. FIG. 21 is a perspective view showing a terminal-equipped electric wire 10*c* according to the eighth embodiment, and FIG. 22 is a cross-sectional view of the terminal-equipped electric wire 10*c*. The terminal-equipped electric wire 10*c* includes the conductive wire crimp part 7 and the coating crimp part 9, which are both open-barrel types.

Figure 23A:
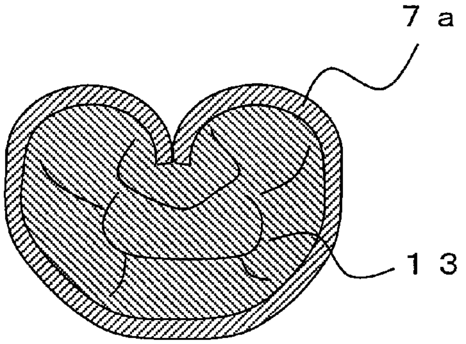
FIG. 23A is a cross-sectional view at the electric wire holding part 7*a*.

FIG. 23A is a view showing a cross section at the electric wire holding part 7*a*. In an example shown in FIG. 23A, the conductive wire 13 is formed of seven bare wires. At an upper part of the open-barrel-type conductive wire crimp part 7, a pair of facing barrel pieces are butted to each other at a substantial center of the width direction and are folded toward the inner side of the conductive wire crimp part 7, and then the conductive wire 13 is crimped.

Figure 23B:
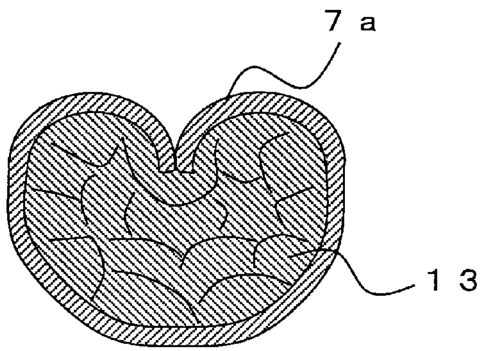
FIG. 23B is a cross-sectional view at the electric wire holding part 7*a*.

The number of the bare wires of the conductive wire 13 is not particularly limited. For example, the conductive wire 13 may include sixteen bare wires as shown in FIG. 23B, and the bare wires are preferably twisted together.

Figure 23C:
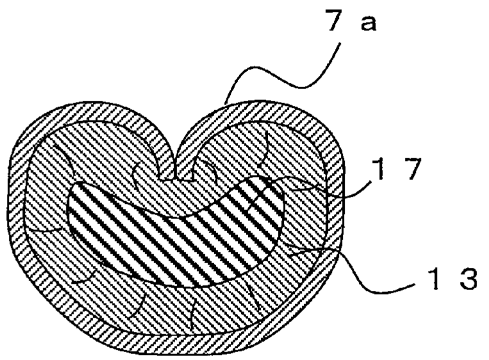
FIG. 23C is a cross-sectional view at the electric wire holding part 7*a*.

Also, the coated conductive wire 11 may include at least the one conductive wire 13 and the tension member that are coated by the coating 15. The tension member is a member that receives tensile force when a tensile load is applied. For example, as shown in FIG. 23C, on a cross section taken perpendicularly to the longitudinal direction of the coated conductive wire 11, at least one tension member 17 may be positioned at an approximate center of the coated conductive wire 11, and the plurality of conductive wires 13 may be disposed on the outer periphery part of the tension member 17. Furthermore, the conductive wires 13 may be spirally twisted together around the outer periphery of the tension member 17 in the longitudinal direction of the coated conductive wire 11. In such the case, both of the conductive wires 13 and the tension member 17 are crimped and held at the electric wire holding part 7*a* and the conductive part 7*b*.

The arrangement of the tension member 17 is not limited to the example shown in FIG. 23C. For example, the conductive wires 13 and the tension member 17 may be arranged being twisted together. Alternatively, the plurality of conductive wires 13 in which the tension member 17 is coated with a conductor may be twisted together. Also, the conductor may be arranged so as to coat the outer periphery of the tension member 17 at the center. That is, the cross-sectional shape of the coated conductive wire 11 including the tension member is not particularly limited if the coated conductive wire 11 includes at least one conductive wire and a tension member. The tension member 17 may be formed of one (or one body) tension wire or a plurality of bare wires.

Figure 24:
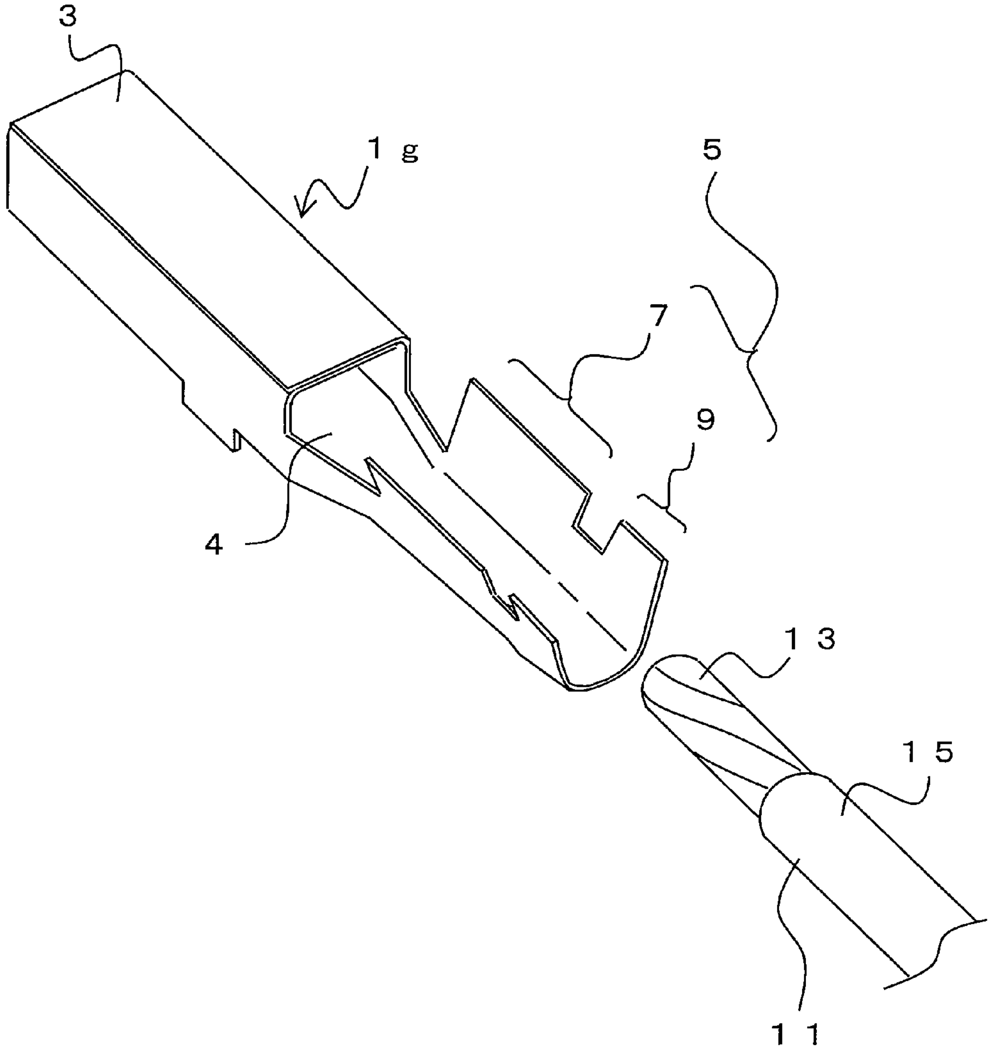
FIG. 24 is a view showing a terminal 1*g* and the coated conductive wire 11 before crimping.

Next, a method for producing the terminal-equipped electric wire 10*c* will be described. FIG. 24 is a perspective view showing a terminal 1*g* and the coated conductive wire 11 before crimping. As mentioned above, the terminal 1*g* includes the terminal body 3 and the crimp part 5. The crimping part 5 includes the conductive wire crimp part 7 and the coating crimp part 9, which are formed being separated from each other, each having an upper part that is opened up in an approximate U shape.

First, as mentioned above, the coating 15 at the tip end part of the coated conductive wire 11 is peeled off to expose the conductive wire 13 at the tip end part. The processed end part 19 may be formed at the tip end part of the conductive wire 13 before being inserted into the crimp part 5 of the terminal 1*g*.

Next, the conductive wire 11 is disposed on the crimp part 5 of the terminal 1*g*. At this time, since the crimp part 5 is an open-barrel type, the coated conductive wire 11 can be disposed from an upper part of the terminal 1*g*. When the tip end part of the coated conductive wire 11 is disposed onto the crimp part 5, the exposed part of the conductive wire 13 is positioned at the conductive wire crimp part 7, and the coating 15 is positioned at the coating crimp part 9. At this time, the tip end of the conductive wire 13 may come out of the front end of the conductive wire crimp part 7.

Figure 25A:
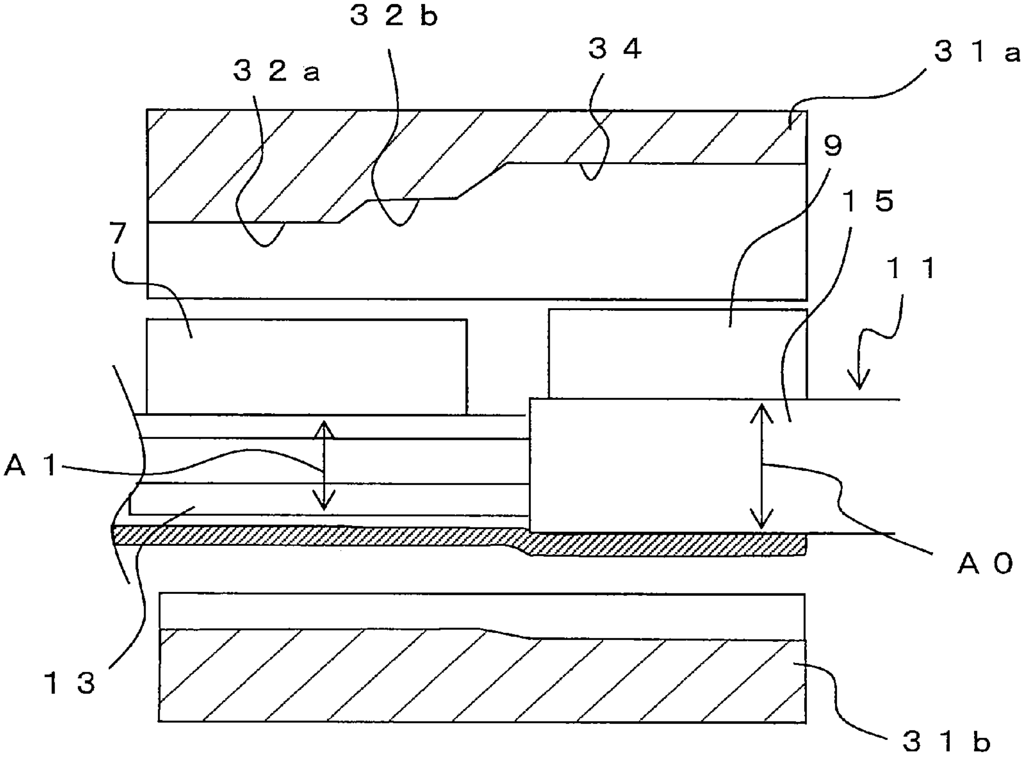
FIG. 25A is a view showing a crimping process at the crimp part 5.
Figure 25B:
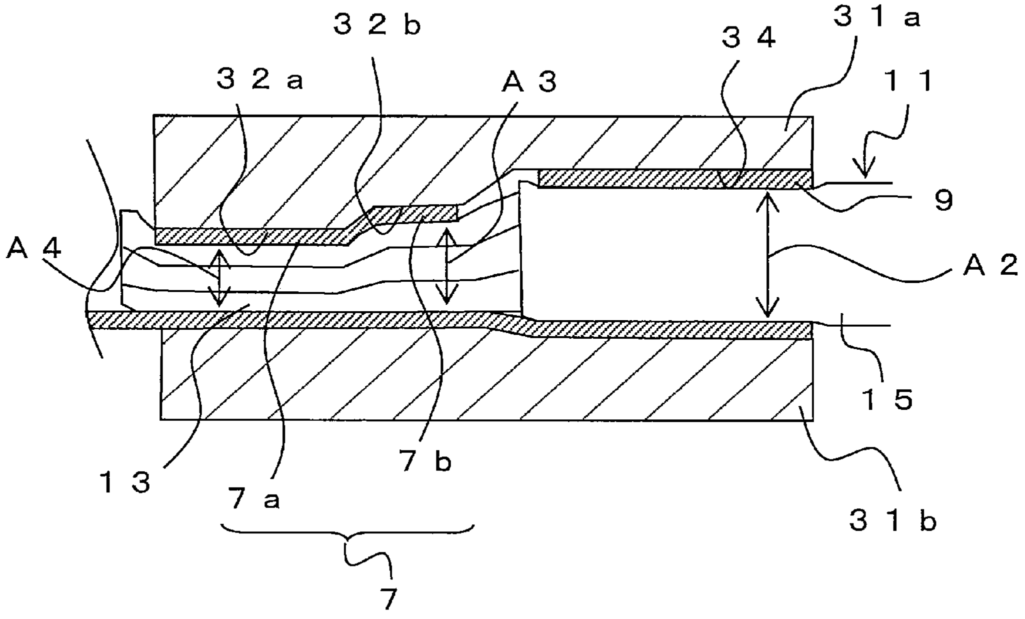
FIG. 25B is a view showing a crimping process at the crimp part 5.

FIG. 25A is a cross-sectional view showing the upper edge 31*a*, the lower edge 31*b*, etc. of the terminal crimper for producing the terminal-equipped electric wire 10*c* before crimping, and FIG. 25B is a cross-sectional view showing the crimp part 5 during crimping. The upper edge 31*a* and the lower edge 31*b* each has a substantially semicircular-column shaped cavity extending in the longitudinal direction. Also, the upper edge 31*a* includes a coating crimping edge 34 and conductive wire crimping edges 32*a* and 32*b*. The coating crimping edge 34 corresponds to the coating crimp part 9 and in a shape corresponding to the open-barrel shape. The conductive wire crimping edges 32*a* and 32*b* correspond to the conductive wire crimp part 7 and each has a shape corresponding to the open-barrel shape. That is, both of the upper edge 31*a* and the lower edge 31*b* are formed such that either parts corresponding to the conductive wire crimp part 7 and the coating crimp part 9 are in the shapes corresponding to the open-barrel shapes after crimping.

As shown in FIG. 25B, the upper edge 31*a* and the lower edge 31*b* are engaged to compress the crimp part 5. Then, the conductive wire crimp part 7 is crimped to the conductive wire 13, and the coating crimp part 9 is crimped to the coating 15. As above, the terminal-equipped electric wire 10*c* can be obtained. Furthermore, a wire harness, which is a unified body of a plurality of terminal-equipped electric wires including the obtained terminal-equipped electric wire 10*c*, can be obtained.

According to the eighth embodiment, since the conductive wire crimp part 7 is an open-barrel type, there is no need to insert the conductive wire 13 into the pipe-shaped crimp part, for example, and the conductive wire 13 can be disposed easily onto the conductive wire crimp part 7 of the terminal 1*g*. Thus, the crimping operation is easy. If the conductive wire crimp part 7 is an open-barrel type, brazing may be further performed after crimping.

Ninth Embodiment

Figure 26:
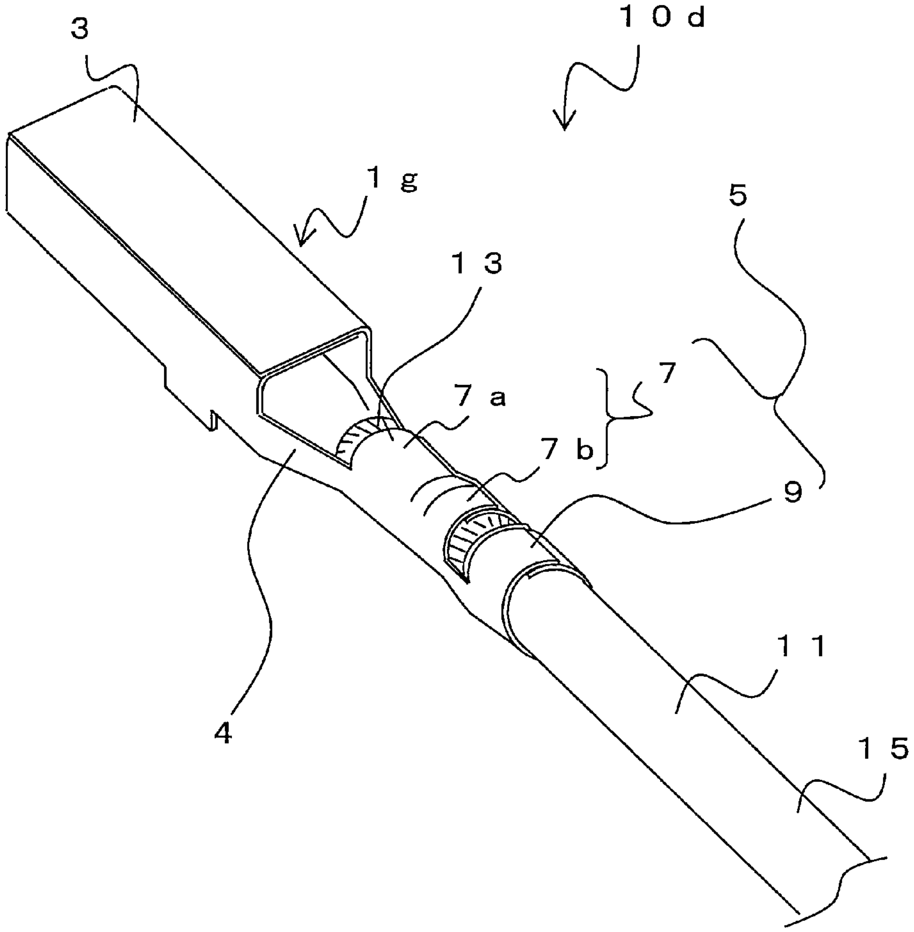
FIG. 26 is a perspective view showing a terminal-equipped electric wire 10*d*.

Next, a ninth embodiment of the present invention will be described. FIG. 26 is a perspective view of a terminal-equipped electric wire 10*d* according to the ninth embodiment. The terminal-equipped electric wire 10*d* has approximately the same configuration as the terminal-equipped electric wire 10*c* except that the crimp part 5 has a different shape.

Figure 27A:
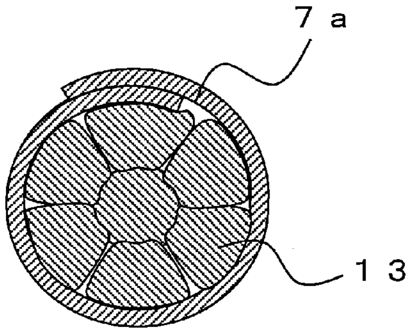
FIG. 27A is a cross-sectional view at the electric wire holding part 7*a*.

FIG. 27A is a view showing a cross section of the terminal-equipped electric wire 10*d* at the electric wire holding part 7*a*. In an example shown in FIG. 27A, the conductive wire 13 is formed of seven bare wires. In the present embodiment, at an upper part of the conductive wire crimp part 7, a pair of facing barrel pieces are rolled up overlapping with each other, and then the conductive wire 13 is crimped. That is, at the electric wire holding part 7*a*, the conductive wire 13 is compressed into an approximate circular shape and crimped.

Figure 27B:
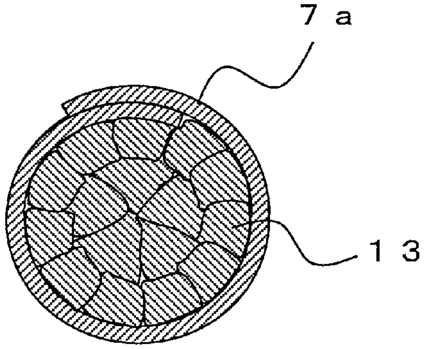
FIG. 27B is a cross-sectional view at the electric wire holding part 7*a*.
Figure 27C:
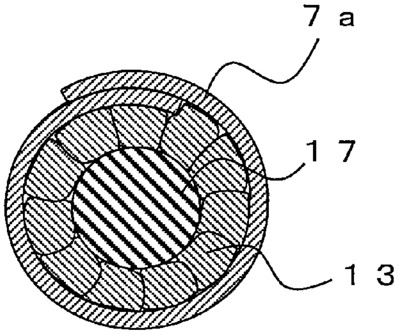
FIG. 27C is a cross-sectional view at the electric wire holding part 7*a*.

Also in such the case, the number of the bare wires of the conductive wire 13 is not particularly limited. For example, the conductive wire 13 may include sixteen bare wires as shown in FIG. 27B. Also, as shown in FIG. 27C, on the cross section taken perpendicularly to a longitudinal direction of the coated conductive wire 11, at least one tension member 17 may be positioned at the approximate center of the coated conductive wire 11, and the plurality of conductive wires 13 may be disposed on the outer periphery part of the tension member 17. Furthermore, the conductive wires 13 may be spirally twisted together around the outer periphery of the tension member 17 in the longitudinal direction of the coated conductive wire 11. In such the case, both of the conductive wires 13 and the tension member 17 are crimped and held at the electric wire holding part 7*a* and the conductive part 7*b*.

As above, the ninth embodiment can provide the same effects as in the eighth embodiment. That is, if the crimp part 5 is an open-barrel type, the cross-sectional shape after crimping is not particularly limited.

Tenth Embodiment

Figure 28:
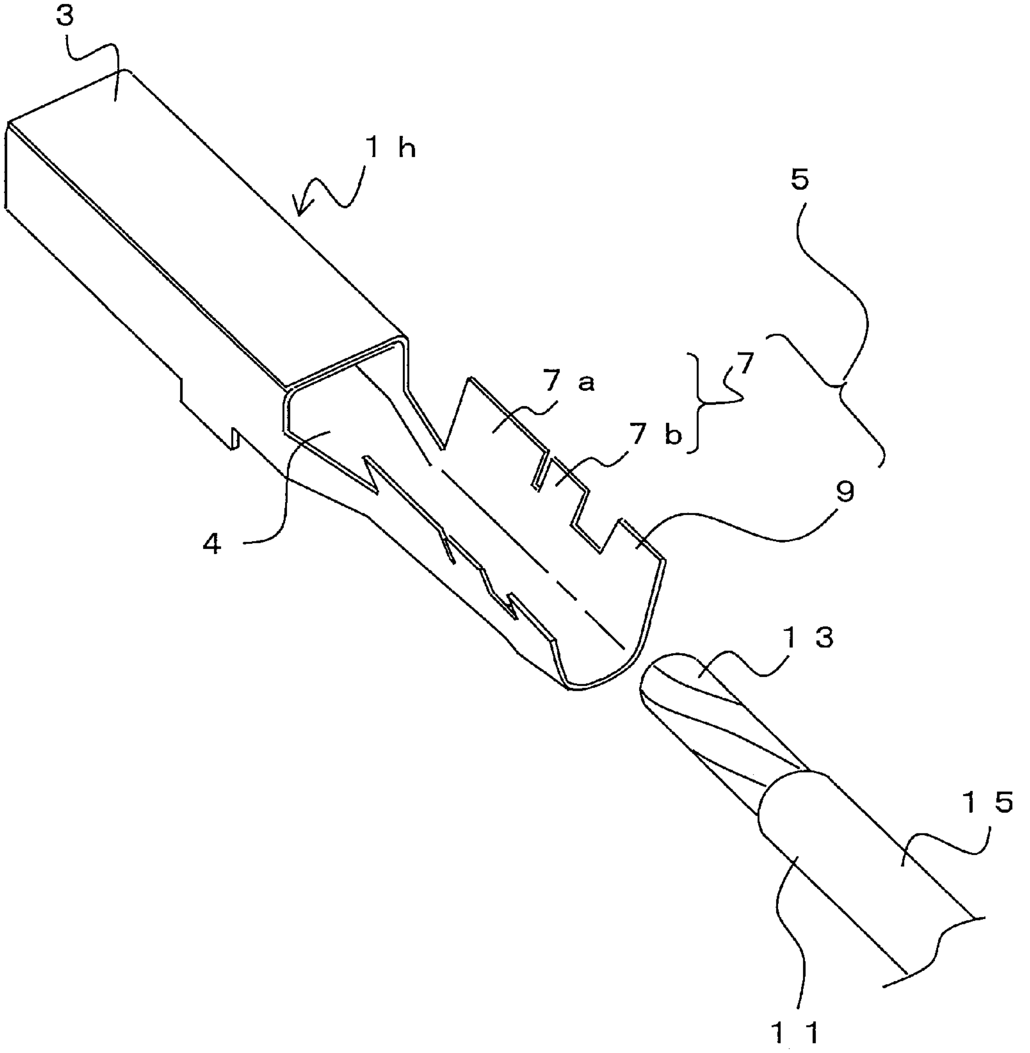
FIG. 28 is a view showing a terminal 1*h* and the coated conductive wire 11 before crimping.

Next, a tenth embodiment of the present invention will be described. FIG. 28 is a perspective view of a terminal 1*h* according to the tenth embodiment before crimping. The terminal 1*h* has approximately the same configuration as the terminal 1*g* except that the crimp part 5 has a different shape. The terminal 1*h* includes a slit formed in the conductive wire crimp part 7 between the electric wire holding part 7*a* and the conductive part 7*b*. In such the case in which the electric wire holding part 7*a* and the conductive part 7*b* are formed being separated from each other at the conductive wire crimp part 7 and crimped, the same effects as in the ninth embodiment etc. can still be obtained.

Eleventh Embodiment

Figure 29:
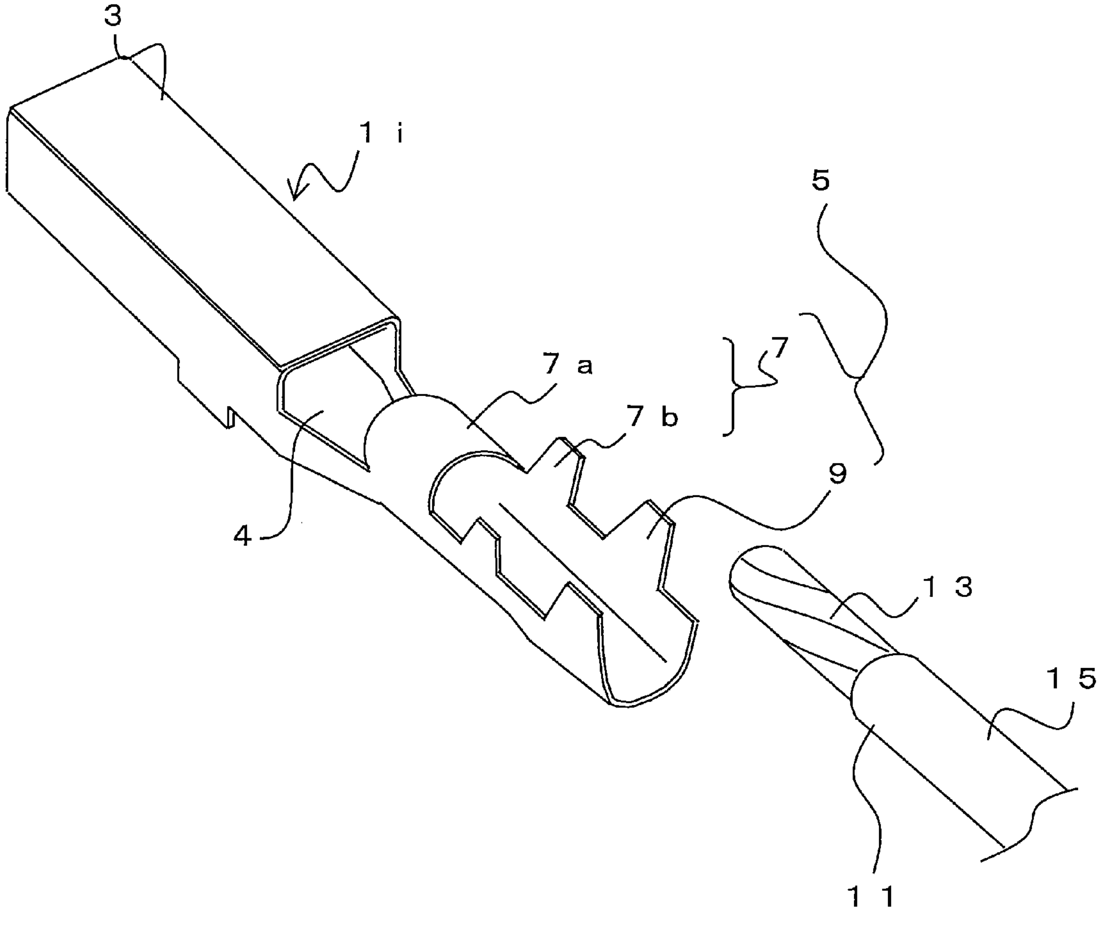
FIG. 29 is a view showing a terminal 1*i* and the coated conductive wire 11 before crimping.

Next, an eleventh embodiment of the present invention will be described. FIG. 29 is a perspective view of a terminal 1*i* according to the eleventh embodiment before crimping. The terminal 1*i* has approximately the same configuration as the terminal 1*h*, etc. except that the crimp part 5 has a different shape. In the terminal 1*i*, the electric wire holding part 7*a* of the conductive wire crimp part 7 is in a pipe shape, whereas the conductive part 7*b* of the conductive wire crimp part 7 and the coating crimp part 9 are open-barrel types. At least a part of the conductive wire crimp part 7 may be in a pipe shape being closed in the circumference direction in this way.

Figure 30:
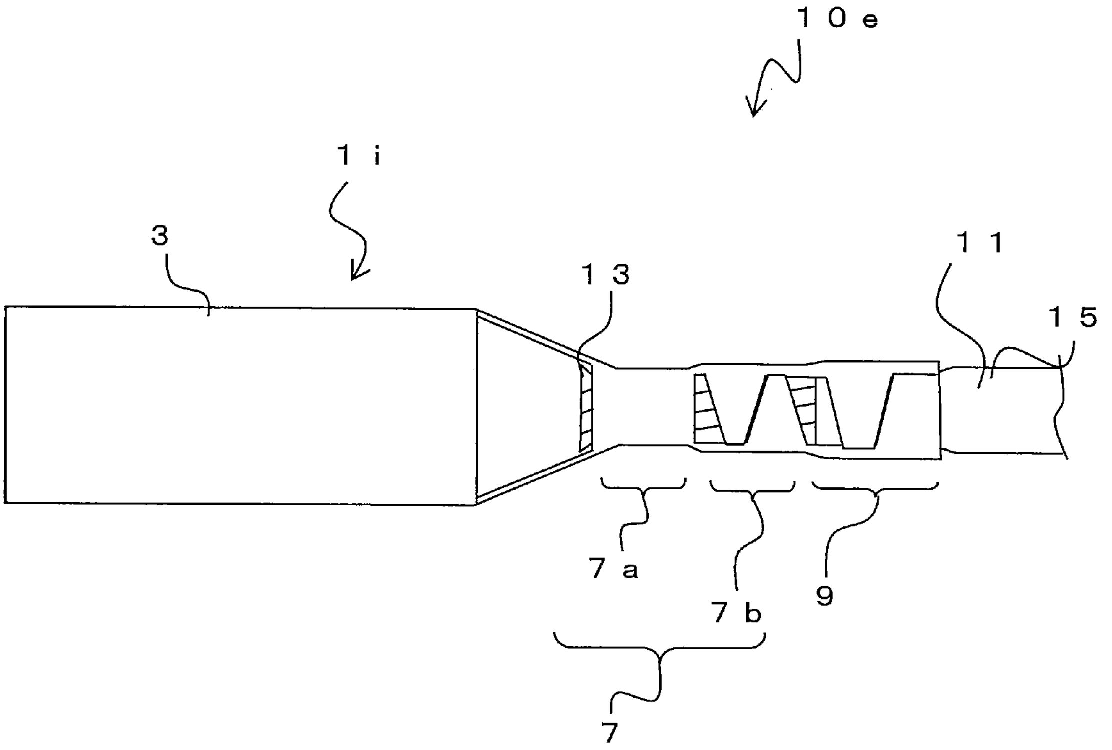
FIG. 30 is a plan view showing a terminal-equipped electric wire 10*e*.

The terminal 1*i* can be crimped similarly as the terminal 1*h*, etc. FIG. 30 is a plan view showing a terminal-equipped electric wire 10*e* in which the terminal 1*i* and the coated conductive wire 11 are crimped together. In the terminal 1*i*, the pipe-shaped electric wire holding part 7*a*, the open-barrel type conductive part 7*b*, and the coating crimp part 9 are crimped to each part of the coated conductive wire 11, respectively. At this time, as mentioned above, the compression rate at the electric wire holding part 7*a* is smaller than the compression rate at the conductive part 7*b*.

Here, at the open-barrel type conductive part 7*b* and the coating crimp part 9, at least a pair of facing barrel pieces are folded in, and the conductive wire 13 and the coated part 15 are crimped individually. At this time, in the present embodiment, the barrel pieces facing each other are arranged in a zigzag, being shifted from each other in regard to an axial direction of the crimp part.

In general, such the open-barrel type crimp part having the barrel pieces arranged in a zigzag prevents a crimping target from being damaged, and enables to bring the barrel pieces and the crimping target in close contact to be crimped together with certainty. However, the open-barrel type crimp part has also a characteristic that the high connection strength cannot be achieved. Thus, in the present embodiment, the electric wire holding part 7*a* is in a pipe shape and crimped strongly so as to achieve the high connection strength, while the conductive part 7*b* is a zigzag open-barrel type so as to eliminate damages to the conductive wire 13 inside and achieve conduction with the conductive wire 13 with certainty.

Alternatively, instead of making the barrel pieces of at least one of the conductive part 7*b* or the coating crimp part 9 in the zigzag arrangement, the barrel pieces may be arranged facing each other and crimped such that the barrel pieces overlap with each other. In such the case, tip ends of the facing barrel pieces are not butted with each other but are overlapped with each other, and one of the barrel pieces wraps up the other barrel piece to be crimped. As above, a form of crimping of the open-barrel type is not limited in particular.

In this way, the same effects as in the first embodiment, etc. can be obtained by crimping the conductive wire crimp part 7 with the electric wire holding part 7*a* and the conductive part 7*b* being formed.

WORKING EXAMPLES

Working Examples A

A terminal-equipped electric wire in a form as shown in FIG. 1 is produced, and its electrical and mechanical properties (electric resistance and connection strength) are evaluated by varying the compression rates at the crimp part. As the electrical property, an electric resistance between the terminal and the coated conductive wire is measured and evaluated. As the mechanical property, the coated conductive wire is pulled out from the terminal and a load at the time when the coated conductive wire is pulled out is measured as a tensile strength. The coated conductive wire used has a cross section as shown in FIG. 3C, including the tension member at the approximate center, and a plurality of annealed copper conductive wires having circular cross-sections and the same area. The conductive wires are disposed and twisted together on the outer periphery of the tension member so that the conductive wires are in contact with the tension member as well as with the adjacent conductive wires. Sums of cross-sectional areas of the conductive wires and a cross-sectional area of the tension member are 0.05 sq, 0.08 sq, 0.13 sq, 0.3 sq, and 0.35 sq. The number of conductive wires twisted together around the outer periphery of the tension member is twelve when the sum of the cross-sectional areas of the conductive wires and the cross-sectional area of the tension member is 0.05 sq, and is eight when the sum of the cross-sectional areas of the conductive wires and a cross-sectional area of the tension member is 0.08 sq, 0.13 sq, 0.3 sq, or 0.35 sq.

For each size of the conductive wires, when the compression rate at the electric wire holding part is 59.6%, the compression rate at the conductive part is 80.2%, and the compression rate at the coating crimp part is 52.3%, the conductive wires in any sizes had excellent results in both the electric resistance and the connection strength. The same results are obtained when the compression rate at the electric wire holding part is varied to 40.7% or 50.4%. On the other hand, when the conductive wire crimp part is not divided into the electric wire holding part and the conductive part and is crimped with the same compression rate of 50.4%, there are fractures of the conductive wires, which raises electric resistance of all the conductive wires in any sizes. The same results are obtained when being crimped with the compression rate of 59.6%. However, when the conductive wire crimp part is not divided into the electric wire holding part and the conductive part similarly and is crimped with the same compression rate of 80.2%, the connection strength is lowered for all the conductive wires in any sizes.

Working Examples B

Various types of terminal-equipped electric wires are produced similarly, and electrical and mechanical properties (electric resistance and connection strength) as well as producing workability of each type are evaluated. The producing workability is evaluated by insertion ability at the time of inserting the coated conductive wire into the terminal. Each condition and the evaluation results are shown in Table 1 to Table 4.

TABLE 1

| | | Working Example 1 | Working Example 2 | Working Example 3 | Working Example 4 | Working Example 5 | Working Example 6 | Working Example 7 |
|---|---|---|---|---|---|---|---|---|
| Electric Wire | Cross-Sectional Area | 1.25 sq | 0.35 sq | 0.3 sq | 0.13 sq | 0.05 sq | 0.05 sq | 0.05 sq |
| | No. of Bare Wires | 16 | 7 | 7 | 7 | 12 | 12 | 12 |
| | Tension Member | None | None | None | None | Exist | Exist | Exist |
| | Processed End Part | Circular Compression | Circular Compression | Circular Compression | Circular Compression | Circular Compression | Circular Compression + Collective Plating | Circular Compression |
| Terminal Form | | Pipe Shape Separate | Pipe Shape Separate | Pipe Shape Separate | Pipe Shape Separate | Pipe Shape Separate | Pipe Shape Separate | Pipe Shape One Body |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |

TABLE 1-continued

| | | Working Example 1 | Working Example 2 | Working Example 3 | Working Example 4 | Working Example 5 | Working Example 6 | Working Example 7 |
|---|---|---|---|---|---|---|---|---|
| | Coating Crimp Part | Strong Compression | Strong Compression | Strong Compression | Strong Compression | Strong Compression | Strong Compression | Strong Compression |
| Resistance (mΩ/100 mm) | | 1.5 | 5.2 | 6.1 | 14 | 34 | 34 | 34 |
| Tensile Strength (N) | | 345 | 90 | 77 | 34 | 72 | 64 | 72 |
| Terminal Insertion Ability | | average | average | average | average | average | average | average |

TABLE 2

| | | Working Example 8 | Working Example 9 | Working Example 10 | Working Example 11 | Working Example 12 | Working Example 13 | Working Example 14 |
|---|---|---|---|---|---|---|---|---|
| Electric Wire | Cross-Sectional Area | 1.25 sq | 0.35 sq | 0.3 sq | 0.13 sq | 0.05 sq | 0.05 sq | 0.05 sq |
| | No. of Bare Wires | 16 | 7 | 7 | 7 | 12 | 12 | 12 |
| | Tension Member | None | None | None | None | Exist | Exist | Exist |
| | Processed End Part | Circular Compression | Circular Compression | Circular Compression | Circular Compression | Circular Compression | Circular Compression Collective Plating | Circular Compression |
| Terminal Form | | Pipe Shape/ Open-Barrel | Pipe Shape/ Open-Barrel | Pipe Shape/ Open-Barrel | Pipe Shape/ Open-Barrel | Pipe Shape/ Open-Barrel | Pipe Shape/ Open-Barrel | Pipe Shape Separate/ Open-Barrel |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression | Strong Compression | Strong Compression |
| Resistance (mΩ/100 mm) | | 1.5 | 5.2 | 6.1 | 14 | 34 | 34 | 34 |
| Tensile Strength (N) | | 345 | 90 | 77 | 34 | 72 | 64 | 72 |
| Terminal Insertion Ability | | good | good | good | good | good | good | good |

TABLE 3

| | | Working Example 15 | Working Example 16 | Working Example 17 | Working Example 18 | Working Example 19 |
|---|---|---|---|---|---|---|
| Electric Wire | Cross-Sectional Area | 0.13 sq | 0.13 sq | 0.08 sq | 0.08 sq | 0.08 sq |
| | No. of Bare Wires | 7 | 8 | 7 | 8 | 8 |
| | Tension Member | None | Exist | None | Exist | Exist |
| | Processed End Part | Circular Compression | Circular Compression | Circular Compression | Circular Compression | Circular Compression + Collective Plating |
| Terminal Form | | Pipe Shape Separate | Pipe Shape Separate | Pipe Shape Separate | Pipe Shape Separate | Pipe Shape Separate |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression |
| Resistance (mΩ/100 mm) | | 22 | 28 | 36 | 46 | 46 |
| Tensile Strength (N) | | 66 | 102 | 39 | 60 | 60 |
| Terminal Insertion Ability | | average | average | average | average | average |

TABLE 4

| | | Comparison Example 1 | Comparison Example 2 | Comparison Example 3 | Comparison Example 4 | Comparison Example 5 |
|---|---|---|---|---|---|---|
| Electric Wire | Cross-Sectional Area | 1.25 sq | 0.3 sq | 0.13 sq | 0.05 sq | 0.05 sq |
| | No. of Bare Wires | 16 | 7 | 7 | 12 | 12 |
| | Tension Member | None | None | None | Exist | Exist |
| | Processed End Part | Circular Compression | Circular Compression | Circular Compression | Circular Compression | Circular Compression + Collective Plating |
| Terminal Form | | Pipe Shape One Body | Pipe Shape One Body | Pipe Shape One Body | Pipe Shape One Body | Pipe Shape One Body |
| Crimper | Conductive Wire Crimp Part | Strong Compression (1 Stage) | Weak Compression (1 Stage) | Mild Compression (1 Stage) | Strong Compression (1 Stage) | Strong Compression (1 Stage) |
| | Coating Crimp Part | Strong Compression | Strong Compression | Strong Compression | Strong Compression | Strong Compression |
| Resistance (mΩ/100 mm) | | 2.5 | 13 | 34 | 107 | 109 |
| Tensile Strength (N) | | 290 | 59 | 19 | 20 | 15 |
| Terminal Insertion Ability | | average | average | average | average | average |

"Cross-Sectional Area" of Electric Wire refers to the total of cross-sectional areas of the conductors. Also, "Number of Bare Wires" refers to the number of the conductive wires. "None" in Tension Member row means that the electric wire has no tension member as in FIGS. 3A and 3B, and "Exist" means that a cross section of the electric wire has a tension member at the center and the conductive wires are disposed around the outer periphery of the tension member as shown in FIG. 3C. In either case, an electric wire in which a plurality of annealed copper conductive wires are twisted together is used.

"Circular Compression" for Processed End Part means that the conductive wires are compressed from the outer periphery as in FIG. 6C, and "Circular Compression+Collective Plating" means that a collective plating layer is further formed from the outer periphery.

"Pipe Shape Separate" of Terminal Form refers to a form similar to the terminal 1*b* shown in FIG. 10, "Pipe Shape One Body" refers to a shape similar to the terminal 1*a* shown in FIG. 9, and "Pipe Shape/Open-Barrel" refers a form similar to the terminal 1*c* shown in FIG. 12.

"Crimper" is a crimper that crimps the conductive wire crimp part and the coating crimp part at the same time. "Strong Compression/Weak Compression (2 stages)" refers to a crimper that has two stages of the conductive wire crimping edges 32*a* and 32*b* as shown in FIG. 8A, wherein the first stage (on the front-end side) is for strong compression, and the second stage (on the rear-end side) is for weak compression. On the other hand, "(1 Stage)" means that the conductive wire crimp part is crimped with the uniform compression rate, marked either with "Weak Compression", "Mild Compression", or "Strong Compression" according to the compression rate. The "Strong Compression" refers to the compression rate of 40% or more and less than 50%, "Mild Compression" refers to the compression rate of 50% or more and less than 60%, and "Weak Compression" refers to the compression rate between 60% and 90%.

"Resistance" is an electric resistance between a front end of the terminal and a rear end of the coated conductive wire having a length of 100 mm. "Tensile Strength" is a load at the time of pulling out the coated conductive wire from the terminal. Also, "Terminal Insertion Ability" is marked as "good" if the operation of inserting the coated conductive wire into the crimp part of the terminal is easy, and marked as "average" if the insertion operation is slightly difficult.

As shown in Tables 1 to 3, Working Examples 1 to 19, in which the conductive wire crimp part is crimped in two stages, are able to satisfy both the resistance and the tensile strength. For example, if the conductive wire cross-sectional area is 1.25 sq, it is possible to achieve the resistance of 2 mΩ/100 mm or less and the tensile strength of 300 N or more. Also, if the conductive wire cross-sectional area is 0.35 sq, it is possible to achieve the resistance of 10 mΩ/100 mm or less and the tensile strength of 70 N or more. Also, if the conductive wire cross-sectional area is 0.13 sq, it is possible to achieve the resistance of 30 mΩ/100 mm or less and the tensile strength of 30 N or more. Also, if the conductive wire cross-sectional area is 0.08 sq, it is possible to achieve the resistance of 50 mΩ/100 mm or less and the tensile strength of 30 N or more. Furthermore, if the electric wire has the tension member and the conductive wire cross-sectional area is as small as 0.05 sq, it is possible to achieve the resistance of 40 mΩ/100 mm or less and the tensile strength of 60 N or more.

Also, Working Examples 8 to 14 in which the coating crimp part is an open-barrel type, the conductive wire is firstly disposed from above onto the coating crimp part, and then the conductive wire can be inserted into the pipe-shaped conductive wire crimp part. Thus, positioning of the conductive wire with regard to the conductive wire crimp part is easy, and the insertion ability of the conductive wire into the terminal is good.

On the other hand, for Comparison Example 1 with the conductive wire cross-sectional area of 1.25 sq, the entire conductive wire crimp part is compressed strongly compared to Working Examples 1 and 8, and thus the resistance is increased to 2.5 mΩ/100 mm due to fractures of the conductive wire. Also, for Comparison Example 2 with the conductive wire cross-sectional area of 0.3 sq, the entire conductive wire crimp part is compressed weakly compared to Working Examples 3 and 10, and thus holding force for the conductive wire is weak and the tensile strength is decreased to 59 N. Also, for Comparison Example 3 with the conductive wire cross-sectional area of 0.13 sq, the entire conductive wire crimp part is compressed mildly compared to Working Examples 4, 11, 15, and 16, and thus the resistance is increased to 34 mΩ/100 mm and the tensile strength is decreased to 19 N. Also, for Comparison Examples 4 and 5 with the conductive wire cross-sectional area of 0.05 sq, the entire conductive wire crimp part is compressed strongly compared to Working Examples 5 to 7 and 12 to 14, and thus the resistance is increased to 100 mΩ/100 mm or more.

Working Examples C

Various types of terminal-equipped electric wires are produced similarly, and electrical and mechanical properties (electric resistance and connection strength) of the crimp part as well as producing workability of each type are evaluated. The producing workability is evaluated by insertion ability at the time of inserting the coated conductive wire into the terminal. Each condition and the evaluation results are shown in Table 5 to Table 10.

TABLE 5

| | | Working Example 20 | Working Example 21 | Working Example 22 | Working Example 23 | Working Example 24 | Working Example 25 | Working Example 26 |
|---|---|---|---|---|---|---|---|---|
| Electric Wire | Cross-Sectional Area | 1.25 sq | 0.35 sq | 0.3 sq | 0.13 sq | 0.05 sq | 0.05 sq | 0.05 sq |
| | No. of Bare Wires | 16 | 7 | 7 | 7 | 12 | 12 | 12 |
| | Tension Member | None | None | None | None | Exist | Exist | Exist |
| | Processed End Part | Circular Compression | Circular Compression | Circular Compression | Circular Compression | Circular Compression | Circular Compression + Collective Plating | Circular Compression |
| Open-Barrel Terminal Form | | Separate Butted | Separate Butted | Separate Butted | Separate Butted | Separate Butted | Separate Butted | Unified Butted |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression | Strong Compression | Strong Compression |
| Resistance (mΩ/100 mm) | | 1.6 | 5.6 | 6.5 | 16 | 40 | 40 | 40 |
| Tensile Strength (N) | | 343 | 86 | 74 | 30 | 66 | 60 | 66 |
| Crimping Workability | | good | good | good | good | good | good | good |

TABLE 6

| | | Working Example 27 | Working Example 28 | Working Example 29 | Working Example 30 | Working Example 31 | Working Example 32 | Working Example 33 |
|---|---|---|---|---|---|---|---|---|
| Electric Wire | Cross-Sectional Area | 1.25 sq | 0.35 sq | 0.3 sq | 0.13 sq | 0.05 sq | 0.05 sq | 0.05 sq |
| | No. of Bare Wires | 16 | 7 | 7 | 7 | 12 | 12 | 12 |
| | Tension Member | None | None | None | None | Exist | Exist | Exist |
| | Processed End Part | Circular Compression | Circular Compression | Circular Compression | Circular Compression | Circular Compression | Circular Compression Collective Plating | Circular Compression |
| Open-Barrel Terminal Form | | Separate Wrapped | Separate Wrapped | Separate Wrapped | Separate Wrapped | Separate Wrapped | Separate Wrapped | Unified Wrapped |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression | Strong Compression | Strong Compression |
| Resistance (mΩ/100 mm) | | 1.6 | 5.6 | 6.5 | 16 | 40 | 40 | 40 |
| Tensile Strength (N) | | 343 | 86 | 74 | 30 | 66 | 60 | 66 |
| Crimping Workability | | good | good | good | good | good | good | good |

TABLE 7

| | | Working Example 34 | Working Example 35 | Working Example 36 | Working Example 37 | Working Example 38 |
|---|---|---|---|---|---|---|
| Electric Wire | Cross-Sectional Area | 0.13 sq | 0.13 sq | 0.08 sq | 0.08 sq | 0.08 sq |
| | No. of Bare Wires | 7 | 8 | 7 | 8 | 8 |
| | Tension Member | None | Exist | None | Exist | Exist |
| | Processed End Part | Circular Compression | Circular Compression | Circular Compression | Circular Compression | Circular Compression + Collective Plating |
| Open-Barrel Terminal Form | | Separate Butted | Separate Butted | Separate Butted | Separate Butted | Separate Butted |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression |
| Resistance (mΩ/100 mm) | | 22 | 28 | 36 | 46 | 46 |
| Tensile Strength (N) | | 66 | 102 | 39 | 60 | 60 |
| Crimping Workability | | good | good | good | good | good |

TABLE 8

| | | Working Example 39 | Working Example 40 | Working Example 41 | Working Example 42 | Working Example 43 |
|---|---|---|---|---|---|---|
| Electric Wire | Cross-Sectional Area | 0.13 sq | 0.13 sq | 0.08 sq | 0.08 sq | 0.08 sq |
| | No. of Bare Wires | 7 | 8 | 7 | 8 | 8 |
| | Tension Member | None | Exist | None | Exist | Exist |
| | Processed End Part | Circular Compression | Circular Compression | Circular Compression | Circular Compression | Circular Compression + Collective Plating |
| Open-Barrel Terminal Form | | Unified Butted | Unified Butted | Unified Butted | Unified Butted | Unified Butted |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression |
| Resistance (mΩ/100 mm) | | 22 | 28 | 36 | 46 | 46 |
| Tensile Strength (N) | | 66 | 102 | 39 | 60 | 60 |
| Crimping Workability | | good | good | good | good | good |

TABLE 9

| | | Working Example 44 | Working Example 45 | Working Example 46 | Working Example 47 | Working Example 48 |
|---|---|---|---|---|---|---|
| Electric Wire | Cross-Sectional Area | 0.13 sq | 0.13 sq | 0.08 sq | 0.08 sq | 0.08 sq |
| | No. of Bare Wires | 7 | 8 | 7 | 8 | 8 |
| | Tension Member | None | Exist | None | Exist | Exist |
| | Processed End Part | Circular Compression | Circular Compression | Circular Compression | Circular Compression | Circular Compression + Collective Plating |

TABLE 9-continued

| | | Working Example 44 | Working Example 45 | Working Example 46 | Working Example 47 | Working Example 48 |
|---|---|---|---|---|---|---|
| Open-Barrel Terminal Form | | Separate Wrapped | Separate Wrapped | Separate Wrapped | Separate Wrapped | Unified Wrapped |
| Crimper | Conductive Wire Crimp Part | Strong Compression/ Weak Compression (Two Stages) | Strong Compression/ Weak Compression (Two Stages) | Strong Compression/ Weak Compression (Two Stages) | Strong Compression/ Weak Compression (Two Stages) | Strong Compression/ Weak Compression (Two Stages) |
| | Coating Crimp Part | Strong Compression | Strong Compression | Strong Compression | Strong Compression | Strong Compression |
| Resistance (mΩ/100 mm) | | 22 | 28 | 36 | 46 | 46 |
| Tensile Strength (N) | | 66 | 102 | 39 | 60 | 60 |
| Crimping Workability | | good | good | good | good | good |

TABLE 10

| | | Comparison Example 6 | Comparison Example 7 | Comparison Example 8 | Comparison Example 9 | Comparison Example 10 |
|---|---|---|---|---|---|---|
| Electric Wire | Cross-Sectional Area | 1.25 sq | 0.3 sq | 0.13 sq | 0.05 sq | 0.05 sq |
| | No. of Bare Wires | 16 | 7 | 7 | 12 | 12 |
| | Tension Member | None | None | None | Exist | Exist |
| | Processed End Part | Circular Compression | Circular Compression | Circular Compression | Circular Compression | Circular Compression + Collective Plating |
| Open-Barrel Terminal Form | | Unified Butted | Unified Butted | Unified Butted | Unified Butted | Unified Butted |
| Crimper | Conductive Wire Crimp Part | Strong Compression (1 Stage) | Weak Compression (1 Stage) | Mild Compression (1 Stage) | Strong Compression (1 Stage) | Strong Compression (1 Stage) |
| | Coating Crimp Part | Strong Compression | Strong Compression | Strong Compression | Strong Compression | Strong Compression |
| Resistance (mΩ/100 mm) | | 2.7 | 14 | 35 | 115 | 118 |
| Tensile Strength (N) | | 275 | 55 | 15 | 15 | 9 |
| Crimping Workability | | good | good | good | good | good |

"Cross-Sectional Area" of Electric Wire refers to the total of cross-sectional areas of the conductors. Also, "Number of Bare Wires" refers to the number of the conductive wires. "None" in Tension Member row means that the electric wire has no tension member as in FIGS. 23A, 23B, 27A, and 27B, and "Exist" means that a cross section of the electric wire has a tension member at the center and the conductive wires are disposed around the outer periphery of the tension member as shown in FIGS. 23C and 27C. In either case, an electric wire in which a plurality of annealed copper conductive wires are twisted together is used.

"Circular Compression" for Processed End Part means that the conductive wires are compressed from the outer periphery as in FIG. 6C, and "Circular Compression+Collective Plating" means that a collective plating layer is further formed from the outer periphery.

All of the terminals here are open-barrel types. "Separate" for "Terminal Form" means that the electric wire holding part 7*a* and the conductive part 7*b* are separated as in the terminal 1*h* shown in FIG. 28, and "One Body" for "Terminal Form" means that the conductive wire crimp part 7 is unified as one body as in the terminal 1*g* shown in FIG. 24. Also, "Butted" refers to a form of crimping as shown in FIG. 23A to 23C, and "Wrapped" refers to a form of crimping as shown in FIG. 27A to 27C.

"Crimper" is a crimper that crimps the conductive wire crimp part and the coating crimp part at the same time. "Strong Compression/Weak Compression (2 stages)" refers to a crimper that has two stages of the conductive wire crimping edges 32*a* and 32*b* as shown in FIG. 25A, wherein the first stage (on the front-end side) is for strong compression, and the second stage (on the rear-end side) is for weak compression. On the other hand, "(1 Stage)" means that the conductive wire crimp part is crimped with the uniform compression rate, marked either with "Weak Compression", "Mild Compression", or "Strong Compression" according to the compression rate. The "Strong Compression" refers to the compression rate of 40% or more and less than 50%, "Mild Compression" refers to the compression rate of 50% or more and less than 60%, and "Weak Compression" refers to the compression rate between 60% and 90%.

"Resistance" is an electric resistance between a front end of the terminal and a rear end of the coated conductive wire having a length of 100 mm. "Tensile Strength" is a load at the time of pulling out the coated conductive wire from the terminal. Also, "Crimping Workability" is marked as "good" if the operation of disposing the coated conductive wire onto the crimp part of the terminal is easy, and marked as "average" if the disposing operation is slightly difficult.

As shown in Table 5 to Table 10, the crimping workability is good for all the terminal-equipped electric wires since the conductive wire crimp parts are open-barrel type. Also, all of Working Examples 18 to 44 in which the conductive wire crimp part is crimped in two stages are able to satisfy both the resistance and the tensile strength. For example, if the conductive wire cross-sectional area is 1.25 sq, it is possible to achieve the resistance of 2 mΩ/100 mm or less and the tensile strength of 300 N or more. Also, if the conductive wire cross-sectional area is 0.35 sq, it is possible to achieve the resistance of 10 mΩ/100 mm or less and the tensile strength of 70 N or more. Also, if the conductive wire cross-sectional area is 0.13 sq, it is possible to achieve the resistance of 30 mΩ/100 mm or less and the tensile strength of 30 N or more. Also, if the conductive wire cross-sectional area is 0.08 sq, it is possible to achieve the resistance of 50 mΩ/100 mm or less and the tensile strength of 30 N or more. Furthermore, if the electric wire has the tension member and the conductive wire cross-sectional area is as small as 0.05 sq, it is possible to achieve the resistance of 40 mΩ/100 mm or less and the tensile strength of 60 N or more.

On the other hand, for Comparison Example 6 with the conductive wire cross-sectional area of 1.25 sq, the entire conductive wire crimp part is compressed strongly compared to Working Examples 20 and 27, and thus the resistance is increased to 2.7 mΩ/100 mm due to fractures of the conductive wire. Also, for Comparison Example 7 with the conductive wire cross-sectional area of 0.3 sq, the entire conductive wire crimp part is compressed weakly compared to Working Examples 22 and 29, and thus holding force for the conductive wire is weak and the tensile strength is decreased to 55 N. Also, for Comparison Example 8 with the conductive wire cross-sectional area of 0.13 sq, the entire conductive wire crimp part is compressed mildly compared to Working Examples 23, 30, 34, 35, 39, 40, 44, and 45, and thus the resistance is increased to 34 mΩ/100 mm and the tensile strength is decreased to 19 N. Also, for Comparison Examples 9 and 10 with the conductive wire cross-sectional area of 0.05 sq, the entire conductive wire crimp part is compressed strongly compared to Working Examples 24 to 26 and 31 to 33, and thus the resistance is increased to 100 mΩ/100 mm or more.

Working Examples D

Terminal-equipped electric wires are similarly produced, and the insertion workability of the coated conductive wire into the terminal and the insertion workability of the obtained terminal-equipped electric wire into a connector are evaluated. Each condition and the evaluation results are shown in Table 11 to Table 14.

TABLE 11

| | | Working Example 49 | Working Example 50 | Working Example 51 | Working Example 52 | Working Example 53 | Working Example 54 |
|---|---|---|---|---|---|---|---|
| Electric Wire | Cross-Sectional Area | 1.25 sq | 0.35 sq | 0.3 sq | 0.13 sq | 0.05 sq | 0.05 sq |
| | No. of Bare Wires | 16 | 7 | 7 | 7 | 12 | 12 |
| | Tension Member | None | None | None | None | Exist | Exist |
| | Processed End Part | Circular Compression | Circular Compression | Circular Compression | Circular Compression | Circular Compression | Circular Compression + Collective Plating |
| Conductive Wire Crimp Part Terminal Shape | | Pipe Shape | Pipe Shape | Pipe Shape | Pipe Shape | Pipe Shape | Pipe Shape |
| Coating Crimp Part Terminal Shape | | Open-Barrel | Open-Barrel | Open-Barrel | Open-Barrel | Open-Barrel | Open-Barrel |
| Cross-Sectional Area of Conductive Wire Crimp Part before Crimping ($mm^2$) | | 2 | 0.6 | 0.5 | 0.2 | 0.1 | 0.1 |
| Conductive Wire Cross-Sectional Area/ Crimp Part Cross-Sectional Area (%) | | 62.5 | 58 | 60 | 65 | 50 | 50 |
| Insertion Ability into Terminal | | good | good | good | good | good | good |
| Connector Insertion Ability | | good | good | good | good | good | good |

TABLE 12

| | | Working Example 55 | Working Example 56 | Working Example 57 | Working Example 58 | Working Example 59 |
|---|---|---|---|---|---|---|
| Electric Wire | Cross-Sectional Area | 0.05 sq | 0.08 sq* (Including Coating) | 1.25 sq | 1.25 sq | 1.25 sq |
| | No. of Bare Wires | 12 | 12 | 16 | 16 | 16 |
| | Tension Member | Exist | Exist | None | Exist | Exist |
| | Processed End Part | Circular Compression | Circular Compression + Leaving Coating Tip End | Circular Compression + Collective Plating | Circular Compression + Arc Welding | Circular Compression + Ultrasonic Soldering |

TABLE 12-continued

| | Working Example 55 | Working Example 56 | Working Example 57 | Working Example 58 | Working Example 59 |
|---|---|---|---|---|---|
| Conductive Wire Crimp Part Terminal Shape | Pipe Shape | Pipe Shape | Pipe Shape | Pipe Shape | Pipe Shape |
| Coating Crimp Part Terminal Shape | Open-Barrel | Open-Barrel | Open-Barrel | Open-Barrel | Open-Barrel |
| Cross-Sectional Area of Conductive Wire Crimp Part before Crimping ($mm^2$) | 0.1 | 0.1 | 2 | 2 | 2 |
| Conductive Wire Cross-Sectional Area/ Crimp Part Cross-Sectional Area (%) | 50 | 80* | 62.5 | 62.5 | 62.5 |
| Insertion Ability into Terminal | good | excellent | excellent | excellent | excellent |
| Connector Insertion Ability | good | good | good | good | good |

TABLE 13

| | | Working Example 60 | Working Example 61 | Working Example 62 | Working Example 63 | Working Example 64 |
|---|---|---|---|---|---|---|
| Electric Wire | Cross-Sectional Area | 0.13 sq | 0.13 sq | 0.08 sq | 0.08 sq | 0.08 sq |
| | No. of Bare Wires | 7 | 8 | 7 | 8 | 8 |
| | Tension Member | None | Exist | None | Exist | Exist |
| | Processed End Part | Circular Compression | Circular Compression | Circular Compression | Circular Compression | Circular Compression + Collective Plating |
| Conductive Wire Crimp Part Terminal Shape | | Pipe Shape | Pipe Shape | Pipe Shape | Pipe Shape | Pipe Shape |
| Coating Crimp Part Terminal Shape | | Open-Barrel | Open-Barrel | Open-Barrel | Open-Barrel | Open-Barrel |
| Cross-Sectional Area of Conductive Wire Crimp Part before Crimping ($mm^2$) | | 0.2 | 0.2 | 0.16 | 0.16 | 0.16 |
| Conductive Wire Cross-Sectional Area/ Crimp Part Cross-Sectional Area (%) | | 65 | 65 | 50 | 50 | 50 |
| Insertion Ability into Terminal | | good | good | good | good | good |
| Connector Insertion Ability | | good | good | good | good | good |

TABLE 14

| | | Comparison Example 11 | Comparison Example 12 | Comparison Example 13 | Comparison Example 14 | Comparison Example 15 |
|---|---|---|---|---|---|---|
| Electric Wire | Cross-Sectional Area ($mm^2$) | 1.25 | 1.25 | 1.25 | 0.05 | 0.05 |
| | No. of Bare Wires | 16 | 16 | 16 | 12 | 12 |
| | Tension Member | None | None | None | Exist | Exist |
| | Processed End Part | Circular Compression | Circular Compression | Circular Compression | Circular Compression | Circular Compression |
| Conductive Wire Crimp Part Terminal Shape | | Pipe Shape | Pipe Shape | Pipe Shape | Pipe Shape | Pipe Shape |
| Coating Crimp Part Terminal Shape | | Pipe Shape | Pipe Shape | Open-Barrel | Pipe Shape | Open-Barrel |
| Cross-Sectional Area of Conductive Wire Crimp Part before Crimping ($mm^2$) | | 2 | 3.5 | 3.5 | 0.1 | 0.15 |

TABLE 14-continued

| | Comparison Example 11 | Comparison Example 12 | Comparison Example 13 | Comparison Example 14 | Comparison Example 15 |
|---|---|---|---|---|---|
| Conductive Wire Cross-Sectional Area/ Crimp Part Cross-Sectional Area (%) | 62.5 | 35.7 | 35.7 | 50 | 33.3 |
| Insertion Ability into Terminal | bad | good | good | bad | good |
| Connector Insertion Ability | good | bad | bad | good | bad |

"Cross-Sectional Area" of Electric Wire refers to the total of cross-sectional areas of the conductive wires taken perpendicularly to the longitudinal direction of the electric wire. Note that although Working Example 56 has the same cross-sectional area as Working Example 57, Working Example 56 is produced with the coating being left at the front-end part of the conductive wire (see FIG. 13A) and thus the cross-sectional area including the coating is shown in the table. Also, "Number of Bare Wires" refers to the number of the conductive wires. "None" in Tension Member row means that the electric wire has no tension member as in FIGS. 3A and 3B, and "Exist" means that a cross section of the electric wire has a tension member at the center and the conductive wires are disposed around the outer periphery of the tension member as shown in FIG. 3C. In either case, an electric wire in which a plurality of annealed copper conductive wires that are twisted together is used.

"Circular Compression" for Processed End Part means that the conductive wires are compressed from the outer periphery as in FIG. 6C, and "Circular Compression+Collective Plating" means that a collective plating layer is further formed from the outer periphery. In addition, "Circular Compression+Arc Welding" means that the conductive wires are compressed from the outer periphery followed further by arc welding of the tip ends. Also, "Circular Compression+Ultrasonic Soldering" means that the conductive wires are compressed from the outer periphery followed further by soldering and unifying the tip ends of the conductive wires.

The terminals having the conductive crimp part that is in "Pipe Shape" and the coating crimp part that is "Open-Barrel" are in the same form as the terminal 1*c* shown in FIG. 12. The terminals having the conductive crimp part and the coating crimp part that are both in "Pipe Shape" are in the same form as the terminal 1 shown in FIG. 5, in which the entire crimp part is formed as one body in a pipe shape.

"Cross-sectional Area of Conductive Wire Crimping Part before Crimping" is an area of cross section, which is taken perpendicularly to an insertion direction of the conductive wire, of an inner space of the pipe-shaped conductive wire crimp part before crimping. "Conductive Wire Cross-sectional Area/Crimping Part Cross-sectional Area (%)" is a ratio of the cross-sectional area of the conductive wire to the cross-sectional area of the conductive wire crimp part before crimping. Note that the ratio for Working Example 7 is a ratio of the cross-sectional area of the conductive wire including the coating to the cross-sectional area of the conductive wire crimp part before crimping.

"Insertion Ability into Terminal" is marked as "excellent" if the conductive wire can be easily inserted into the conductive wire crimp part without separation or catching of the tip end part of the conductive wire at the time of being inserted into the pipe-shaped conductive wire crimp part. If the conductive wire can be inserted into the conductive wire crimp part with a little catching, the insertion ability is marked as "good", and if there is a difficulty in inserting the conductive wire into the conductive wire crimp part, the insertion ability is marked as "bad".

"Insertion Ability into Connector" is marked as "good" if the terminal after crimping can be easily inserted into the connector, and is marked as "bad" if the insertion is difficult.

As shown in Tables 11 to 13, for any of Working Examples 49 to 64 each including the pipe-shaped conductive wire crimp part and the open-barrel type coating crimp part, although "Conductive Wire Cross-Sectional Area/Crimping Part Cross-Sectional Area (%)" is 40% or more, the insertion ability into the terminal is good. In particular, the insertion ability into the terminal is good because the tip end of the conductive wire is not only compressed but also unified as one body by leaving a part of the coating, plating, arc welding, soldering, etc. to prevent separation of the conductive wires with certainty and to increase rigidity of the tip end of the conductive wires at the same time. For example, in Working Example 56 in which a part of the coating is left, the insertion ability is excellent despite that the ratio of the cross-sectional area including the coating to the cross-sectional area of the crimp part is 70% or more.

As above, in any of Working Examples 49 to 64, the conductive wire can be inserted into the conductive wire crimp part after disposing the conductive wire onto the open-barrel type coating crimp part and positioning the conductive wire to the conductive wire crimp part. Thus, the conductive wire can be easily inserted into the conductive wire crimp part even if the diameter of the conductive wire crimp part is relatively small for the diameter of the conductive wire. In addition, since it is possible to make the diameter of the conductive wire crimp part small, the insertion ability into the connector afterward is also good.

For Comparison Example 11, on the other hand, since both the conductive wire crimp part and the coating crimp part are pipe shaped, positioning of the coated conductive wire onto the pipe-shaped crimp part is not easy, and insertion of the conductive wire into the pipe-shaped crimp part is difficult. In Comparison Examples 12 and 13, the diameter of the conductive wire crimp part is increased compared to Comparison Example 11 to improve the insertion ability of the conductive wire. However, this increases the size of the terminal as a result, and deteriorates the insertion ability of the terminal into the connector (a cross-sectional area of an insertion opening of the connector for 1.25 $mm^2$ conductive wire: 3.2 $mm^2$).

Also, similarly, for Comparison Example 14, since both the conductive wire crimp part and the coating crimp part are pipe shaped, positioning is not easy, and insertion of the conductive wire into the pipe-shaped crimp part is difficult. In Comparison Example 15, the diameter of the conductive wire crimp part is increased compared to Comparison Example 14 to improve the insertion ability. However, this increases the size of the terminal as a result, and deteriorates the insertion ability of the terminal into the connector (a cross-sectional area of an insertion opening of the connector for 0.05 $mm^2$ conductive wire: 0.125 $mm^2$).

As shown in Working Examples A to D above, by dividing the conductive wire crimp part into two parts of the electric wire holding part and the conductive part and by crimping the two parts separately under different conditions, the requirements of both the electric resistance and the connection strength can be satisfied. The method for crimping is not particularly limited to the compression-rate varying method if the connection strength at the electric wire holding part can be kept higher than the connection strength at the conductive part. For example, other methods such as varying the cross-sectional shape of the electric holding part of the conductive wire crimp part after crimping may be used.

Working Examples E

A plurality of various terminal-equipped electric wires are produced, and position relations between the conductive wire and the conductive wire crimp part, and the insertion workability etc. of the obtained terminal-equipped electric wires are evaluated.

Working Example 65

A terminal-equipped electric wire using the terminal if shown in FIG. 19 is produced. A coated conductive wire having a cross-sectional shape as shown in FIG. 3B and including annealed copper wires of 1.25 sq/16 cores is used.

Working Example 66

For Working Example 65, a coated conductive wire having a cross-sectional shape as shown in FIG. 3A and including annealed copper wires of 0.35 sq/7 cores is used.

Working Example 67

For Working Example 65, a coated conductive wire having a cross-sectional shape as shown in FIG. 3A and including annealed copper wires of 0.3 sq/7 cores is used.

Working Example 68

For Working Example 65, a coated conductive wire having a cross-sectional shape as shown in FIG. 3A and including annealed copper wires of 0.13 sq/7 cores is used.

Working Example 69

For Working Example 65, a coated conductive wire having a cross-sectional shape as shown in FIG. 3C and including twelve annealed copper wires, having circular cross sections and the same cross-sectional areas, that are disposed around a tension member is used. The total cross-sectional area of the conductive wire and the tension member is 0.05 sq.

Working Example 70

For Working Example 69, a coated conductive wire of which a tip end part is formed with a collective plating layer as shown in FIG. 6D is used.

Working Example 71

A terminal-equipped electric wire using the terminal 1*e* shown in FIG. 16 is produced. A coated conductive wire having a cross-sectional shape as shown in FIG. 3C and including twelve annealed copper wires, having circular cross sections and the same cross-sectional areas, that are disposed around a tension member is used. The total cross-sectional area of the conductive wire and the tension member is 0.05 sq.

Working Example 72

A terminal-equipped electric wires using the terminal if shown in FIG. 19 is produced. A coated conductive wire having a cross-sectional shape as shown in FIG. 3A and including annealed copper wires of 0.13 sq/7 cores is used.

Working Example 73

For Working Example 72, a coated conductive wire having a cross-sectional shape as shown in FIG. 3C and including eight annealed copper wires, having circular cross sections and the same cross-sectional areas, that are disposed around a tension member is used. The total cross-sectional area of the conductive wire and the tension member is 0.13 sq.

Working Example 74

For Working Example 72, a coated conductive wire having a cross-sectional shape as shown in FIG. 3A and including annealed copper wires of 0.08 sq/7 cores is used.

Working Example 75

For Working Example 72, a coated conductive wire having a cross-sectional shape as shown in FIG. 3C and including eight annealed copper wires, having circular cross sections and the same cross-sectional areas, that are disposed around a tension member is used. The total cross-sectional area of the conductive wire and the tension member is 0.08 sq.

Working Example 76

For Working Example 75, a coated conductive wire of which a tip end part is formed with a collective plating layer as shown in FIG. 6D is used.

Working Example 77

A terminal-equipped electric wire using the terminal 1*e* shown in FIG. 16 is produced. A coated conductive wire having a cross-sectional shape as shown in FIG. 3C and including eight annealed copper wires, having circular cross sections and the same cross-sectional areas, that are disposed around a tension member is used. The total cross-sectional area of the conductive wire and the tension member is 0.13 sq.

Working Example 78

A terminal-equipped electric wires using the terminal 1*e* shown in FIG. 16 is produced. A coated conductive wire having a cross-sectional shape as shown in FIG. 3C and including eight annealed copper wires, having circular cross sections and the same cross-sectional areas, that are disposed around a tension member is used. The total cross-sectional area of the conductive wire and the tension member is 0.08 sq.

Comparison Example 16

A terminal including a pipe-shaped crimp part having a uniform inner diameter without a conductive wire positioning part is used. A coated conductive wire having a cross-sectional shape as shown in FIG. 3B and including annealed copper wires of 1.25 sq/16 cores is used.

Comparison Example 17

For Comparison Example 16, a coated conductive wire having a cross-sectional shape as shown in FIG. 3A and including annealed copper wires of 0.3 sq/7 cores is used.

Comparison Example 18

For Comparison Example 16, a coated conductive wire having a cross-sectional shape as shown in FIG. 3A and including annealed copper wires of 0.13 sq/7 cores is used.

Comparison Example 19

For Comparison Example 16, a coated conductive wire having a cross-sectional shape as shown in FIG. 3C and including twelve annealed copper wires, having circular cross sections and the same cross-sectional areas, that are disposed around a tension member is used. The total cross-sectional area of the conductive wire and the tension member is 0.05 sq.

Comparison Example 20

For Comparison Example 19, a coated conductive wire of which a tip end part is formed with a collective plating layer as shown in FIG. 6D is used.

In any of Working Examples 65 to 78, the conductive wire can be disposed and crimped at the appropriate position of the conductive wire crimp part. In Comparison Examples 16 to 20, however, positioning of the conductive wire is difficult and it takes time to decide the position of the conductive wire. Also, variation of disposition of the conductive wire is large, and thus variation of positioning of the conductive wire to the conductive wire crimp part is large.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

Figure 31A:
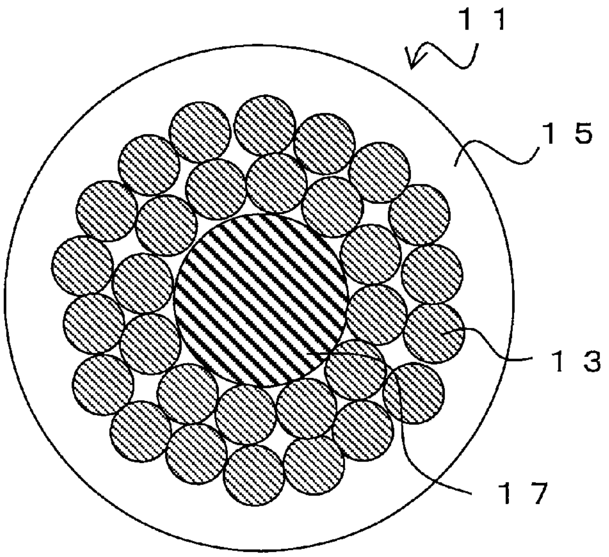
FIG. 31A is a view showing a cross section of another form of the coated conductive wire 11.
Figure 31B:
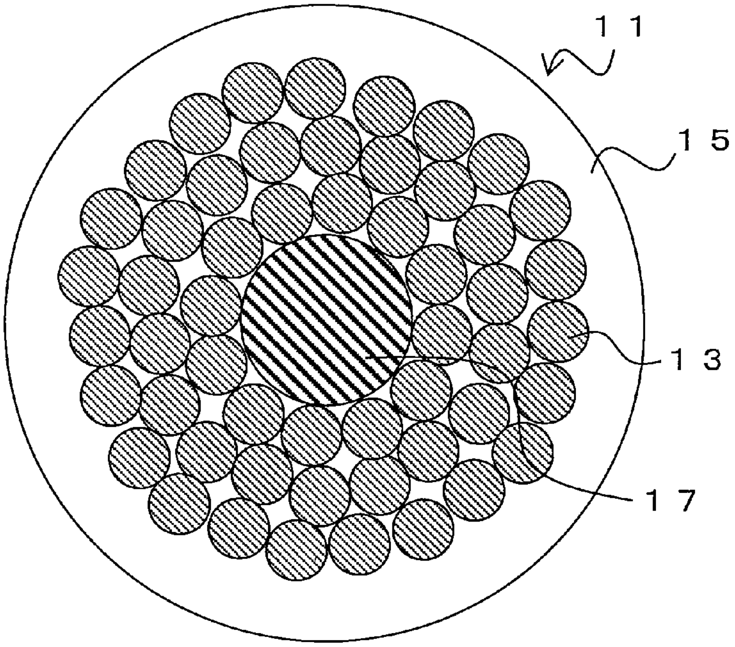
FIG. 31B is a view showing a cross section of another form of the coated conductive wire 11.

For example, the above descriptions illustrate the examples in which one layer of the conductive wire 13 is disposed around the outer periphery of the tension member 17. However, there are various ways of disposing the conductive wire 13. If the conductive wire 13 is disposed on a side of the outer periphery of the tension member 17, two layers of the conductive wire may be disposed around the tension member 17 as shown in FIG. 31A, or three layers of the conductive wire 13 may be disposed around the tension member 17 as shown in FIG. 31B. Also, the number of the conductive wires 13 is at least three for a layer that is in contact with the tension member 17, and is preferably twenty or less, in view of conductivity and strength of the conductive wire 13. For example, the number of the conductive wires 13 may be twelve or fourteen as shown in FIGS. 6B to 6D and FIG. 7A to 7B, etc. or may be six or eight.

DESCRIPTION OF NOTATIONS

1, 1*a*, 1*b*, 1*c*, 1*d*, 1*e*, 1*f*, 1*g*, 1*h*, 1*i* terminal
3 terminal body
4 transition part
5 crimp part
7 conductive wire crimp part
7*a* electric wire holding part
7*b* conductive part
8 conductive wire positioning part
9 coating crimp part
10, 10*a*, 10*b*, 10*c*, 10*d*, 10*e* terminal-equipped electric wire
11 coated conductive wire
13 conductive wire
15, 15*a* coating
17 tension member
19 processed end part
21 plating layer
31*a* upper edge
31*b* lower edge
32*a*, 32*b* conductive wire crimping edge
34 coating crimping edge

What is claimed is:

1. A terminal-equipped electric wire in which a coated conductive wire and a terminal are electrically connected with each other, the terminal-equipped electric wire comprising:

a conductive wire crimp part at which a conductive wire exposed from a coating at a tip end of the coated conductive wire is crimped; and a coating crimp part at which the coating of the coated conductive wire is crimped, wherein the conductive wire crimp part includes an electric wire holding part for holding the conductive wire and a conductive part for achieving conduction with the conductive wire, the conductive part is formed on a rear-end side of the conductive wire crimp part, a compression rate at the electric wire holding part is different from a compression rate at the conductive part, the compression rate at the electric wire holding part is smaller than the compression rate at the conductive part, and the compression rate at the coating crimp part is smaller than the compression rate at the conductive part.

2. The terminal-equipped electric wire according to claim 1, wherein tensile strength of the conductive wire at the electric wire holding part is greater than tensile strength of the conductive wire at the conductive part.

3. The terminal-equipped electric wire according to claim 1, wherein the coated conductive wire includes at least the one conductive wire and a tensile member that are coated by the coating.

4. The terminal-equipped electric wire according to claim 3, wherein the electric wire holding part holds both the conductive wire and the tensile member.

5. The terminal-equipped electric wire according to claim 1, wherein the coated conductive wire includes a plurality of the conductive wires and at least one tension member.

6. The terminal-equipped electric wire according to claim 5, wherein on a cross section taken perpendicularly to a longitudinal direction of the coated conductive wire, the tension member is positioned at an approximate center of the coated conductive wire, and the conductive wires are disposed on an outer periphery part of the tension member.

7. The terminal-equipped electric wire according to claim 6, wherein the conductive wires are twisted in the longitudinal direction of the coated conductive wire.

8. The terminal-equipped electric wire according to claim 1, wherein a cross-sectional area of the conductive wire is 0.35 sq or less, and the terminal can crimp the conductive wire having the cross-sectional area of 0.35 sq or less.

9. The terminal-equipped electric wire according to claim 1, wherein a cross-sectional area of the conductive wire is 0.3 sq or less, and the terminal can crimp the conductive wire having the cross-sectional area of 0.3 sq or less.

10. The terminal-equipped electric wire according to claim 1, wherein a cross-sectional area of the conductive wire is 0.05 sq or less, and, tensile strength of the conductive wire at the electric wire holding part is 50 N or more.

11. The terminal-equipped electric wire according to claim 1, wherein at least a part of the conductive wire fractures at the electric wire holding part.

12. The terminal-equipped electric wire according to claim 1 wherein at least a part of the conductive wire crimp part is in a pipe shape being closed in a circumferential direction.

13. The terminal-equipped electric wire according to claim 12, wherein the coating crimp part is in an open-barrel shape.

14. The terminal-equipped electric wire according to claim 12, wherein a conductive wire positioning part is formed at least at a part between the conductive wire crimp part and the coating crimp part;

the conductive wire positioning part becomes smaller in size toward the front-end side; and a tip end of the coating comes into contact with the conductive wire positioning part so that an insertion margin of the conductive wire into the conductive wire crimp part is restricted.

15. A method for producing the terminal-equipped electric wire according to claim 14, wherein the conductive wire positioning part is larger in size than an inner diameter of the coating and smaller than an outer diameter of the coating before crimping;

the tip end of the coated conductive wire is inserted into the conductive wire crimp part until a tip end coating comes into contact with the conductive wire positioning part; and the conductive wire crimp part is crimped.

16. The terminal-equipped electric wire according to claim 1, wherein at least a tip end part of the conductive wire is compressed from an outer periphery side, or is plated collectively from the outer periphery of the conductive wire.

17. The terminal-equipped electric wire according to claim 1, wherein the conductive wire crimp part is an open-barrel type.

18. A wire harness comprising:

a plurality of terminal-equipped electric wires including the terminal-equipped electric wire according to claim 1, wherein the terminal-equipped electric wires are unified together as one body.

19. A terminal crimper for producing the terminal-equipped electric wire according to claim 1, the terminal crimper comprising:

an upper edge; and a lower edge, wherein a distance between the upper edge and the lower edge at a part corresponding to the electric wire holding part is smaller than a distance between the upper edge and the lower edge at a part corresponding to the conductive part.

20. A method for producing the terminal-equipped electric wire according to claim 1, wherein a cross-sectional area of an inner part of the coating is 40% or more of a cross-sectional area of an insertion part of the conductive wire crimp part before crimping.

21. The method for producing the terminal-equipped electric wire according to claim 20, wherein the conductive wire is inserted into the conductive wire crimp part with a part of the coating being left at the tip end when removing the coating at the tip end part of the coated conductive wire, and the coating is removed from the conductive wire before crimping.

22. The terminal-equipped electric wire according to claim 1, wherein the compression rate at the electric wire holding part is 40% or more and less than 50%, the compression rate at the conductive part is 60% or more and less than 90%, and the compression rate at the coating crimp part is 40% or more and less than 50%.

23. A terminal-equipped electric wire in which a coated conductive wire and a terminal are electrically connected with each other, the terminal-equipped electric wire comprising:

a conductive wire crimp part at which a conductive wire exposed from a coating at a tip end of the coated conductive wire is crimped; and a coating crimp part at which the coating of the coated conductive wire is crimped, wherein the conductive wire crimp part includes an electric wire holding part for holding the conductive wire and a conductive part for achieving conduction with the conductive wire, the coated conductive wire includes a plurality of the conductive wires and at least one tension member, the electric wire holding part holds both the conductive wire and the tensile member, at the electric wire holding part, at least a part of the conductive wire is fractured, and at the conductive part, the conductive wire is not fractured, the tension member is not fractured, and an electrical resistance of the conductive wire at the conductive part is lower than an electrical resistance of the conductive wire at the electric wire holding part.

* * * * *